US010019679B2

(12) United States Patent
Ogata et al.

(10) Patent No.: US 10,019,679 B2
(45) Date of Patent: Jul. 10, 2018

(54) MANAGEMENT APPARATUS AND MANAGEMENT METHOD OF INFORMATION PROCESSING APPARATUS

(71) Applicant: FUJITSU LIMITED, Kawasaki-shi, Kanagawa (JP)

(72) Inventors: Akira Ogata, Kawasaki (JP); Kenichi Shimazaki, Yokohama (JP); Kenichi Mori, Aisai (JP); Satoshi Matsuda, Yokohama (JP); Kazunao Muramoto, Yokohama (JP); Shinnosuke Nagakura, Yokohama (JP); Hiroki Matsueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1142 days.

(21) Appl. No.: 14/226,357

(22) Filed: Mar. 26, 2014

(65) Prior Publication Data

US 2014/0297342 A1 Oct. 2, 2014

(30) Foreign Application Priority Data

Mar. 28, 2013 (JP) ................................ 2013-070484

(51) Int. Cl.
*G06F 17/30* (2006.01)
*G06Q 10/06* (2012.01)

(52) U.S. Cl.
CPC ..... *G06Q 10/063* (2013.01); *G06F 17/30604* (2013.01)

(58) Field of Classification Search
CPC ............ G06Q 10/063; G06F 17/30079; G06F 17/30191; G06F 17/30194;

(Continued)

(56) References Cited

U.S. PATENT DOCUMENTS

2004/0143661 A1* 7/2004 Higashi ................... G06F 21/10 709/224
2006/0195297 A1* 8/2006 Kubota ............. G06F 17/30861 702/187

(Continued)

FOREIGN PATENT DOCUMENTS

JP 2010-282486 12/2010
WO 2010-050524 5/2010

OTHER PUBLICATIONS

Management of Configuration, change, and release for controlling IT operation processes, Fujitsu Software Systemwalker IT Change Manager V14g, Fujitsu Limited, http://systemwalker.fujitsu.com/jp/changemanager/ (Partial English translation). Retrieved Apr. 2, 2014.

(Continued)

*Primary Examiner* — James Trujillo
*Assistant Examiner* — Jessica N Le
(74) *Attorney, Agent, or Firm* — Fujitsu Patent Center

(57) ABSTRACT

A management apparatus includes: a unit to read configuration information of information processing apparatuses, which contains an attribute value of each of information processing apparatuses and a reference relationship between the information processing apparatuses, and log information containing a first type command executed by the information processing apparatuses; a unit to check a parameter value specified by the first type command with the configuration information of information processing apparatuses and to extract path information indicating a relationship between first configuration information of a first information processing apparatus with the first type command being executed and second configuration information of a second information processing apparatus that contains and attribute value coincident with the parameter value; and a unit to (Continued)

generate a second type command with the path information being specified in the first type command in place of the parameter value.

21 Claims, 39 Drawing Sheets

(58) Field of Classification Search
CPC ......... G06F 17/30221; G06F 17/30351; G06F 17/30604; G06F 17/30625
USPC .......................................................... 707/690
See application file for complete search history.

(56) References Cited

U.S. PATENT DOCUMENTS

2006/0271936 A1* 11/2006 Matsuda ........... G06F 17/30893 718/102
2007/0185920 A1* 8/2007 Castro ............... G06F 17/30578
2008/0022213 A1* 1/2008 Sugimura ................. G06F 8/65 715/744
2009/0292790 A1* 11/2009 Salonikios ........ G06F 17/30067 709/217
2010/0115520 A1 5/2010 Kohno et al.
2012/0246653 A1* 9/2012 Boruhovski ............ G06F 9/541 718/102
2012/0303679 A1* 11/2012 Tsuchiya ........... G06F 17/30073 707/821
2014/0373160 A1* 12/2014 Shigemoto ............ G06F 21/577 726/25

OTHER PUBLICATIONS

Automation of the operation tasks performed manually before according to operation procedure manual, Fujitsu Software Systemwalker Runbook Automation, Fujitsu Limited, http://systemwalker.fujitsu.com/jp/runbook/ (Partial English translation). Retrieved Apr. 2, 2014.
SaaS enablement of intra-enterprise business applications within a short period of time, Fujitsu Software Systemwalker Service Catalog Manager, Fujitsu Limited, http://systemwalker.fujitsu.com/jp/sv-catalogmgr/ (Partial English translation). Retrieved Apr. 2, 2014.
CMDBf/DMTF Configuration Management Database Federation, Distributed Management Task Force, Inc., http://www.dmtf.org/standards/cmdbf. Retrieved Dec. 24, 2013.

* cited by examiner

FIG.27

| GID | NAME OF TYPE | RELATIONSHIP | ATTRIBUTE | COLLECTION TIME |
|---|---|---|---|---|
| GID101 | SERVER | GID010 | IP ADDRESS=192.168.1.101<br>OS=Windows | 2010/ 1/ 21/ 6:00 |
| GID102 | SERVER | GID010 | IP ADDRESS=192.168.1.102<br>OS=Windows | 2010/ 1/ 21/ 6:00 |
| GID110 | SERVER | GID010 | IP ADDRESS=192.168.1.110<br>OS=Windows | 2010/ 1/ 21/ 6:00 |
| GID010 | PHYSICAL SERVER | GID101<br>GID102<br>GID110<br>GID002 | IP ADDRESS=192.168.1.10<br>OS=Linux | 2010/ 1/ 21/ 6:00 |
| GID103 | SERVER | GID020 | IP ADDRESS=192.168.2.103<br>OS=Windows | 2010/ 1/ 21/ 6:00 |
| GID104 | SERVER | GID020 | IP ADDRESS=192.168.2.104<br>OS=Windows | 2010/ 1/ 21/ 6:00 |
| GID020 | PHYSICAL SERVER | GID103<br>GID104<br>GID002 | IP ADDRESS=192.168.2.20<br>OS=Linux | 2010/ 1/ 21/ 6:00 |
| GID002 | TENANT | GID010<br>GID020<br>GID001 | | 2010/ 1/ 21/ 6:00 |
| GID001 | DATA CENTER | GID002 | | 2010/ 1/ 21/ 6:00 |

FIG.28

COMMAND LOG MANAGEMENT TABLE

| COMMAND | PARAMETER 1 | PARAMETER 2 | EXECUTION SERVER | EXECUTION TIME |
|---|---|---|---|---|
| Watch | -s | 192.168.1.10 | 192.168.1.101 | 2010/ 1/ 21/ 6:00 |
| Watch | -s | 192.168.1.10 | 192.168.1.102 | 2010/ 1/ 21/ 6:00 |
| Watch | -s | 192.168.2.20 | 192.168.2.103 | 2010/ 1/ 21/ 6:00 |
| Watch | -s | 192.168.2.20 | 192.168.2.104 | 2010/ 1/ 21/ 6:00 |
| ... | ... | ... | ... | ... |

FIG. 29

PARAMETER ACQUIRING PATH CANDIDATE LIST

| COMMAND | PARAMETER 1 | PARAMETER 2 | PARAMETER 2 ACQUIRING PATH | PARAMETER 2 ACQUIRING RELATION COUNT | EXECUTION SERVER | EXECUTION TIME |
|---|---|---|---|---|---|---|
| Watch | -s | 192.168.1.10 | SERVER/RELATIONSHIP/SERVER/@IP ADDRESS | 1 | 192.168.1.101 | 2010/ 1/ 21/ 6:00 |
| Watch | -s | 192.168.1.10 | SERVER/RELATIONSHIP/SERVER/@IP ADDRESS | 1 | 192.168.1.102 | 2010/ 1/ 21/ 6:00 |
| ... | ... | ... | | | ... | ... |

FIG.30

WRAPPER COMMAND MANAGEMENT TABLE

| GID | WRAPPER COMMAND ID | COMMAND | PARAMETER | TYPE | VALUE |
|---|---|---|---|---|---|
| GID101 | RID001 | Watch | PARAMETER 1 | FIXED VALUE | -s |
| | | | PARAMETER 2 | ACQUIRING PATH INFORMATION | SERVER/RELATIONSHIP/PHYSICAL SERVER/@IP ADDRESS |
| GID102 | RID001 | Watch | PARAMETER 1 | FIXED VALUE | -s |
| | | | PARAMETER 2 | ACQUIRING PATH INFORMATION | SERVER/RELATIONSHIP/PHYSICAL SERVER/@IP ADDRESS |
| GID103 | RID002 | Watch | PARAMETER 1 | FIXED VALUE | -s |
| | | | PARAMETER 2 | ACQUIRING PATH INFORMATION | SERVER/RELATIONSHIP/PHYSICAL SERVER/@IP ADDRESS |
| GID104 | RID002 | Watch | PARAMETER 1 | FIXED VALUE | -s |
| | | | PARAMETER 2 | ACQUIRING PATH INFORMATION | SERVER/RELATIONSHIP/PHYSICAL SERVER/@IP ADDRESS |
| ... | ... | ... | ... | ... | ... |

FIG.31

UNIFORM RULE TABLE

| GID | WRAPPER COMMAND ID | TARGET | KEY FOR DETERMINING SIBLING CI |
|---|---|---|---|
| GID010 | RID001 | GID101<br>GID102 | OS=Windws |
| GID020 | RID002 | GID103<br>GID104 | OS=Windws |
| GID002 | RID001<br>RID002 | GID010<br>GID020 | OS=Linux |
| ... | ... | ... | ... |

FIG.32

REPRESENTATIVE RULE TABLE

| GID | WRAPPER COMMAND ID | TARGET | RELATIONAL INFORMATION |
|---|---|---|---|
| GID001 | RID001<br>RID002 | GID002 | DATA CENTER[GID001]<br>/RELATIONSHIP<br>/TENANT[GID002] |
| *** | *** | *** | *** |

35/39

# MANAGEMENT APPARATUS AND MANAGEMENT METHOD OF INFORMATION PROCESSING APPARATUS

CROSS-REFERENCE TO RELATED APPLICATIONS

This application is based upon and claims the benefit of priority of the prior Japanese Patent Application No. JP2013-070484, filed on Mar. 28, 2013, the entire contents of which are incorporated herein by reference.

FIELD

The present invention relates to a management technology of an information processing apparatus.

BACKGROUND

In information communication sectors of enterprises, information communication systems (which will hereinafter be simply referred to as systems) are increasingly aggregated at in-office data centers toward strengthening competitive power in costs. Together with the aggregation of the systems, such a case arises that the systems get complicated, and an operation management cost of the systems rises up to a problematic point. For example, in an operation management activity of the systems, procedures and management tools are different on a system-by-system basis in many cases. Accordingly, an operation manager is requested to operate an operation management target system while being aware of this system in the system operation management as the case may be. Further, in a spot where the system is actually managed, the operation manager performs a great amount of visual checks and makes human-determinations for the system operations, and therefore an operation cost cannot be easily reduced. Still further, if a mistake happens in the activity, it is also considered that there arises a problem unable to be reckoned simply in terms of cost such as a loss of a business chance.

Such being the case, automation of the operation management activity is accelerated by introducing operation activity automated software in order to decrease manpower and time related to the operation management activity and to reduce the operation management cost of the systems.

DOCUMENTS OF PRIOR ARTS

Patent Documents

[Patent document 1] International Publication WO2010/050524
[Patent document 2] Japanese Patent Application Laid-Open Publication No. 2010-282486

Non-Patent Documents

[Non-Patent document 1] "Configuration Management for Controlling IT Operation Process, Change Management, Release Management Systemwalker IT Change Manager V14g" [online], Fujitsu Corporation, [searched on Mar. 2, 2013], Internet URL is specified by "http://" and "systemwalker.fujitsu.com/jp/changemanager/."
[Non-Patent document 2] "Systemwalker Runbook Automation for Automating Human-Based Operation Activity According to Operation Manual" [online], Mar. 2, 2013, Fujitsu Corporation, [searched on Mar. 2, 2013], Internet URL is specified by "http://" and "systemwalker.fujitsu.com/jp/runbook/."
[Non-Patent document 3] "Systemwalker Service Catalog Manager for SaaS-Oriented Scheme of In-Office Activity Applications within Short Period" [online], Fujitsu Corporation, [searched on Mar. 2, 2013], Internet URL is specified by "http://" and "//systemwalker.fujitsu.com/jp/sv-catalogmgr/."
[Non-Patent document 4] "Configuration Management Database Federation" [online], Distributed Management Task Force, Inc., [searched on Mar. 2, 2013], Internet URL is specified by "http://" and "www.dmtf.org/standards/cmdbf."

SUMMARY

One aspect of the technology of the disclosure can be exemplified by an information processing apparatus that is given as follows. The information processing apparatus includes: a unit to read configuration information of each of one or more information processing apparatuses, which contains an attribute value of each of the one or more information processing apparatuses and a reference relationship between the information processing apparatuses, and log information containing a first type command executed by each of the one or more information processing apparatuses; a unit to check a parameter value specified by the first type command with the configuration information of each of the one or more information processing apparatuses and to extract path information indicating a relationship between first configuration information of a first information processing apparatus with the first type command being executed and second configuration information of a second information processing apparatus that contains an attribute value coincident with the parameter value; and a unit to generate a second type command with the path information being specified in the first type command in place of the parameter value and to allocate the second type command to the first information processing apparatus with the first type command being executed.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 27 is a diagram illustrating the configuration information;

FIG. 28 is a diagram illustrating a command log management table;

FIG. 29 is a diagram illustrating a parameter acquiring path candidate list;

FIG. 30 is a diagram illustrating a wrapper command management table;

FIG. 31 is a diagram illustrating a uniform rule table.

FIG. 32 is a diagram illustrating a representative rule table;

DESCRIPTION OF EMBODIMENT(S)

In a field of information processing system, automation of the operation management activity making use of an automated software may be based on a premise of grasping a series of activity procedures including human activity, operations (commands) of information communication devices and input information (command parameters) etc. needed for the operations. For example, the automation of the operation management activity may involve creating process definitions for defining a series of activity procedures and require a workload of human-hour for creating process definitions in many cases.

An information processing system according to one embodiment will hereinafter be described with reference to the drawings. A configuration of the following embodiment is an exemplification, and the information processing system is not limited to the configuration of the embodiment.

Comparative Example

Figure 1:
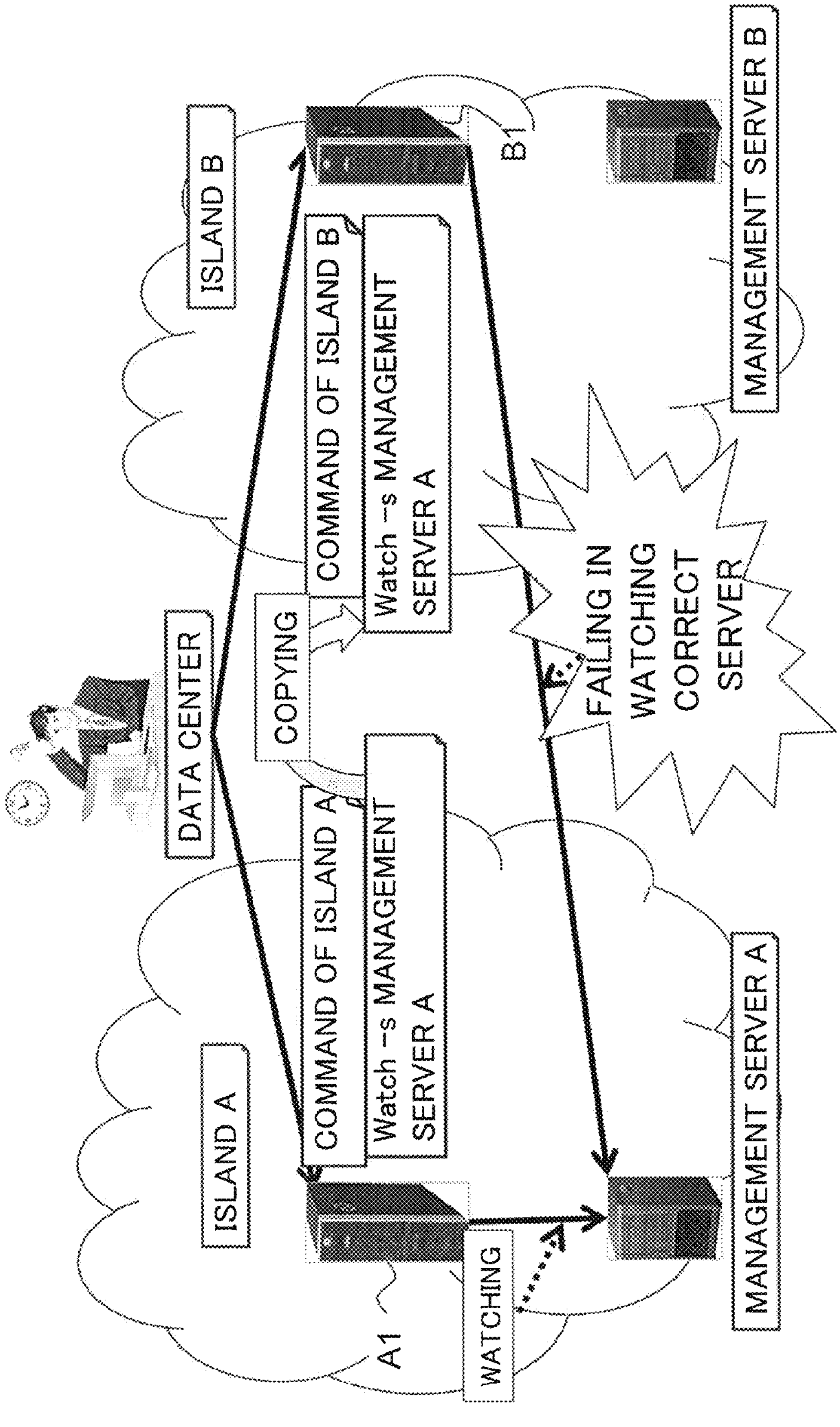
FIG. 1 is a diagram illustrating architecture of an information processing system according to a comparative example.
Figure 2:
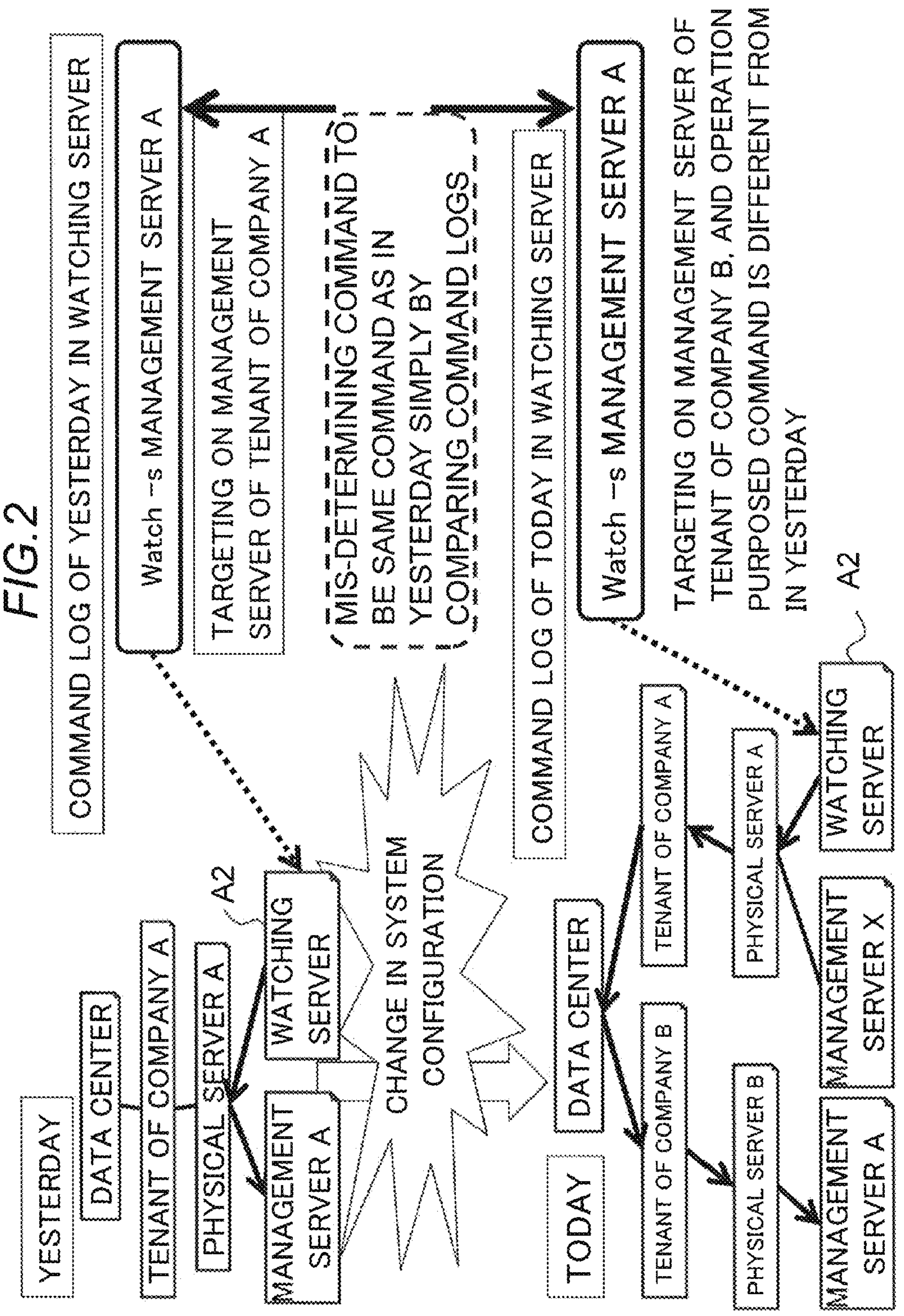
FIG. 2 is a diagram illustrating an operation management activity in a case where a change occurs in the architecture of the information processing system in the comparative example.
Figure 3:
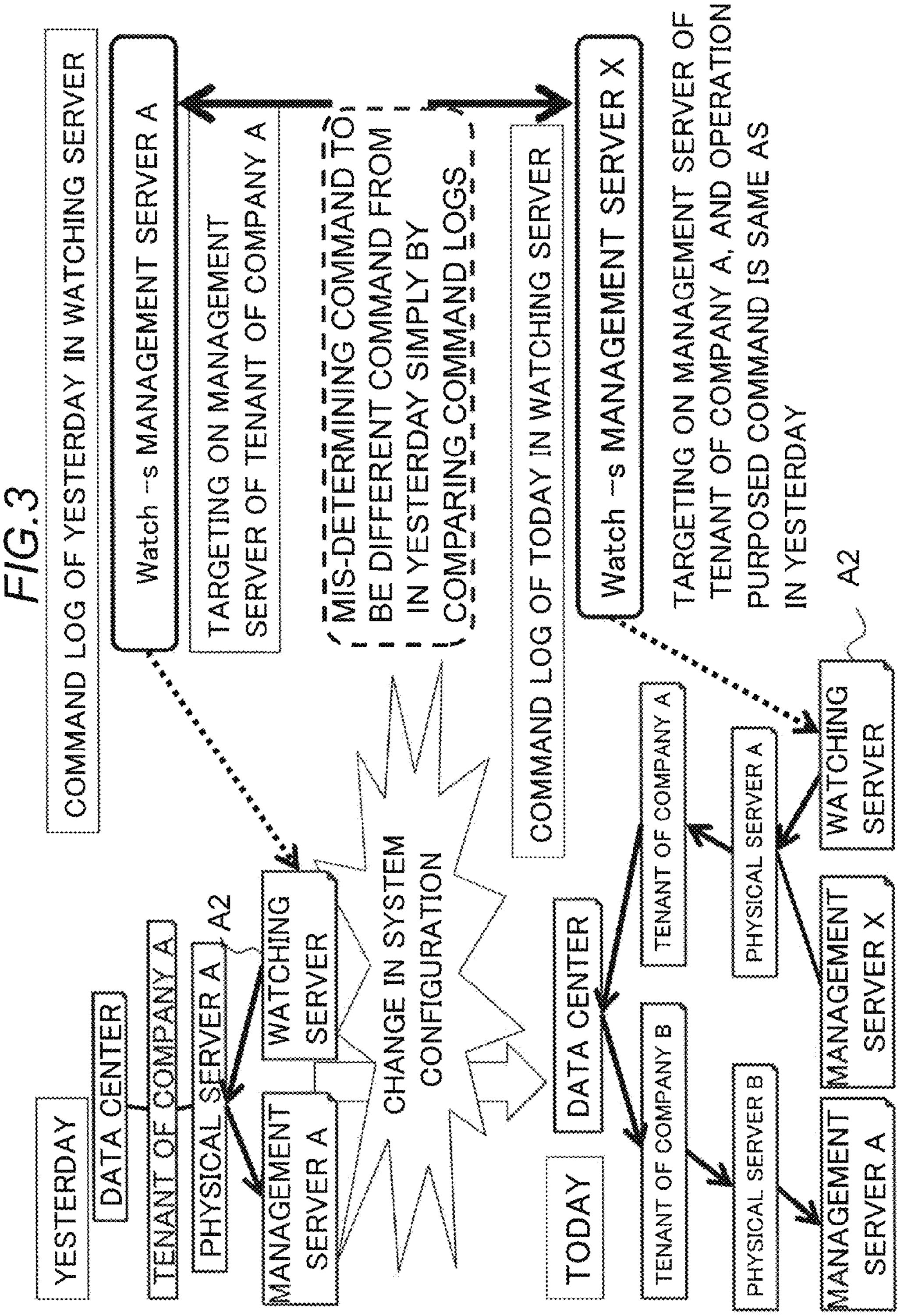
FIG. 3 is a diagram illustrating the operation management activity in the case where the change occurs in the architecture of the information processing system in the comparative example.

An information processing system of a data center according to a comparative example will be exemplified with reference to FIGS. 1 through 3. As in the information processing system of the data center, in an environment where apparatuses are hierarchically managed, a value specified in each of parameters of commands differs corresponding to a command execution target apparatus or an operating environment of the apparatus even when the same command is executed. Therefore, an operation manager cannot execute batchwise the commands for operation management with respect to the apparatuses, e.g., servers, installed in different operating environments.

FIG. 1 illustrates architecture of the information processing system according to the comparative example. The information processing system in FIG. 1 includes a plurality of configuration units called "islands". The island includes a plurality of information processing apparatuses such as servers. FIG. 1 illustrates an island A and an island B. The island A includes an operation server A1 and a management server A. Further, the island B includes an operation server B1 and a management server B.

For example, in the island A, when the operation server A1 executes a command (watch –s) for monitoring the management server A, a value of "management server A" is specified in a command parameter for specifying a monitoring destination. Herein, such a case is assumed that the island B also executes this operation management activity. In the operation management activity of the island B, if the operation manager simply cyclically uses the command parameter in the island A, it follows that the operation server B1 watches not the "management server B" which is to be originally watched but the "management server A". Namely, the information processing system in FIG. 1 cannot acquire the command parameter in a way that matches with the environment in which to execute the command.

FIG. 2 illustrates the operation management activity in the case of changing the architecture of the information processing system by way of a comparative example. In the example of FIG. 2, a watching server A2 existing as a subordinate under the physical server A and the management server A watched by the watching server A2 are provided as tenants of a company A of the data center. Then, a command "Watch –s management server A" for the watching server A2 to watch the management server A is recorded in command logs of yesterday.

The example of FIG. 2 is that the configuration of the information processing system is changed during a predetermined period, e.g., from yesterday to today, and the management server A is changed to a management server X with respect to the tenants of the company A of the data center. As a result, the watching server A2 existing as the subordinate under the physical server A and the management server X watched by the watching server A2 are provided as the tenants of the company A. On the other hand, the management server A existing as the subordinate under a physical server B is provided as a tenant of a company B.

In this situation, such a case is assumed that the command "Watch –s management server A" is recorded in the command logs of the commands executed today in the watching server A2. The command "Watch –s management server A" in the command logs of the watching server A2 is a command for watching the management server A, as a watching target, of the tenant of the company B. To be specific, the command "Watch –s management server A" in the command logs of the watching server A2 is the same in terms of format as the command "Watch –s management server A" in the command logs of yesterday, however, the watching target is different from the watching target in the command logs of yesterday.

Accordingly, when the information processing system according to the comparative example simply compares a plurality of commands with each other in the command logs and if a change occurs in the configuration of the information processing system, a case arises in which a proper operation purpose cannot be recognized. A reason why the proper operation purpose cannot be recognized is that the information processing system illustrated in FIG. 2 does not associate a processing history with values of the configuration information, which are used as the processing parameters at a point of time when the processes are executed. Namely, the information processing system in FIG. 2 is disabled from determining which item of configuration information is used as the parameter of the command for executing an operation management process. Therefore, as depicted in FIG. 2, the information processing system or the operation manager has a risk of erroneously determining a process of an actually different operation purpose to be the process of the same operation purpose.

FIG. 3 illustrates, similarly to FIG. 2, the operation management activity in the case where the configuration of the information processing system is changed during the period, e.g., from yesterday up to today. In FIG. 3, a case is assumed in which the command "Watch –s management server A" in the command logs of yesterday is compared with a command "Watch –s management server X" in the command logs of today. In this case, both of the commands are commands for watching the management servers of the tenants of the company A. The management servers are the "management server A" with respect to tenants of the company A of yesterday and the "management server X" with respect to the tenants of the company A of today. As in FIG. 3, in the architecture according to the comparative example, if the change occurs in the configuration of the information processing system, the information processing system or the operation manager cannot discriminate between the plurality of processes, recorded in the command logs, of the same operation purpose of managing the servers of the tenants of the company A as the case may be.

Hence, if the operation environment changes at the data center etc and if the parameters of the commands to be executed can be varied corresponding to the changed operation environment, a load on the operation manager can be reduced.

Further, the commands used for the operation management activities in the past can be referred to from the logs of the operation management activities. Accordingly, if the commands recorded in the logs of the operation management activities can be converted to some other purposes, there exists a possibility of reducing the load on the operation manager. If the operation environment changes, however, a meaning or a purpose of the command used in the past might be different from that in the case of the command being used for the past operation management activity. Namely, such a case exists that the command for the proper operation management cannot be generated simply by making use of the past command.

Moreover, if the operation manager can execute the commands batchwise without being aware of the difference between the operation environments or the change etc in terms of the configuration, a workload (man-hour) of the operation management activity can be decreased. For attaining this scheme, if capable of determining and acquiring the proper parameter value on the occasion of executing the command, there is a possibility that the operation activity of the information processing system according to the comparative example can be made more efficient.

Note that it is feasible to refer to the change itself in operation environment by making use of a configuration information DB (CMDB: Configuration Management Database) which will be described later on. However, a way of how the change information referred to is reflected in the command parameter is not formulated.

Working Example

The information processing system according to a working example will hereinafter be exemplified.

<Example of Configuration Management Database>

The configuration management database (CMDB: Configuration Management Database) utilized by the information processing system according to a working example will be described with reference to FIGS. 4 through 7. Disclosed in recent years were specifications pertaining to the CMDB storing the configuration information on the operation management of an IT (Information Technology) for unitarily managing the data existing at interspersed locations (reference URLis specified by "http://" and following strings "www.dmtf.org/standards/cmdbf").

The specifications disclosed in the URL given above take such an approach to realization of the CMDB as to virtually integrate a plurality of existing databases. Further, the information processing system including the CMDB has an agent (MDR: Management Data Repository) which acquires the data from the existing databases and a manager (Federating CMDB) that manages the MDR acting as agent and provides a virtually integrated database to a client. The database itself, which is managed by the Federating CMDB acting as manager, is also called (abbreviated to) FCMDB.

Figure 4:
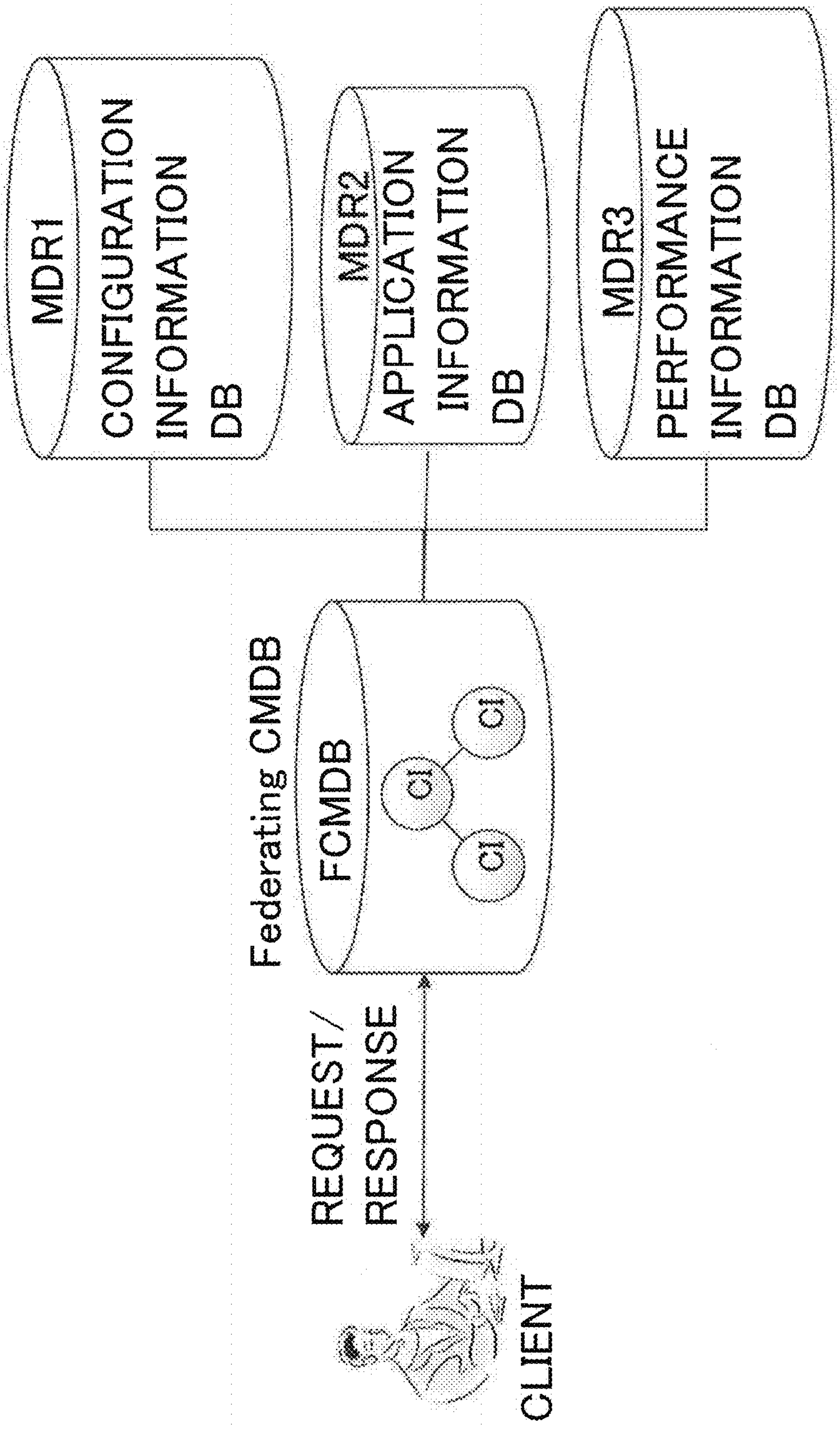
FIG. 4 is a diagram illustrating a relationship between FCMDB and MDR.

FIG. 4 is a diagram illustrating a relationship between the FCMDB and the MDR (Management Data Repository). The FCMDB is stored with "CIs" (Configuration Items) representing configuration elements (items) such as servers and software components of the information processing system and with "Relationship" representing a relationship between the CIs.

The MDR converts the data collected from the respective databases into the "CIs" taking a common format and the "Relationship" between the CIs (which will hereinafter be expressed by CI/Relationship), and registers these converted items of data in the FCMDB. FIG. 4 illustrates an MDR1 through an MDR3 which process the respective databases. The MDR1 processes, e.g., data of a configuration information database of the information processing system, the MDR2 processes data of a database of application information, and the MDR3 processes data of a performance information database.

The Federating CMDB acting as the manager has a function for integrating pieces of information retained in the respective databases. Namely, the Federating CMDB has a function called "reconciliation" (matching, nominal identification) of determining identities of the CIs and the Relationship that are registered in the FCMDB and manages the identified CI/Relationship. The identity of the data is determined based on whether or not an attribute value of the data is coincident with an attribute value (alternatively a hash value based thereon) set as a key for determination (which will hereinafter be referred to as a reconcile key), which is preset from within attributes retained in common among the integration target databases. The reconciliation is conducted normally when registering the CI/Relationship in the FCMDB. If the same sets of CI/Relationship exist within the FCMDB, the manager, i.e., the Federating CMDB merges the same sets of CI/Relationship into one set of CI/Relationship, thereby integrating the data from the plurality of databases. Further, at this time, a piece of derived information representing which database (MDR) the information is derived from is also managed with the FCMDB in the way of being associated with the CI/Relationship. Note that the Federating CMDB as the manager accepts a request from the client utilizing the FCMDB and sends a response back to the client.

Figure 5:
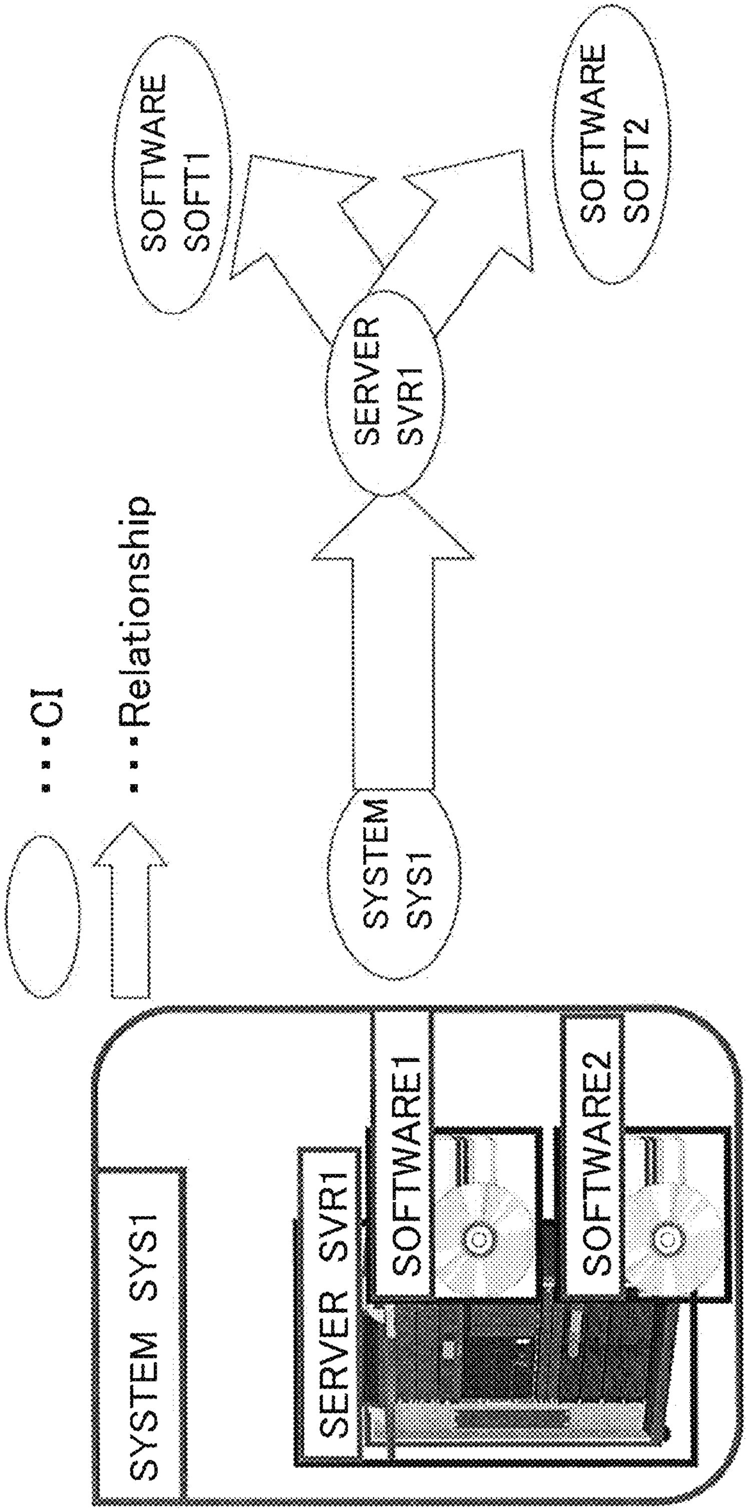
FIG. 5 is a diagram illustrating CI/Relationship.

FIG. 5 is a diagram illustrating the CI/Relationship. A system SYS1 is depicted in FIG. 5. The system SYS1 has a server SVR1, a SOFTWARE1 and a SOFTWARE2. This relationship is, when illustrated based on the CI/Relationship, given as on the right side in FIG. 5. To be specific, the configuration elements such as the system SYS1, the server SVR1, the SOFTWARE1 and the SOFTWARE2 become the CIs (Configuration Items), in which the CIs are associated in terms of their relationship with each other by "Relationships" as indicated by arrows. The "Relationship"-based associating process such as this can be repeated over a plurality of hierarchies.

Figure 6:
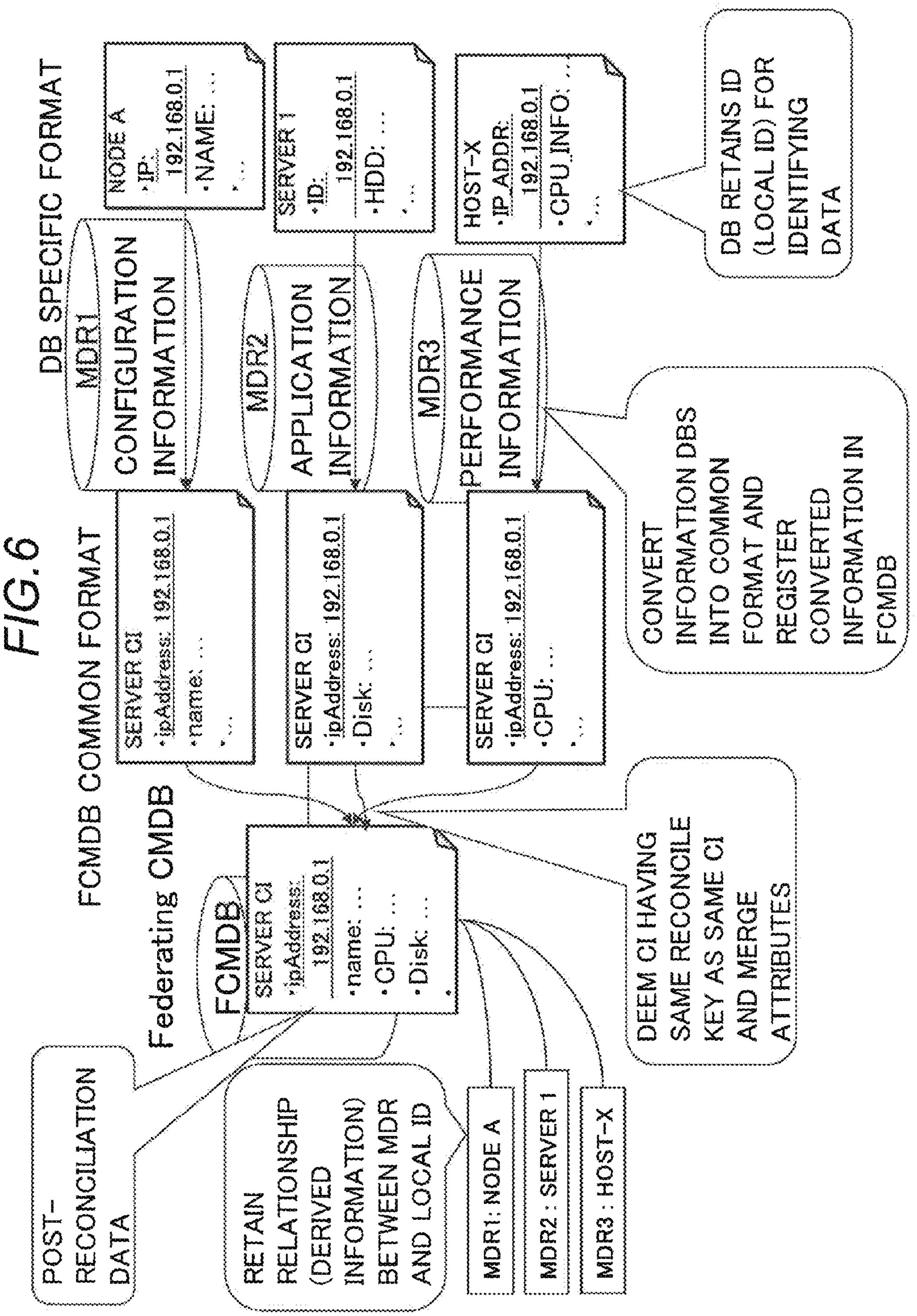
FIG. 6 is a diagram illustrating functions of the MDR and the FCMDB.

FIG. 6 is a diagram illustrating functions of the MDR and the FCMDB. In an example of FIG. 6, the MDR1-MDR3 individually access the databases each taking a unique format, converts the information of the respective databases into the common format and thus register the converted information in the FCMDB. For example, a node A has a description of IP-based unique identifier (local ID) indicating an IP (Internet Protocol) address as exemplified by IP:192.168.0.1. The node A also has a local ID such as "NAME" in addition to the above.

Moreover, the server 1 has a description of an ID that specifies an identifier of the IP address as exemplified by ID:192.168.0.1. Furthermore, the server 1 has a local ID such as "HDD" in addition to the above.

Further, a host –X has a description of IP_ADDR specifying an identifier of the IP address as exemplified by IP_ADDR: 192.168.0.1. Moreover, the host –X has a local ID such as CPU_INFO in addition to the above.

The MDR1-MDR3 respectively convert these identifiers into the common format such as "ipAddress: 192.168.0.1" and register these IP addresses as the server CIs in the FCMDB.

For example, the server CI registered by the MDR1 and derived from the node A has pieces of information such as "ipAddress: 192.168.0.1" and "name". Herein, "name" is defined as an attribute in the common format, which is converted from "NAME" in the unique format of the node A.

Further, the server CI registered by the MDR2 and derived from the server 1 has pieces of information such as "ipAddress: 192.168.0.1" and "Disk". Herein, "Disk" is defined as an attribute in the common format, which is converted from "HDD" in the unique format of the server 1.

Still further, the server CI registered by the MDR3 and derived from the host –X has pieces of information such as "ipAddress: 192.168.0.1" and "CPU". Herein, "CPU" is defined as an attribute in the common format, which is converted from "CPU_INFO" in the unique format of the node A. Note that details of how the MDR makes the conversion into the common format are proposed in, e.g., web pages specified by URL of "http://" and "www.dmtf.org/standards/cmdbf.", etc and hence the description thereof is omitted.

Herein, it is assumed that the reconcile key is "ipAddress". The FCMDB deems the CIs having the same reconcile key as nominally identifiable (name-based aggregatable) CIs and merges the attributes thereof. In the example of FIG. 6, the FCMDB merges the attributes such as "name", "CPU" and "Disk" with "ipAddress: 192.168.0.1" serving as the reconcile key, thereby becoming post-reconciliation server CIs. Further, the FCMDB retains the derived information indicating the relationship between each MDR and the local ID.

Figure 7:
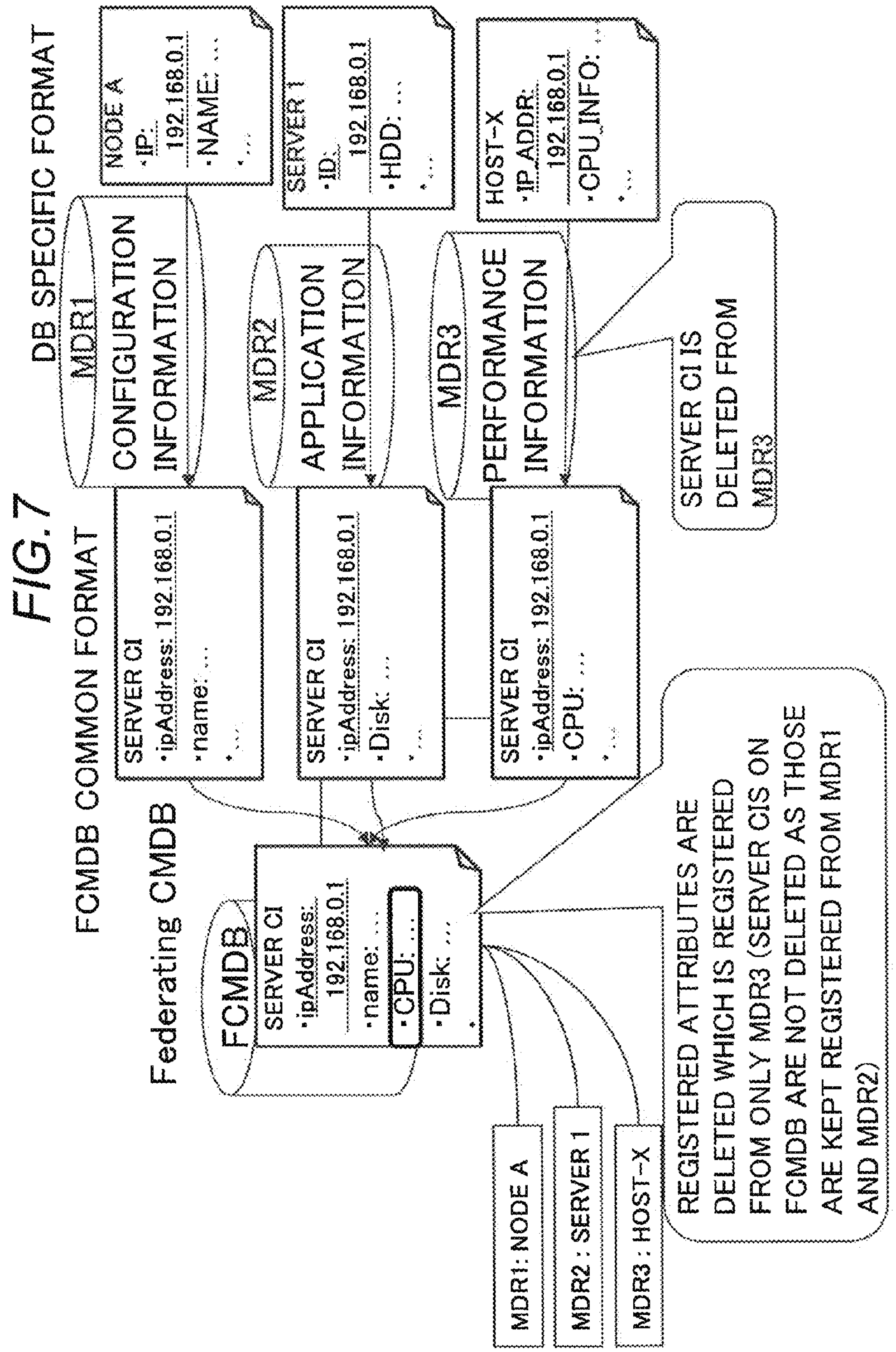
FIG. 7 is a diagram illustrating a change of the CI/Relationship.

FIG. 7 is a diagram illustrating how the CI/Relationship changes. Described is, e.g., a case in which the MDR3 deletes the attribute derived from the host –X in the FCMDB of FIG. 6. In this case, the attribute, e.g., "CPU" derived from the host –X is deleted from the post-reconciliation server CI.

Figure 8:
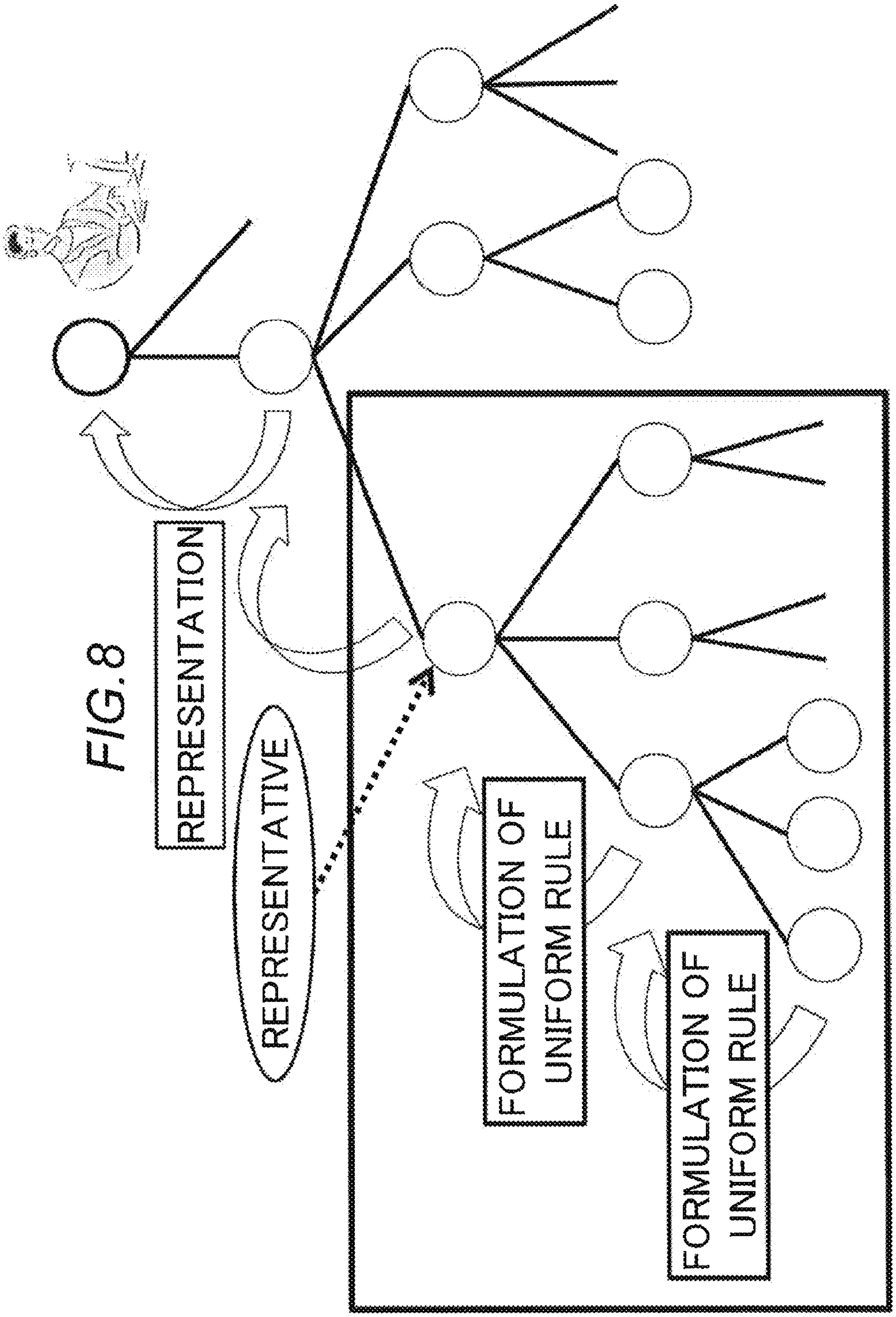
FIG. 8 is a diagram illustrating a hierarchical relationship between CIs, formulation of uniform rule and formulation of representative rule.

FIG. 8 depicts a hierarchical relationship between the CIs, uniform rule formulation and representative rule formulation in the information processing system according to the working example. In the present working example, a processing example of how a management apparatus manages the information processing system, will be described. The information processing system includes the configuration elements such as the servers and the software components. The configuration elements are described by the configuration information. Further, in the working example, the pieces of configuration information for describing the configuration elements of the management target information processing system are described and managed as the CIs. Accordingly, the configuration information is simply referred to as also the CI in the working example.

Moreover, the management apparatus defines the relationship between the configuration elements by a hierarchical reference relationship between the pieces of configuration information. The management apparatus generates the reference relationships between the pieces of configuration information (CIs) over the plurality of hierarchies by use of the CI/Relationship illustrated in, e.g., FIGS. 4-7 and stores the reference relationships in the database. In FIG. 8, a circle indicates the configuration information (CI), and a line connecting the circles represents the reference relationship. The reference relationship between these pieces of configuration information (CIs) can be, as illustrated in FIGS. 4-7, generated as the CI/Relationship by the FCMDB and the MDR. In the working example, however, it does not mean that the reference relationship between the pieces of configuration information is limited to the CI/Relationship. The management apparatus may also describe the relationship between the pieces of configuration information by other data models, e.g., an entity/relationship model, a data model of an object-oriented database, etc. Further, the management apparatus may build up a unique data structure in which the relationship between the configuration elements is associated with a pointer.

Furthermore, the management apparatus executes a variety of commands for the respective configuration elements of the information processing system. The management apparatus formulates a uniform rule of the commands to be executed for the configuration elements by use of the reference relationship between the pieces of configuration information (CIs). In the formulation of the uniform rule, the management apparatus, for instance, in the reference relationships between the pieces of configuration information over the plurality of hierarchies illustrated in FIG. 8, extracts the plurality of configuration elements enabling the same command to be executed by using the same parameter with respect to the configuration elements associated with the configuration information belonging to the same hierarchy. The command executed for the plurality of configuration elements associated with the plural pieces of configuration information (CIs) of the same hierarchy by use of the same parameter such as this, is called a common command.

In the working example, the management apparatus puts a focus on parent configuration information (CI) that refers to the plural pieces of configuration information (CIs) describing the plurality of configuration elements, respectively. These plural pieces of configuration information (CIs) are said to exist as subordinates under the parent configuration information (CI). Then, the management apparatus extracts the command using the same parameter, which is executed in common between or among the configuration elements associated with the plural pieces of configuration information (child CIs) existing as the subordinates under the parent configuration information (patent CI). This process of extracting the plurality of configuration elements enabling the same command to be executed by using the same parameter and defining these extracted configuration elements under the parent configuration information (parent CI), is called the formulation of the uniform rule. The command using the same parameter, which is executed for the plurality of configuration elements of the same hierarchy, is called a "wrapper command". The wrapper command can be said to be a common command between or among the child CIs. The wrapper command is one example of a second type command.

The process of the formulation of the uniform rule is executed over the plurality of hierarchies of the CI/Relationship. In the formulation of the uniform rule for the plurality of hierarchies, however, if unable to extract the wrapper command executed for the plurality of configuration elements of the same hierarchy, the process of the formulation of the uniform rule is finished. When finishing the process of the formulation of the uniform rule for the plurality of hierarchies, the configuration information (CI) positioned at the highest-order hierarchy in the reference relationships between the plural pieces of configuration information (CIs) set as the uniform rule formulating targets, becomes representative configuration information (representative CI) of the uniform rule based on the wrapper command. In the working example, the highest-order configuration information (CI) in the reference relationships over the plurality of hierarchies of the CI/Relationship is called as root configuration information (root CI). In the working example, the management apparatus sets, e.g., information used for referring from the highest-order configuration information (root CI) to the representative configuration information (representative CI). A process of setting the information for referring to the representative configuration information (representative CI) is called "representing". The highest-order configuration information (root CI) is one example of predetermined configuration information, and the information for referring to the representative configuration information (representative CI) is one example of reference information.

In the working example, the management system traces the reference relationships from the represented configuration information (representative CI) and executes the commands in the configuration elements of the information processing system, which are associated with the pieces of configuration information. On the occasion of executing the commands, if the common wrapper command executed for the plurality of configuration elements of the same hierarchy is defined according to the formulation of the common rule, the command (an example of a first type command) is executed based on the wrapper command (an example of a second type command). Namely, the management apparatus defines the commands of the same parameter that can be executed in common among the configuration elements of the information processing system in the configuration information (parent CI) associated with the parent configuration element, thereby reducing a management load on the information processing system.

<Collections of Command Logs and Configuration Information>

The command executed by the management apparatus is acquired from the command logs of the respective configuration elements of the information processing system. One of characteristics of the information processing system in the working example lies in such a point that the command logs of the commands executed in the respective configuration elements are associated with the pieces of configuration information (CIs) of the configuration elements existing when generating the command logs.

Figure 9:
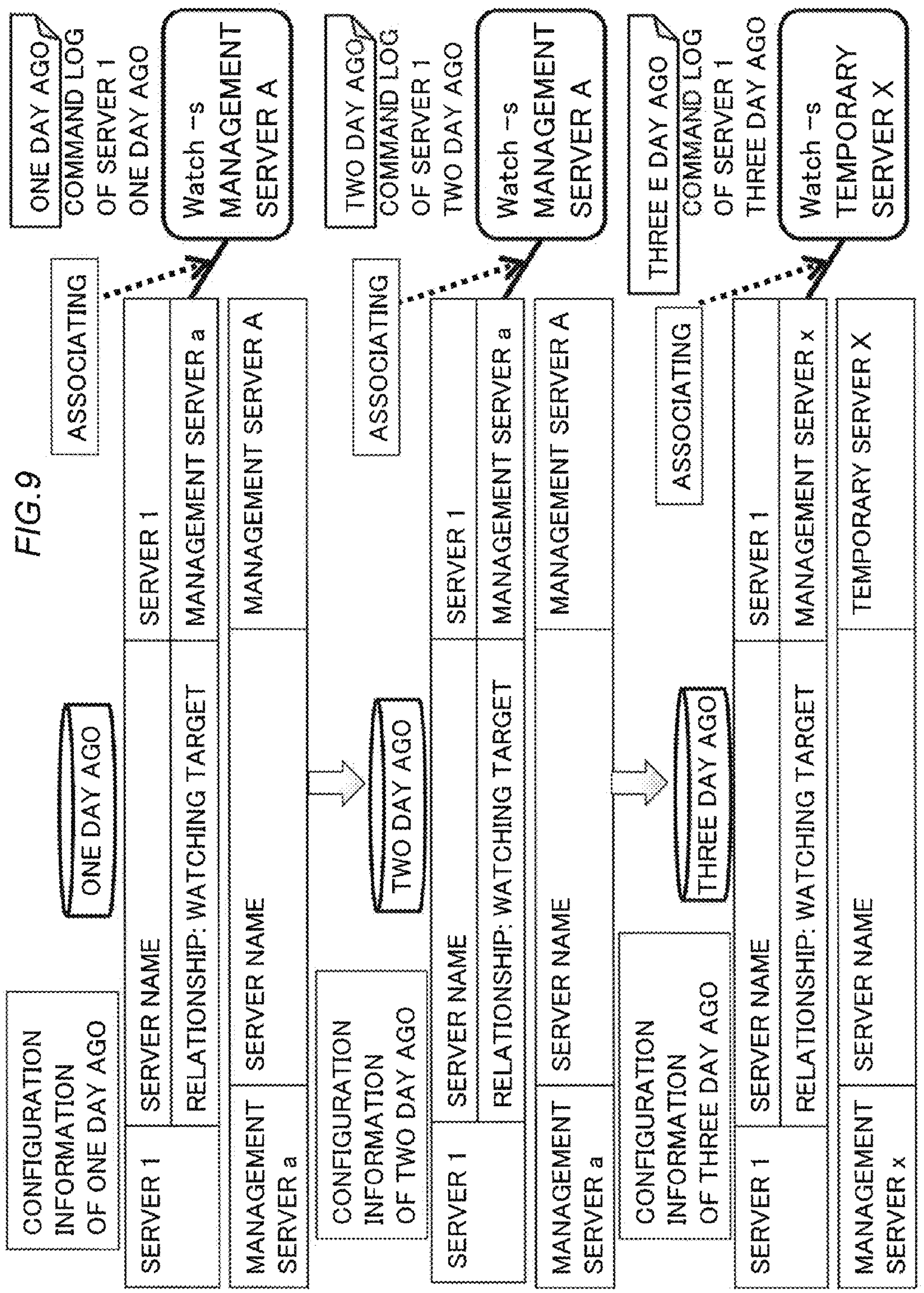
FIG. 9 is a diagram illustrating how a command log is associated with configuration information.

FIG. 9 illustrates how the command logs are associated with the pieces of configuration information. FIG. 9 depicts the command logs recorded, e.g., one day ago, two days ago and three days ago, and the pieces of configuration information of the configuration elements (the server 1 etc) in which to execute the commands of the command logs when the respective command logs are recorded. The command log is generated for every configuration element of the information processing system. The command logs of the server 1 defined as one of the configuration elements of the information processing system are illustrated on the right side in FIG. 9.

For example, in the command log recorded one day ago, the command "Watch –s management server A" is recorded. It is known from this command log that the watching of the management server A was implemented in the server 1. The command log contains a record of date such as "one day ago" and is associated with the configuration information generated one day ago on the basis of this date. In FIG. 9, the command logs are associated with the configuration information on the basis of dates, however, it does not mean that the associated pieces of information are restricted to dates. The information processing system may use date/time for associating the command logs with the configuration information. Further, the management apparatus of the information processing system may use, e.g., an association table, a pointer, etc for associating a file name of the command logs with a file name of the configuration information.

Moreover, FIG. 9 illustrates the configuration information corresponding to dates (one day ago etc) of the command logs. Note that the command logs are associated not with the individual pieces of configuration information associated with the individual configuration elements but with the whole configuration information corresponding to the information processing system. In the example of FIG. 9, the configuration information of the server 1 contains an attribute termed "relationship: watching target", and "management server a" is set as an attribute value. Further, the configuration information of the configuration element termed "management server a" has an attribute termed "server name", and an attribute value termed "management server A" is set therein.

Moreover, a command "Watch –s management server A" is recorded in the command log of the server 1 two days ago. The contents of the command log of the server 1 two days ago are the same as those of the command log recorded one day ago. Furthermore, as apparent from FIG. 9, the illustrated items of configuration information of the information processing system two days ago are the same as those given one day ago.

On the other hand, a command "Watch –s temporary server X" is recorded in the command log of the server 1 three days ago. Accordingly, the contents of the command log of the server 1 three days ago are different from the contents of the command log two days ago and from the contents of the command log one day ago. The configuration information of the server 1 three days ago, which is associated with the command log three days ago, has the attribute "relationship: watching target", and "management server x" is set as an attribute value. Moreover, the configuration information of the configuration element "management server x" has an attribute "server name", and an attribute value "temporary server X" is set therein.

By the way, the management apparatus in the working example does setting in a way that specifies a path for acquiring the command parameter in place of setting a specific value as the command parameter such as Watch –s management server A" or "Watch –s temporary server X". The command parameter acquiring path is described in the reference relationship of the configuration information from the configuration information associated with the configuration element serving as the command execution target element, and takes a format indicating the attribute value corresponding to the parameter value. Then, the management apparatus, on the occasion of executing the command, traces the command parameter acquiring path, thus acquires the attribute value indicated by the acquiring path, and executes the command in the command execution target configuration element, e.g., the server 1.

Thus, if the management apparatus sets the command to be executed in such a format as to specify the parameter acquiring path in the command, there is a possibility that there can be reduced the management load caused due to the difference between the parameter given one day ago and the parameter given three days ago. Namely, in the configuration information given one day ago, the parameter of the command executed one day ago can be acquired from the attribute "server name" of the configuration information associated with that attribute value specified by the attribute "relationship: watching target". The same is applied to the command and the configuration information given three days ago. In the example of FIG. 9, as viewed from the configuration information of the server 1 defined as the configuration element that executes the command, the parameter value "management server A" or "temporary server X" can be acquired on the same acquiring path. The management apparatus according to the working example sets the common command for the plural configuration elements that execute the command enabling the acquiring path such as this to be commonized. Further, the command specifying the parameter acquiring path in place of the specific parameter value in order to set the common command, is called the wrapper command. Such a command characteristic that the specific parameter value is embraced by the parameter acquiring path, is reflected in a term "wrapper command".

<Generation of Wrapper Command>

For generating the wrapper command, the management apparatus analyzes the command logs of the management target configuration element, e.g., the server 1 etc in FIG. 9, and extracts the command parameters. At this time, the management apparatus excludes a log in which the execution of the command results in an error. Then, the management apparatus specifies the configuration information (CI) having the extracted command parameter as the attribute value. Subsequently, the management apparatus specifies the parameter acquiring path leading to the configuration information (CI) as a reference destination from the configuration information (CI) of the configuration element from which the command log is acquired.

Figure 10:
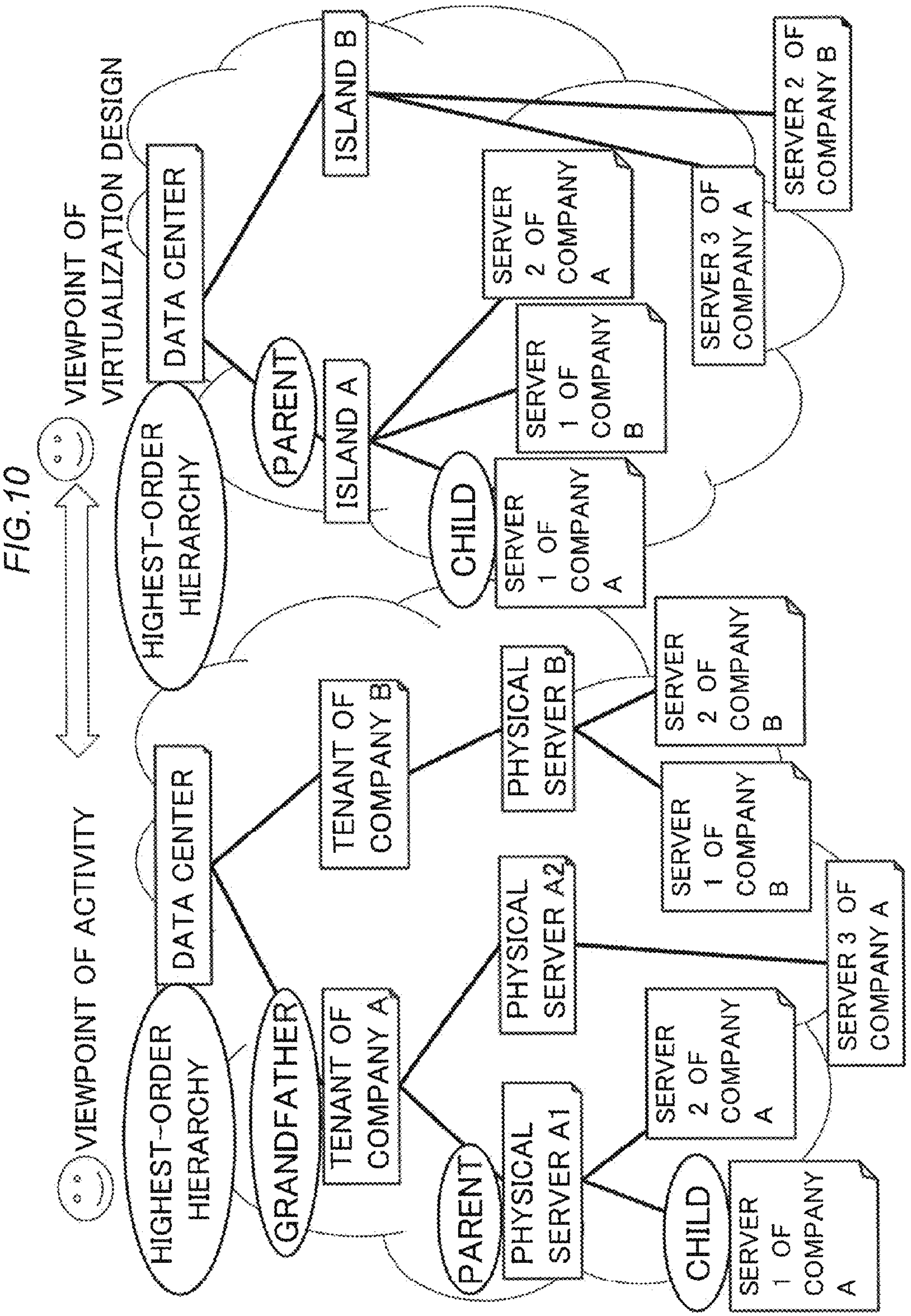
FIG. 10 is a diagram illustrating a reference relationship between one set of configuration information and another set of configuration information over a plurality of hierarchies.

FIG. 10 illustrates the reference relationships of the pieces of configuration information (CIs) over the plurality of hierarchies. As already stated, the information processing system as the management target system, which is managed by the management apparatus in the working example, includes the plurality of configuration elements. The management apparatus manages the configuration information (CI) containing the descriptions of the attributes of the configuration elements in the way of being associated with the configuration elements of the information processing system. A relationship as exemplified by a relationship between a watching device and a watched device, exists between the configuration elements. Corresponding to this relationship, such a relationship is defined also between one set of configuration information (CI) and another set of configuration information (CI) that the configuration information (CI) of the watching device refers to the configuration information (CI) of the watched device.

The configuration information (CI) associated with these configuration elements can be acquired by the MDR described already above. Further, the reference relationship between one set of configuration information (CI) and another set of configuration information (CI) can be set based on "Relation" of the CMDB described already above.

As illustrated in FIG. 5, the parent-to-child relationship between the configuration elements such as disposing a certain server under a certain host, exists between the configuration elements (CIs) included in the information processing system. In the working example, for instance, the parent-to-child relationship between the configuration elements is described in the parent-to-child relationship between one set of configuration information (CI) and another set of configuration information (CI). The parent-to-child relationship between one set of configuration information (CI) and another set of configuration information (CI) can be also said to be a hierarchical structure in which one set of configuration information (CI) refers to another set of configuration information (CI). In the working example, this parent-to-child relationship between one set of configuration information (CI) and another set of configuration information (CI) is described based on the CI/Relationship of the FCMDB. The configuration information will hereinafter be notated by "CI" in the working example.

The parent-to-child relationship of the configuration information (CI) is, however, different in terms of a viewpoint for defining the hierarchical structure of the configuration information (CI). For example, the hierarchical structure generated in terms of viewpoint of the activity in FIG. 10 is generated in terms of standpoint of what tenant each server at the data center is utilized by. In the case of taking the viewpoint of the activity, the structure is that child CIs e.g., a "tenant of company A" and a "tenant of company B" are positioned on a tenant-by-tenant basis under the parent CI, i.e., the "data center" at the highest-order hierarchy. Further, the child CIs, i.e., a "physical server A1" and a "physical server A2" are positioned under the parent CI, e.g., the "tenant of Company A". Still further, the child CIs, i.e., a "server 1 of company A" and a "server 2 of company A" are positioned under the parent CI "physical server A1". Then, the "tenant of company A" exists at a hierarchy of grandfather above the "server 1 of company A" and the "server 2 of company A", and the "data center" exists at the highest-order hierarchy.

On the other hand, the hierarchical structure generated in terms of viewpoint of a virtualization design is generated in terms of standpoint of how each server at the data center is virtually utilized. In the case of taking the viewpoint of the virtualization design, the structure is that the child CIs associated with configuration units, e.g., an "island A" and an "island B" each including a plurality of servers are positioned under the parent CI "data center". Moreover, the child CIs, i.e., the "server 1 of company A", the "server 1 of company B" and the "server 2 of company A" are positioned under, e.g., the parent CI "island A".

These hierarchical structures are maintained and managed by the FCMDB describe already above. Furthermore, the individual pieces of configuration information are collected by the MDR. In the working example, configurations and operations of the FCMDB and the MDR are omitted.

The management apparatus obtains the parent CI becoming the parent above the configuration element CIs (the servers etc) from which the command logs are acquired in terms of any one of the existing viewpoints of the CMDB. Then, the management apparatus, with respect to the child CIs under the parent CI becoming the parent, executes checking the command parameter of the same command in the command logs throughout with the attribute value of each of the child CIs under the parent CI. For example, the command logs are acquired by the server 1 of the company A, in which case the management apparatus checks the command parameter with the attribute value about the configuration information (of the CIs) under the "island A" in terms of the viewpoint of the virtualization design in FIG. 10. Similarly, the management apparatus checks the command parameter with the attribute value about the configuration information (of the CIs) under the "physical server A1" in terms of the viewpoint of the activity.

The management apparatus totalizes, as a result of checking, coincident checking results with respect to results of plural executions of the same command. As a result of the totalization, if the command parameter is coincident with a specified attribute value a predetermined number of times (e.g., 50 times) about the results of the plural executions of the same command, the management apparatus determines that this command parameter can be acquired from the specified attribute value. Then, the management apparatus records path information ranging from the configuration information (CI) of the configuration elements (servers etc) from which the command logs are acquired up to the configuration information (CI) of the configuration element as a destination from which the attribute value is acquired.

At this time, there is generated the path information which is, even for acquiring the same attribute value, different at every viewpoint of the CMDB. Such being the case, the management apparatus sets, as acquiring path information, the path information in terms of such a viewpoint as to minimize the number of times (Relationship count) to trace the reference relationships for acquiring the attribute value of the command parameter.

Figure 11:
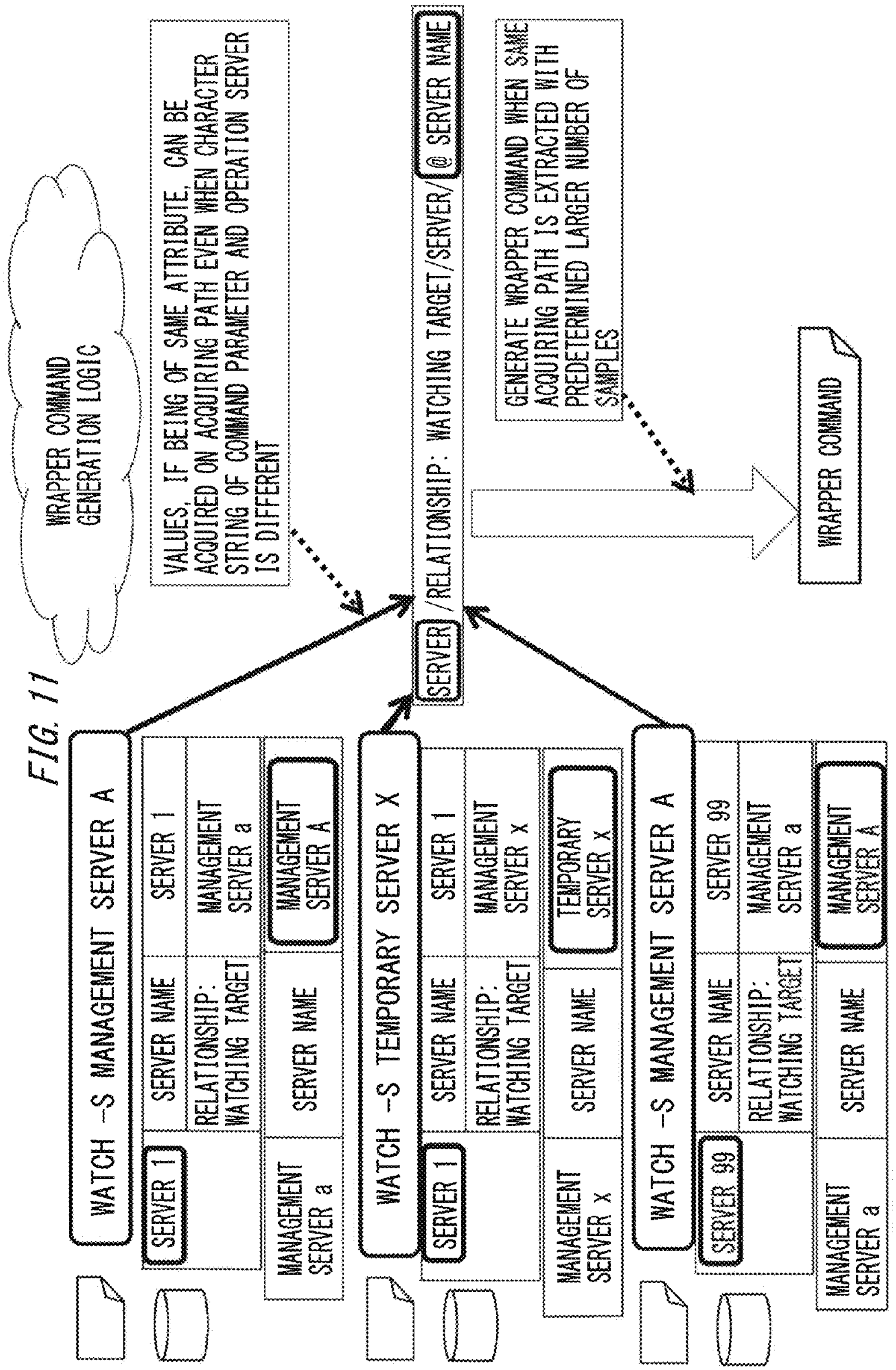
FIG. 11 is a diagram illustrating procedures of generating a wrapper command on the basis of acquiring path information.

FIG. 11 depicts a procedure of generating the wrapper command on the basis of the acquiring path information. The generation of the wrapper command involves, at first, acquiring a past result of executing the command serving as a basis of the wrapper command from the command logs of the respective configuration elements (servers etc) of the information processing system. FIG. 11 illustrates the commands acquired from the server 1 and a server 99 as the configuration elements of the information processing system. To be more specific, the command "Watch –s management server A" and the command "Watch –s temporary server X" are acquired from the command logs of the server 1. Further, the command "Watch –s management server A" is acquired from the command log of the server 99.

Moreover, the configuration of the information processing system when executing the commands of the respective command logs in FIG. 11 is described in the configuration information (CI). When the command "Watch –s management server A" is executed in the server 1, the attribute value "management server a" of the attribute "relationship: watching target" is specified in the configuration information of the server 1. Then, the attribute value "management server A" of the attribute "server name" is specified in the configuration information of the management server a. It is therefore known that the parameter value "management server A" of the command "Watch –s management server A" is acquired by referring to the attribute "server name" of the configuration element that is referred to by use of the attribute "relationship: watching target" of the server which executes the command.

Similarly, when the server 1 executes the command "Watch –s temporary server X", the attribute value "management server x" of the attribute "relationship: watching target" is specified in the configuration information (CI) of the server 1. Then, the attribute value "temporary server X" of the attribute "server name" is specified in the configuration information (CI) of the management server x. Accordingly, it is recognized that the parameter value "temporary server X" of the command "Watch –s temporary server X"

is acquired by referring to the attribute "server name" of the configuration element that is referred to by use of the attribute "relationship: watching target" of the server executing the command. Namely, the execution results such as "Watch –s management server A" and "Watch –s temporary server X" acquired from the command logs of the server 1 are the commands executed with the parameters (character strings) that are seemingly different, however, it is recognized that the parameters are the same when described in terms of the acquiring path.

Moreover, similarly to the server 1, in the server 99 also, it is possible to use the acquiring path acquired from the configuration information (CI) of the information processing system when the command is executed with respect to the parameter of the command "Watch –s management server A" obtained from the command log. Then, as in the case of the server 1 and the server 99, even if the configuration elements (servers) are different in which the commands are operated, it is known that there are a case where the parameter value can be acquired from the same type of attribute in the configuration information and a case where the parameter of the command executed by the plurality of configuration elements can be acquired on the same acquiring path.

This being the case, in the example of FIG. 11, a command is described such as "Watch –s server/relationship: watching target/server name". Then, the management apparatus generates the wrapper command when the same acquiring path is obtained with samples of a predetermined number, e.g., 50 or more commands. Note that the wrapper command is not generated for the configuration element which does not execute the command even once in the configuration elements belonging to the same parent CI. This is because the command log contains no record of executing the command.

Figure 12:
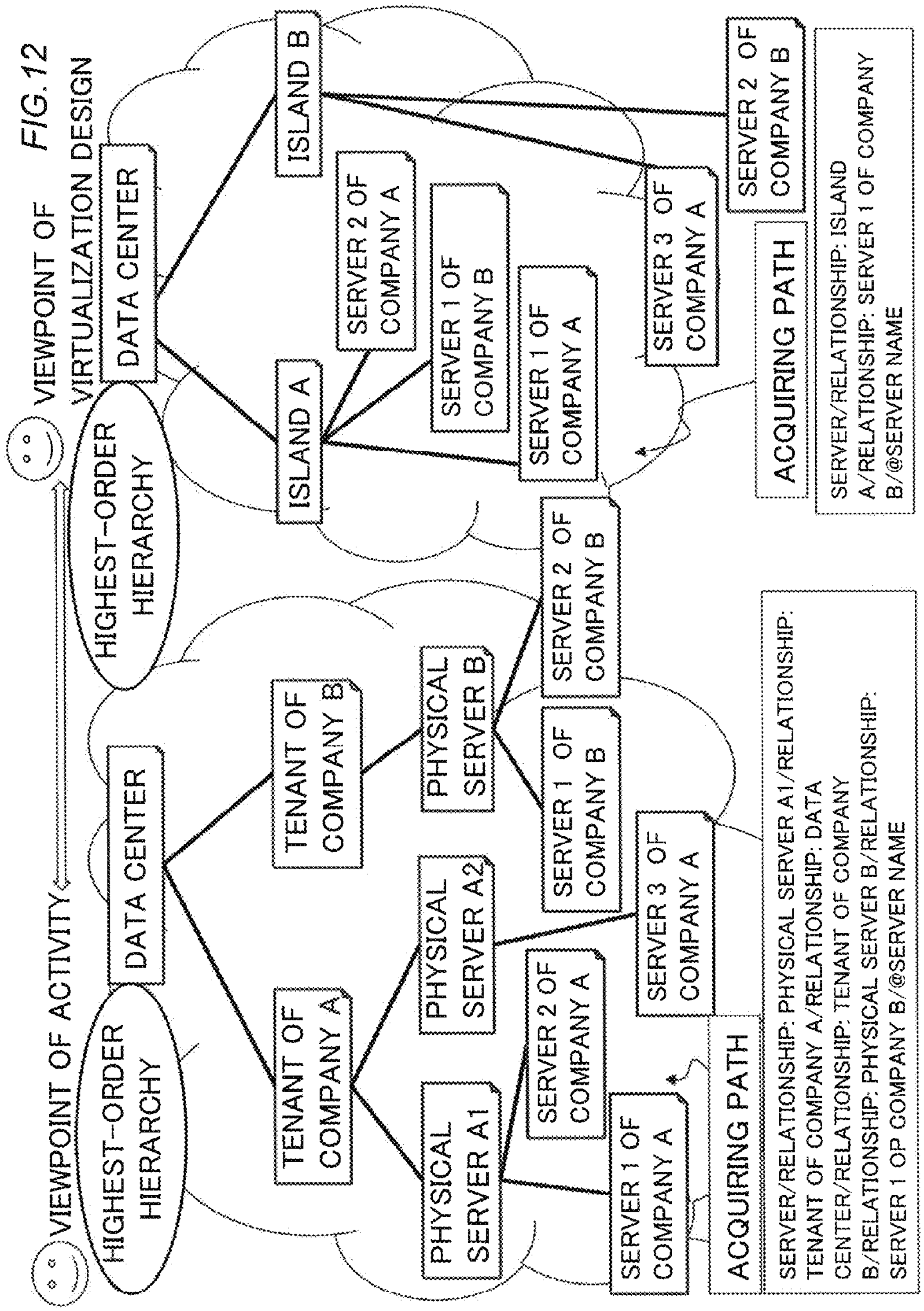
FIG. 12 is a diagram illustrating a process of acquiring different pieces of path information from different viewpoints.

FIG. 12 illustrates processes of obtaining different sets of path information in terms of different viewpoints. When changing the viewpoint of the CMDB, there exist plural sets of path information for acquiring the same attribute value as the case may be. If the plural sets of path information for acquiring the same attribute value exist, the management apparatus sets, as the acquiring path information, the path information in terms of such a viewpoint as to minimize a reference count (Relationship count) to perform tracing for acquiring the parameter value. For example, in FIG. 12, in terms of the viewpoint of the activity, a path for acquiring the server name of the server 1 of the company B from the server 1 of the company A becomes an acquiring path such as "server/relationship: physical server A1/relationship: tenant of company A/relationship: data center/relationship: tenant of company B/relationship: physical server B/relationship: server 1 of company B/@server name". On the other hand, in terms of the viewpoint of the virtualization design, a path for acquiring the same parameter value from the same configuration element becomes such as "server/relationship: island A/relationship: server 1 of company B/@server name".

When executing the command, the management apparatus acquires the attribute value by use of the path information. On this occasion, each time when tracing the reference (Relationship) of the configuration information, a process of searching for the configuration information (CI) occurs within the CMDB, resulting in a decline of speed performance. Such being the case, the management apparatus decreases the Relationship count for tracing to the greatest possible degree in order to restrain the speed performance from declining.

Figure 13:
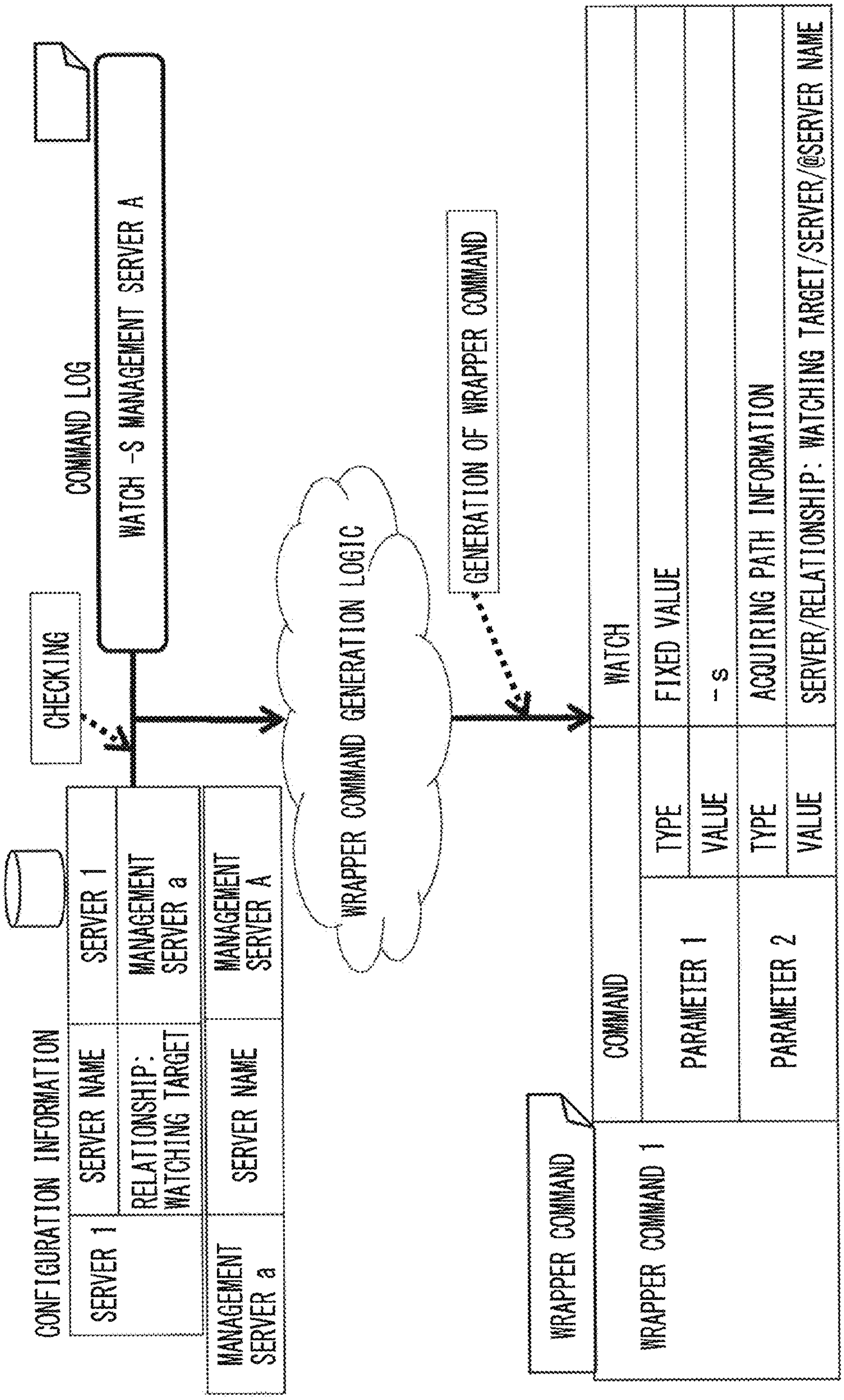
FIG. 13 is a diagram illustrating a wrapper command generating procedure.

FIG. 13 illustrates a wrapper command generating procedure. It is assumed as a premise of generating the wrapper command that the configuration information (CI) and "Relation" of the information processing system are acquired in a way that corresponds to the acquisition of the command logs in the respective configuration elements of the information processing system. The management apparatus checks the parameters of the commands having the past results of the executions within the command logs with the configuration information (CI), thereby obtaining the acquiring path information of the parameter values. Then, the management apparatus determines that when a predetermined or larger number of the same sets of acquiring path information are acquired, the acquired acquiring path information can be used as the command parameter. Then, the management apparatus generates the wrapper command by employing the acquiring path information in place of the command parameter when executed. The generated wrapper command is described in the configuration information of the configuration element (server etc) undergoing the execution of the command.

Note that in the command "Watch –s management server A" of the command log in FIG. 13, "–s" is defined as a parameter taking a fixed value and also as the parameter being out of the processing target when generating the wrapper command in the working example. Namely, the parameter value having a possibility of fluctuating each time when executing the command as in the case of "management server A", is a processing target parameter when generating the wrapper command.

With respect to the processes in the working example discussed above, the command logs and the configuration information are separately collected but are not associated with each other, in which case the following problems arise:
(1) the configuration information given when executing the command cannot be specified, and hence the command parameter of the command log cannot be checked with the configuration information (CI);
(2) if there is a time difference (time lag) till the command is executed since the configuration information (CI) has been collected, such a possibility exists that the configuration information will be, meanwhile, changed due to another factor; and
(3) there is a possibility that clocks between the servers and products within the information processing system are not synchronized. Therefore, in the case of acquiring the command logs individually from the different servers and the different products, such a case occurs that highly accurate checking cannot be done unless the configuration information (CI) is obtained in the way of being associated with the acquired command logs.

<Formulation of Uniform Rule of Wrapper Commands>

Formulation of a uniform rule of the wrapper commands connotes a process of defining a common wrapper command in the parent CI between or among the plurality of CIs under the parent CI. The following are procedures of formulating the uniform rule of the wrapper commands.
(1) The management apparatus defines, as sibling CIs, the child CIs having the same wrapper command in the child CIs under the parent CI in terms of an arbitrary viewpoint. Namely, the management apparatus deems, as the sibling CIs, the CIs having the same command and the same acquiring path in the CIs positioned under the same parent CI. It can be said that the configuration elements corresponding to the sibling CIs of the information processing system perform the operation management activity with the same command.

Figure 14:
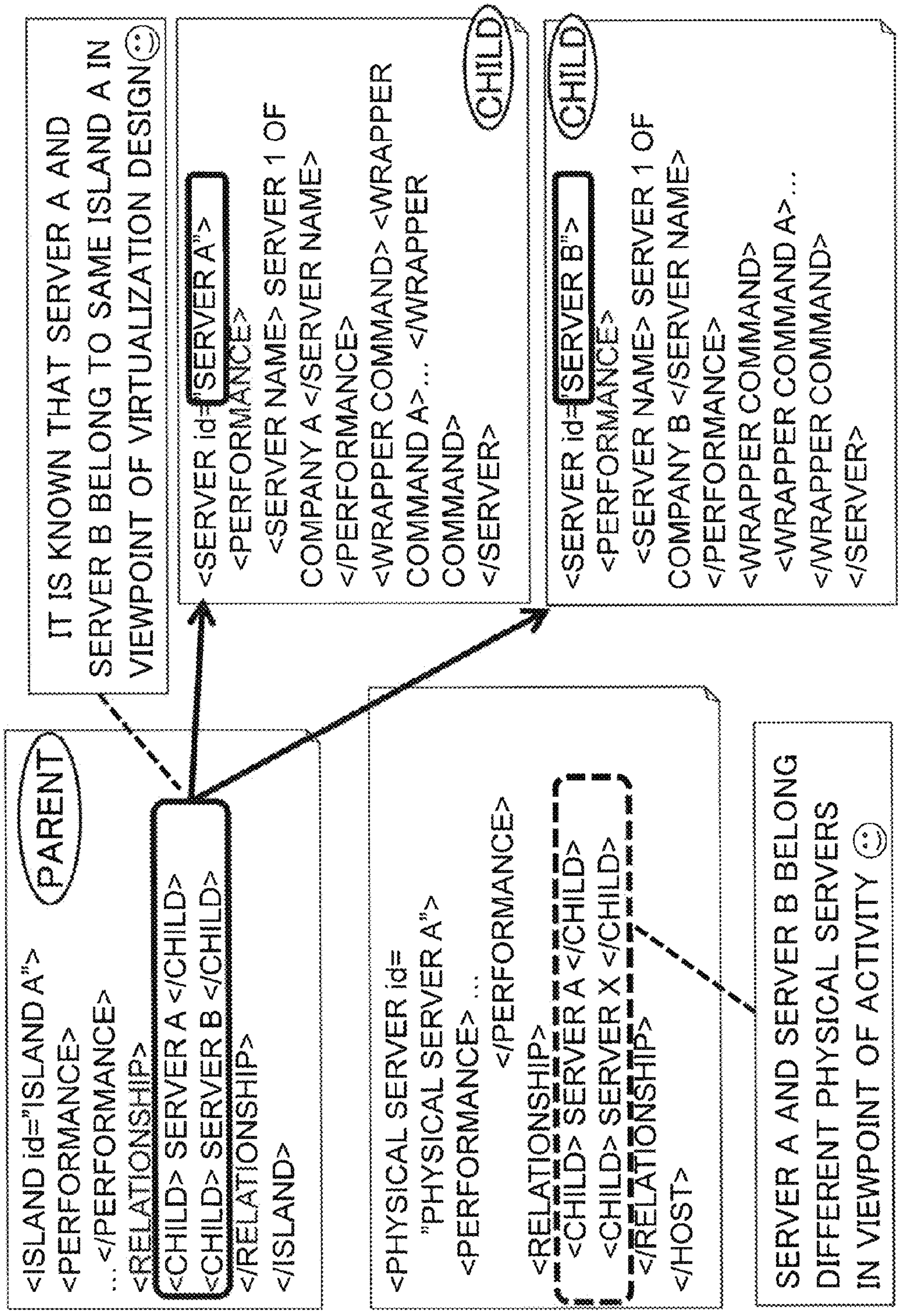
FIG. 14 is a diagram illustrating a parent-to-child relationship of the configuration information.

FIG. 14 illustrates the parent-to-child relationship of the configuration information (CI). In the example of FIG. 14, e.g., in terms of the viewpoint of the virtualization design, the parent CI corresponds to the configuration information of the configuration element termed the island A. Further, the child CIs correspond to the sets of configuration information of the configuration elements termed the server A and the server B. The "server A" and the "server B" are defined as the attribute values of the attributes "relationship" and "child" of the parent CI, thus defining the relationship between the parent CI and the child CIs. It is therefore known in terms of the viewpoint of the virtualization design that the server A and the server B are in the relationship of having the same island A as the parent CI. It is noted, in terms of the viewpoint of the activity, for instance, the "server A" and the "server X" are defined as the attribute values of the attributes "relationship" and "child" in the configuration information of the physical server A, however, the "server B" is not defined. Accordingly, it is known in terms of the viewpoint of the activity that the server A and the server B are in the relationship in which the parent CIs correspond to the different sets of configuration information of the different physical servers.

Moreover, in FIG. 14, if the wrapper command in the configuration information of the server A is common to the wrapper command in the configuration information of the server B, the sets of the configuration information of the server A and the server B correspond to the sibling CIs. It is herein assumed that the server A and the server B have the common wrapper command and therefore become the sibling CIs.

(2) The management apparatus sets, as keys for determining the sibling CIs, the attribute values that are retained in common between the sibling CIs but are different from the values of the child CIs other than the sibling CIs under the same parent CI in the CIs existing when executing the commands, which are associated with the command logs.

Figure 15:
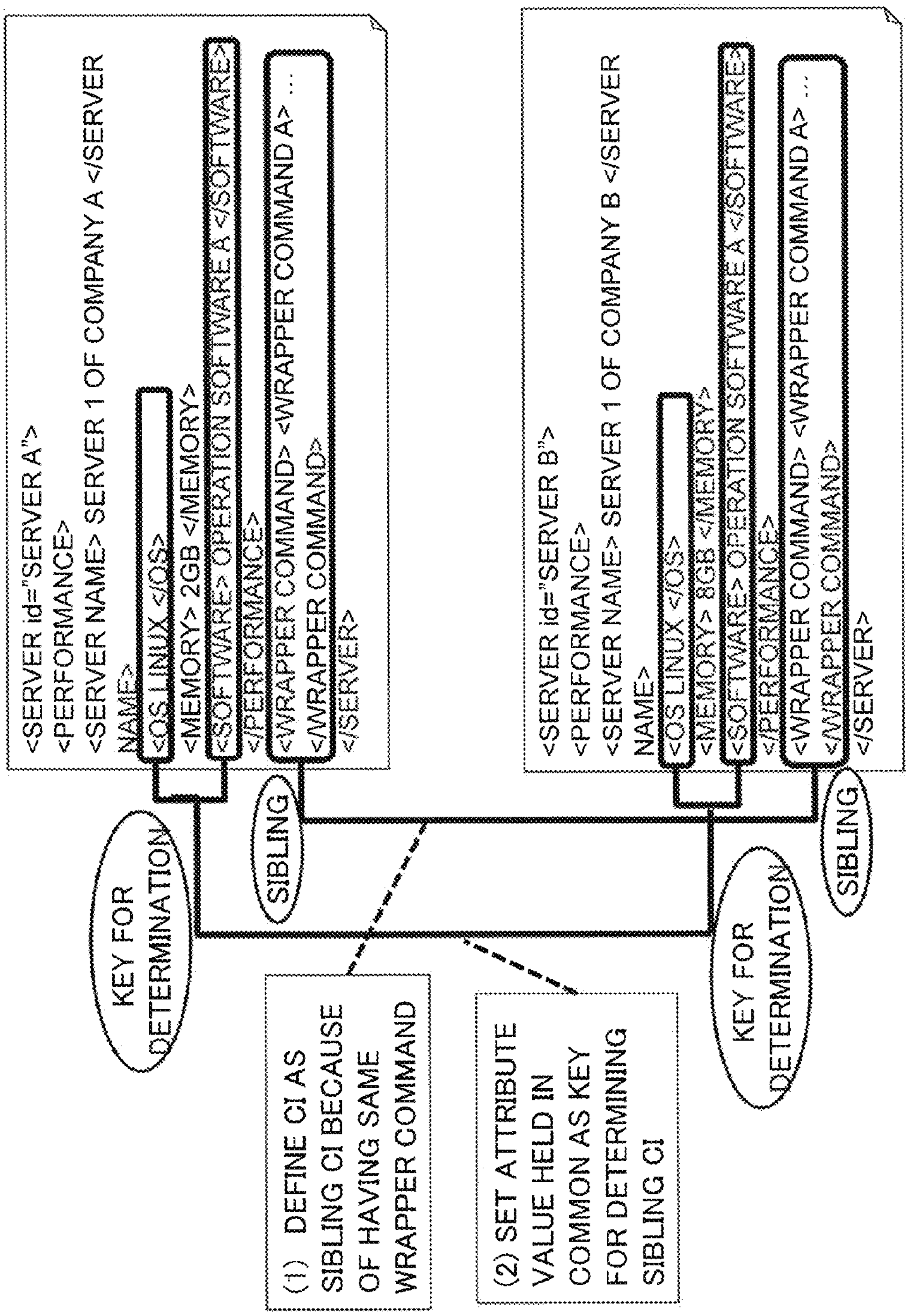
FIG. 15 is a diagram illustrating keys for determining sibling CIs.

FIG. 15 illustrates the keys for determining the sibling CIs. FIG. 15 more specifically depicts the sets of configuration information (CI) of the server A and the server B illustrated in FIG. 14. The same wrapper command is retained in the configuration information (CI) of the server A and the server B. Accordingly, the sets of configuration information (CIs) of the server A and the server B are defined as the sibling CIs. Moreover, both of the sets of configuration information (CIs) of the server A and the server B have a common attribute value "Linux" of an attribute "OS" and an attribute value "operation software A" of an attribute "software". This being the case, the attribute value of the attribute "OS and the attribute value of the attribute "software" become the keys for determining the sibling CIs.

(3) The sibling CIs exist, then it is recognized that the configuration elements exist, which perform the operation management activities based on the same rule under the parent CI. At this time, the management apparatus adds, to the parent CI, a wrapper command name held by the sibling CIs, a list of the sibling CIs and the keys for determining the sibling CIs as the uniform rule.

Figure 16:
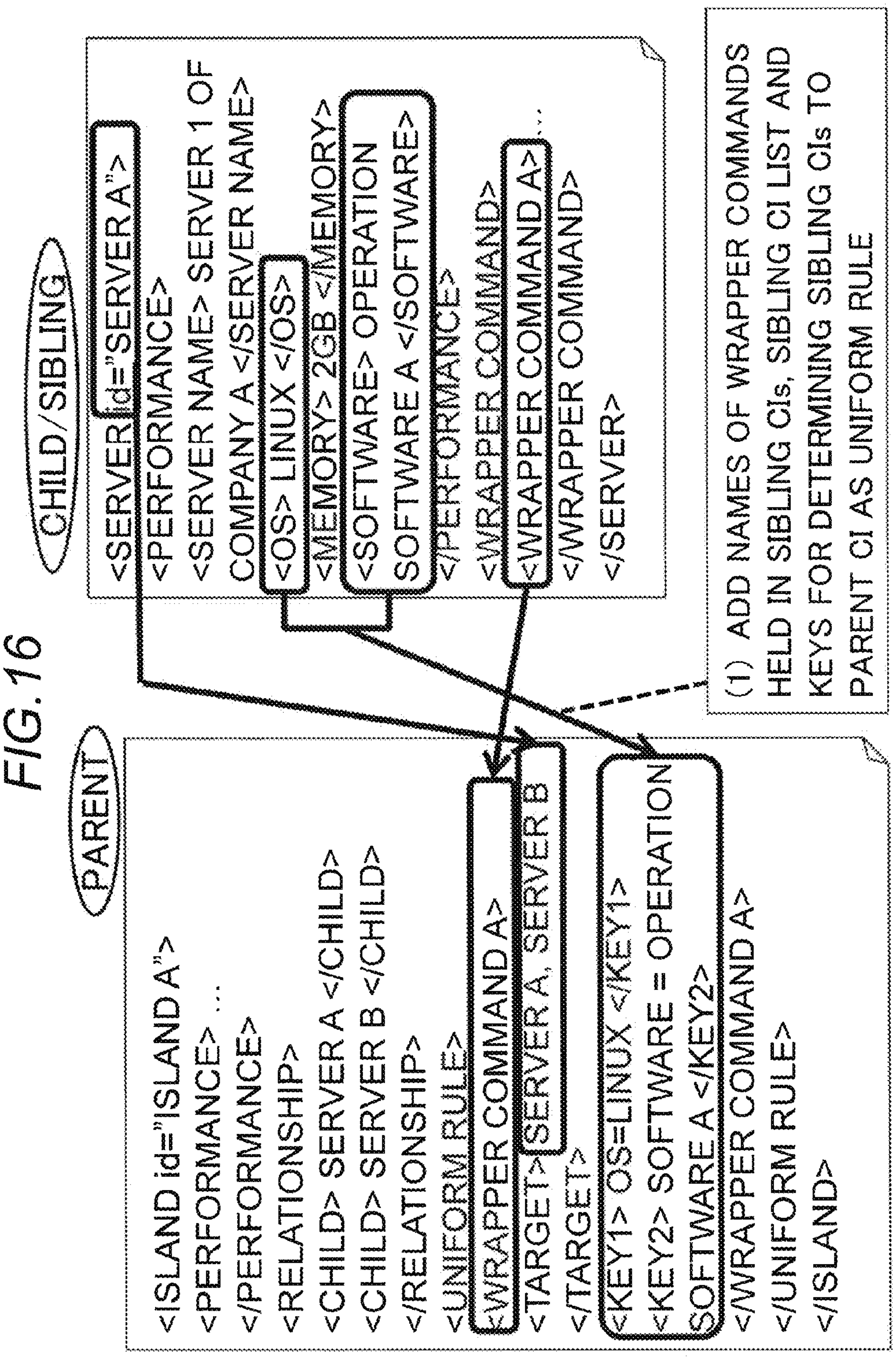
FIG. 16 is a diagram illustrating a process of adding the keys for determining the sibling CIs as a uniform rule to a parent CI.

FIG. 16 illustrates a process of adding the keys for determining the sibling CIs as the uniform rule to the parent CI. An attribute "uniform rule" is added to the configuration information of the island A defined as the parent CI, in which specifically "wrapper command", target child CIs ("server A, server B") and "key 1", "key 2" as the keys for determining the sibling CIs, are added thereto.

(4) The management apparatus applies the procedures (1) through (3) to the parent-to-child relationship of the high-order hierarchy. Namely, the management apparatus deems the parent CI to which the procedures (1) through (3) has been applied as the child CI in the procedure (1), and next performs the procedures (1) through (3) in a relationship between the parent CI and grandparents CIs.

Figure 17:
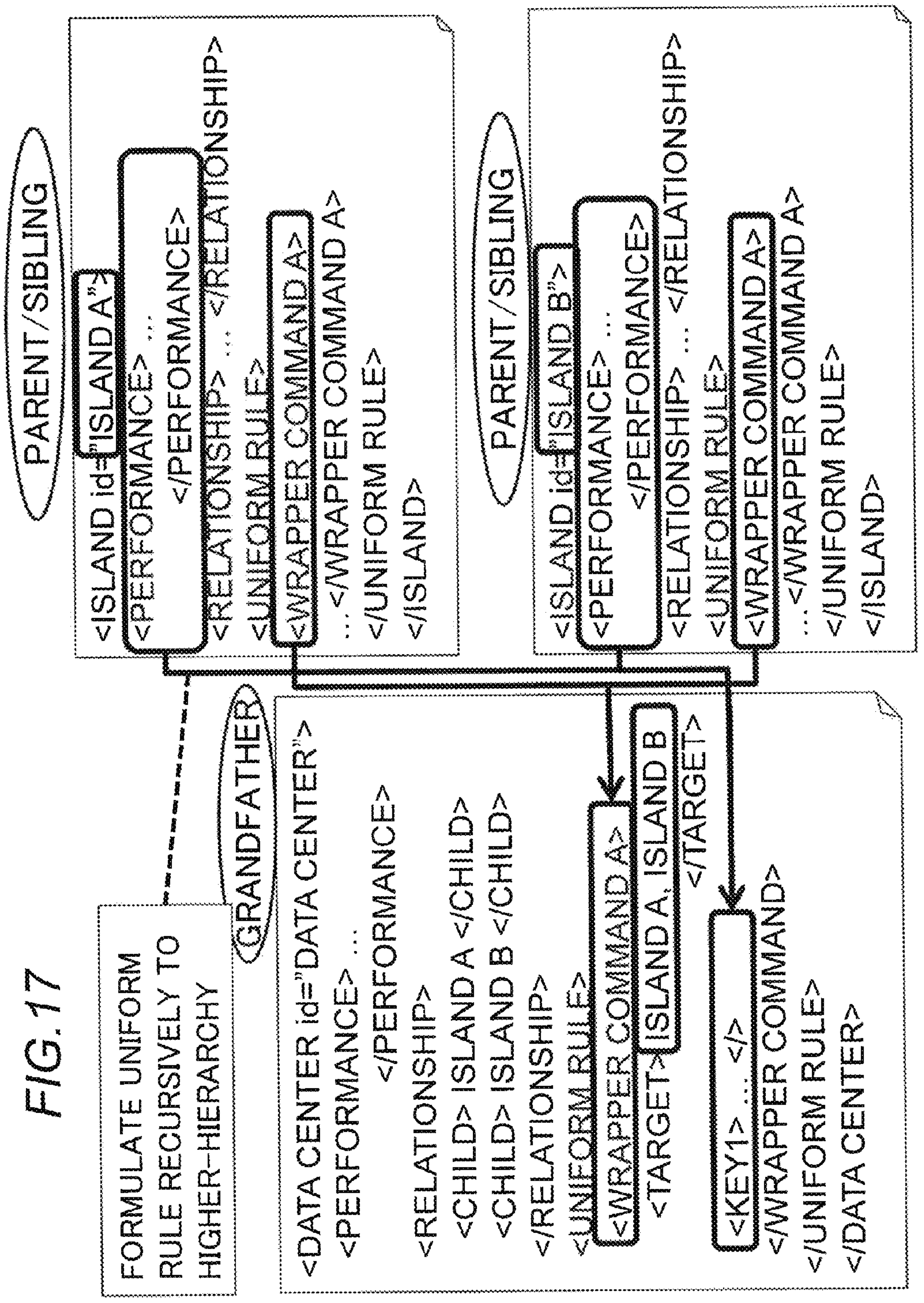
FIG. 17 is a diagram illustrating a process of applying the formulation of uniform rule to the parent-to-child relationship of a higher-order hierarchy.

FIG. 17 illustrates a process of applying the uniform rule to the parent-to-child relationship of the high-order hierarchy. Namely, for example, the processes of the procedures (1) through (3) are executed for the child CIs that are in the parent-to-child relationship with the configuration information of the data center serving as the parent CI with respect to the configuration information of the island A defined as the parent CI illustrated in FIG. 16. To be specific, the common wrapper command, the target child CIs (island A, island B, etc) and the attribute "key 1" as the key for determining the sibling CIs, which are acquired from the sets of configuration information of the island A and the island B becoming the child CIs, are added to the configuration information of the data center. In the manner described above, the processes in the procedures (1) through (3) are recursively executed. The processes in the procedures (1) through (3) may be also said to be the formulation of the uniform rule.

Thus, the management apparatus repeats the procedures (1) through (3) while tracing the relationships up to the CI (Ex.: data center CI) of the highest-order hierarchy (root) as far as the sibling CIs can be defined between the CIs of the same hierarchy in a flow such as the relationships between the child CI and the parent CI, between the parent CI and the grandparent CI, . . . . The management apparatus, if unable to define the sibling CIs, finishes formulating the uniform rule of the wrapper command and starts formulating the representative rule.

Figure 18:
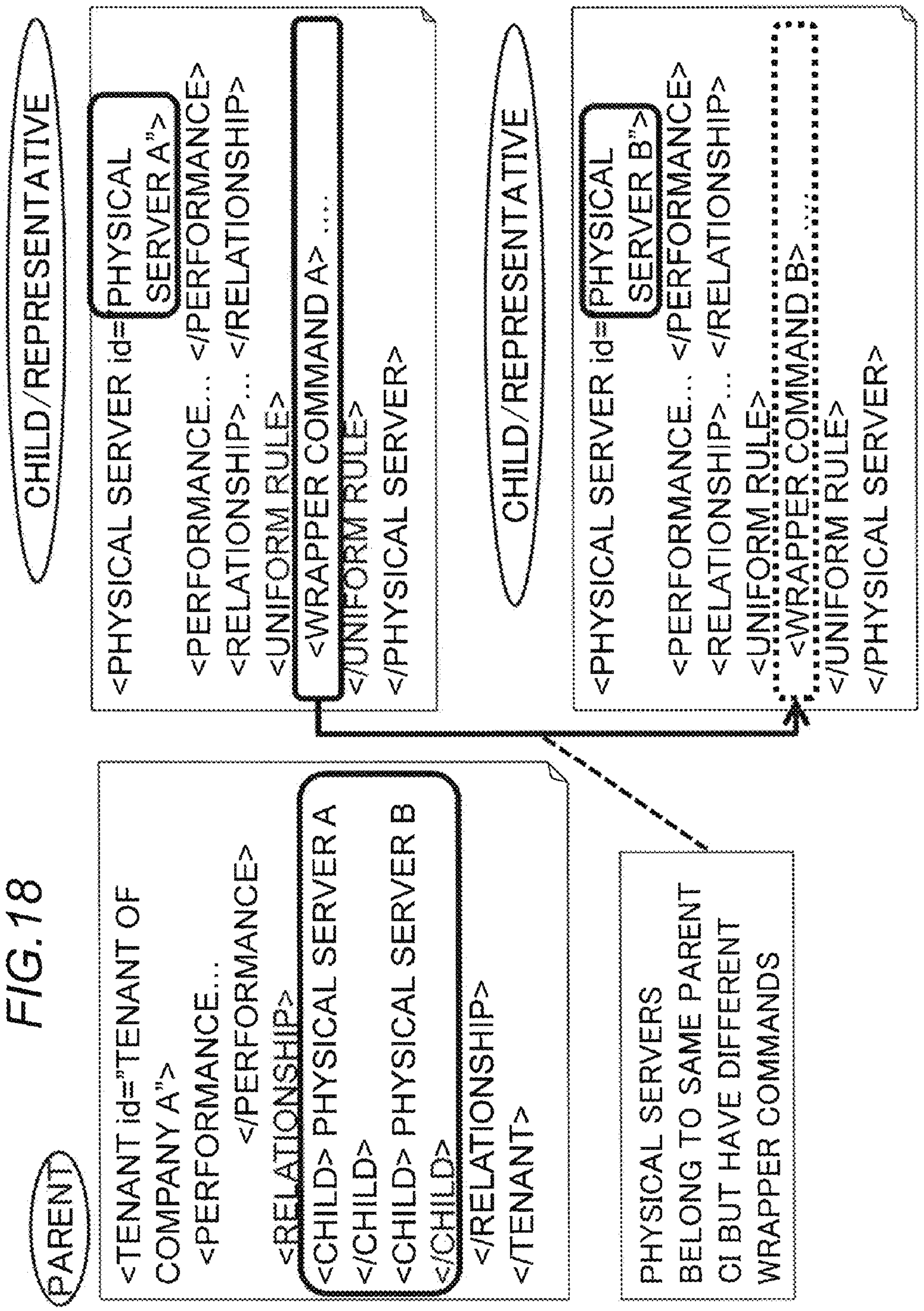
FIG. 18 is a diagram illustrating the parent-to-child relationship about which the uniform rule cannot be formulated.

Such a case is considered that, e.g., three islands A, B and C belong to the data center. When the wrapper command held by the island A does not exist in the islands B and C, this wrapper command is unique to the island A and is not therefore incorporated into the configuration information of the data center defined as the parent. Namely, formulation of the uniform rule is not done. FIG. 18 illustrates a parent-to-child relationship to which the formulation of the uniform rule cannot be applied.

With the formulation of the uniform rule described above, the management apparatus expands a range of the sibling CIs, i.e., the CIs in which the operation management activity is conducted based on the same rule (i.e., the configuration elements associated with the CIs) over the operational hierarchy. The uniform rule of the wrapper command is maximized, in which case the wrapper command comes to a status of being executable by all the servers within the data center.

<Formulation of Representative Rule of Wrapper Command>

In the course of the formulation of the uniform rule, when the formulation of the uniform rule is terminated without attaining the uniformity in the data center throughout, it is known that the wrapper command can be used under the parent CI with the formulation of the uniform rule being terminated. The parent CI with the formulation of the uniform rule being terminated is named a representative CI. For example, in the example of FIG. 18, the CI of the physical server A is different in wrapper command from the CI of the physical server B, and hence the process of formulating the uniform rule toward the higher-order hierarchy is finished in the CI of the physical server A and in the CI of the physical server B. In this case, the CI of the physical server A and the CI of the physical server B, which are defined as the parent CIs with the formulation of the uniform rule being terminated, become the representative CIs. In the working example, the management apparatus sets, in the CI of the highest-order hierarchy, relational information indicating the relationships from the CI of the highest-order hierarchy down to the representative CIs and wrapper command names. This setting is named a representative rule. The relational information representing the relationships from the CI of the highest-order hierarchy down to the representative CIs is one example of reference information.

Figure 19:
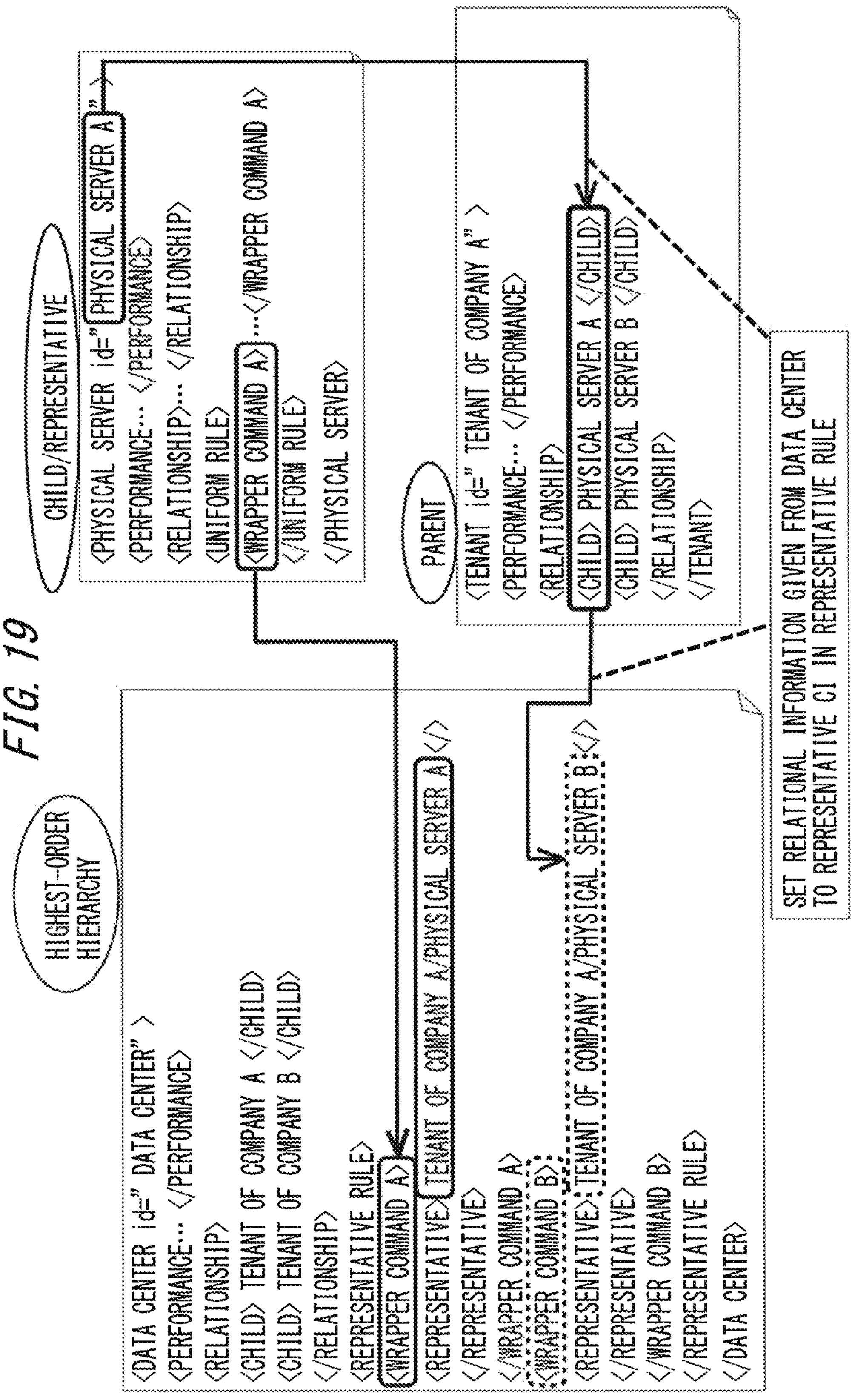
FIG. 19 is a diagram illustrating a process of the formulation of representative rule of the wrapper commands.

FIG. 19 illustrates a process of formulating the representative rule. The management apparatus adds an attribute "representative rule" to the CI of the highest-order hierarchy, thus defining the wrapper command becoming the representative rule. Moreover, the management apparatus defines the relational information with the parent CI having the wrapper command A which is already formulated via the formulation of the uniform rule as an attribute value of an attribute "representative". The formulation of the representative rule enables the management apparatus to specify the parent CI with the wrapper command being executable. Note that the generation of the wrapper command, the formulation of the uniform rule and the formulation of the representative rule are also referred in combination to as abstraction of the command.

For instance, in FIG. 19, the CI termed "data center" exists at the highest-order hierarchy, in which a CI termed "tenant of company A" exist as a child CI of the CI "data center". A CI termed "name" will hereinafter be simply called "name" CI. It is supposed that in FIG. 19, the "physical server A" CI further exists as the child CI of the "tenant of company A" CI. Then, the wrapper command A is defined so that the wrapper command A is executed in the "physical server A" CI as the representative CI. Therefore, the relational information ("tenant of company A/physical server A") with respect to the representative CI with the wrapper command being executed is defined in the "data center" CI of the highest-order hierarchy.

<Inheritance of Wrapper Command>

Figure 20:
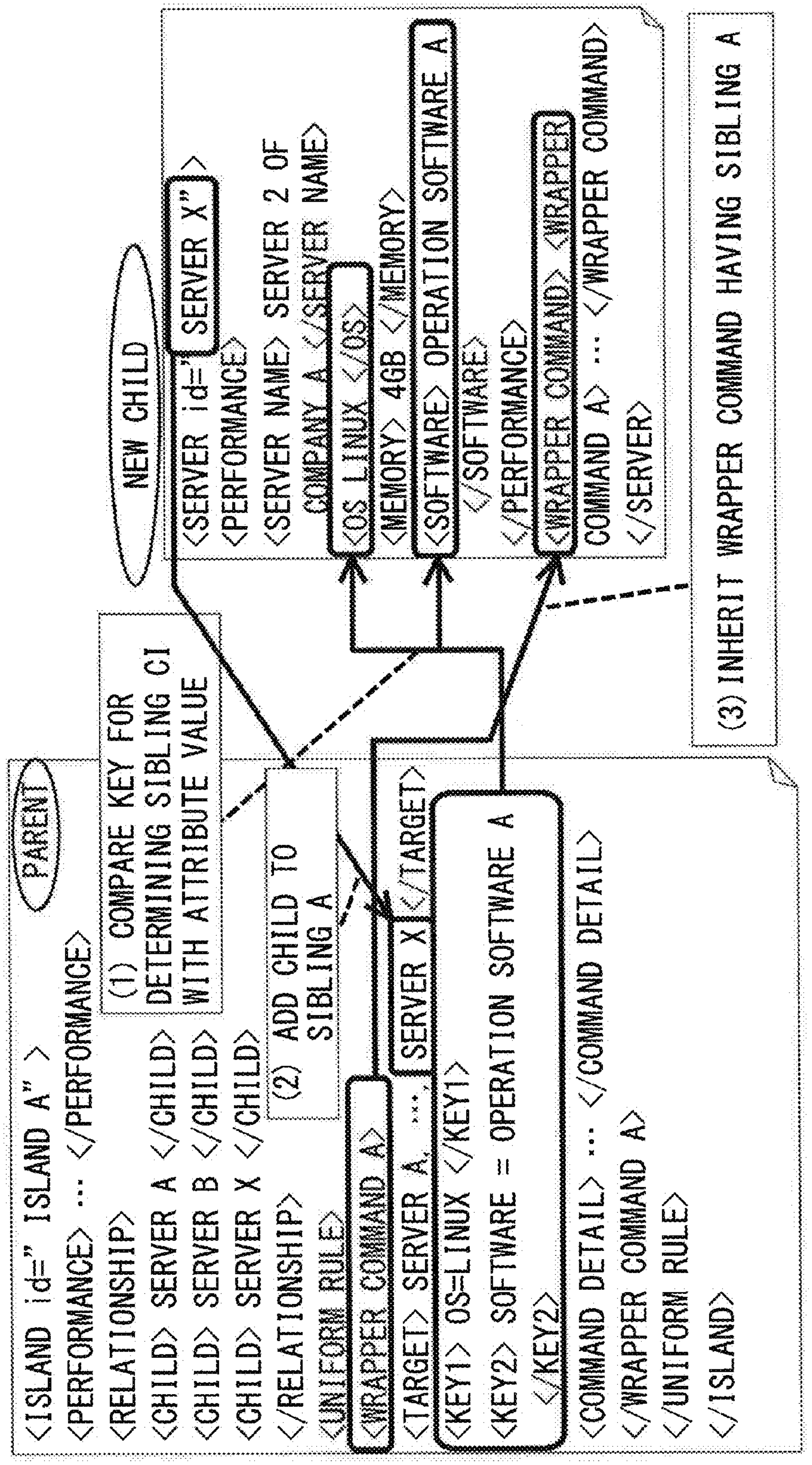
FIG. 20 is a diagram illustrating how the wrapper command is inherited.

FIG. 20 illustrates how the wrapper command is inherited. Inheritance of the wrapper command is a function of applying the wrapper command generated in one set of configuration information (CI) to another set of configuration information (CI) in which any wrapper command is not yet generated. For the inheritance of the wrapper command, the management apparatus takes the following procedures.

(1) The management apparatus collects sets of information defined as CIs (unknown CIs) where the wrapper command is not yet generated within the child CIs under the parent CI in terms of an arbitrary viewpoint. For example, the management apparatus collects any of the sets of configuration information (CIs) with the wrapper command being disabled from being generated due to none of the past results of the operations of the configuration elements (servers etc) and sets of configuration information (CIs) that are newly added. Herein, the CI with the information being collected will hereinafter be called a non-setting CI.

(2) The management apparatus, if attribute values of the non-setting CIs are coincident by a value equal to or larger than a predetermined value, e.g., 30% with values of the keys for determining the sibling CIs that are held by candidate CIs under the parent CI to which the non-setting CIs belong, determines that the same rule as a rule of the candidate CIs can be applied to the non-setting CIs. Then, the management apparatus adds the non-setting CIs as the sibling CIs of the candidate CIs. Moreover, for instance, if the values of the non-setting CIs are coincident by the value equal to or larger than 30% with values of the keys for determining the sibling CIs of the plurality of candidate CIs, the management apparatus adds the non-setting CI as the sibling CI of the candidate CI exhibiting the highest rate of the value of the key for determining the coincident sibling CI.

(3) The wrapper command held by the sibling CI of the adding destination of the non-setting CI is set in the non-setting CI.

The child CI applied with the procedures (1) through (3) is deemed as the parent CI in the procedure (1), and next the procedures (1) through (3) are carried out in the relationship between the child CI and the grandchild CI. FIG. 20 illustrates the procedures described above. In FIG. 20, the management apparatus compares values of attributes of the non-setting CI indicated as "new child" with the values of the keys for determining the sibling CIs, which are defined as the values of the attributes "key 1" and "key 2" set in the attribute "uniform rule" of the parent CI. Then, as a result of the comparison, if the values of the attributes of the configuration information of the non-setting CI are coincident by a value equal to or larger than the predetermined value with the values of the keys for determining the sibling CIs, the management apparatus adds a name "server X" of the configuration element of the non-setting CI to the parent CI as the target, and also adds the wrapper command set in the parent CI to the non-setting CI.

Thus, the management apparatus iterates the procedures (1) through (3) in a way that traces the relationships from the configuration information of the highest-order hierarchy down to the configuration information (e.g., the configuration information of the server) of the lowest-order hierarchy in a direction reversed to the formulation of the uniform rule in a flow such as the relationships between the parent CI and the child CI, between the child CI and the grandchild CI, . . . . With this process, the management apparatus expands the range of the configuration information (CI) that can be operated by the same wrapper command over the operational hierarchy.

Note that in the processing examples described above, when adding the configuration information of the non-setting CI, e.g., 30% is set as the predetermined value for making the determination through the comparison with the value of the key for determining the sibling CI. If this predetermined value is set higher, it follows that the wrapper command is executed more precisely. If this predetermined value is high, however, the range to which the wrapper command is applied becomes narrow corresponding to an increasing degree.

<Batchwise Execution of Commands Using Wrapper Command>

Figure 21:
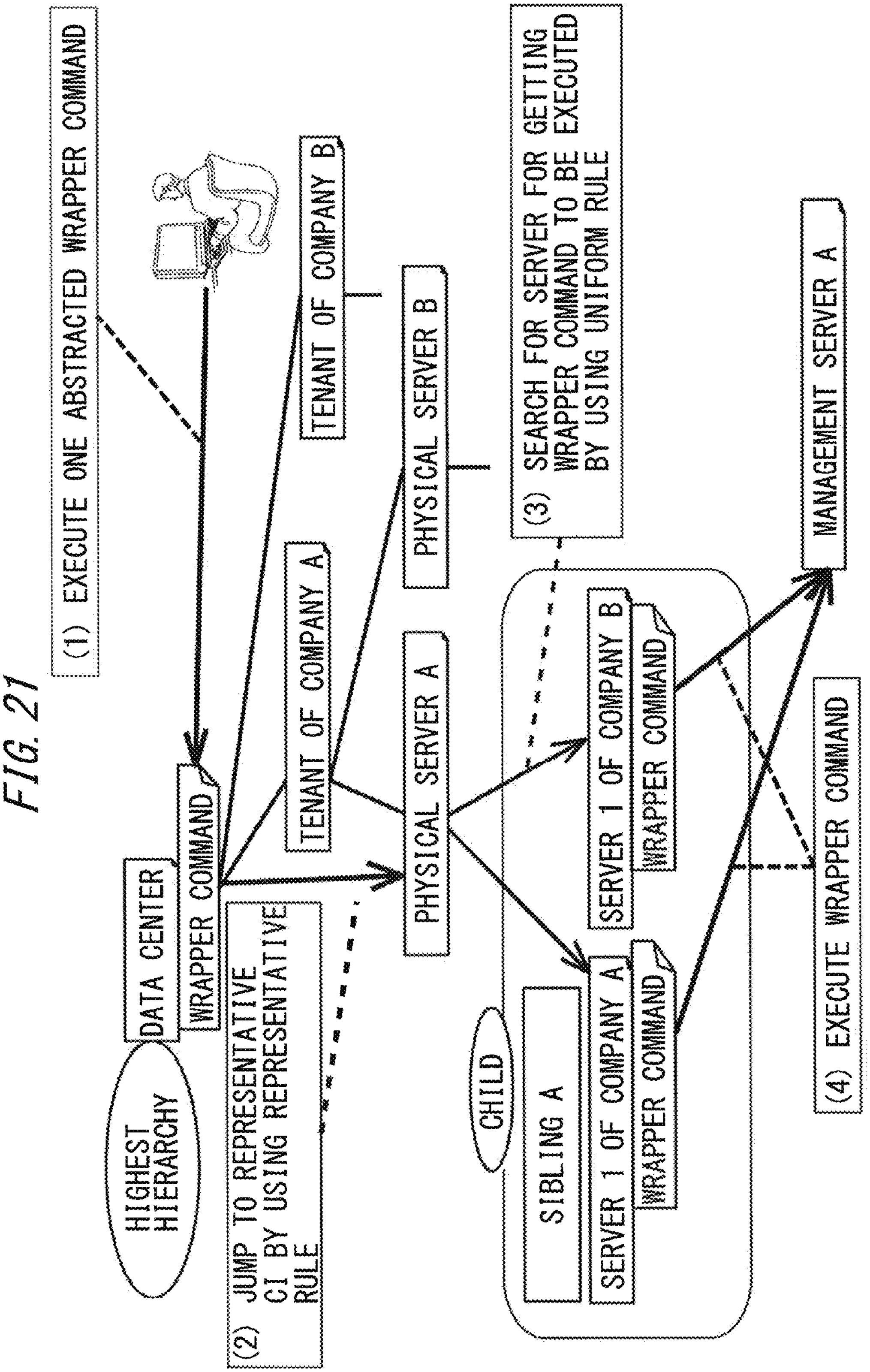
FIG. 21 is a diagram illustrating a procedure of executing batchwise commands by making use of the wrapper command.

FIG. 21 depicts a procedure of executing batchwise the commands by utilizing the wrapper command. When completing the abstraction and the inheritance of the wrapper command, the management apparatus retains all of the wrapper command names and the information (the uniform rule or the representative rule) of the servers with the individual wrapper command being executable.

(1) As in FIG. 21, for instance, when the manager of the information processing system executes the wrapper command from the "data center" CI as the CI of the highest-order hierarchy, the management apparatus gets the commands executed batchwise by all of the servers having the same wrapper command in the following procedures. The wrapper command is generated in such a manner that the parameters for the commands are unified between the plurality of CIs and can therefore be said also to be an abstracted command. In the following procedures, the management apparatus replaces a parameter of the abstracted wrapper command by a specific value. This replacement of the parameter is also said to be interpretation. The management apparatus interprets the wrapper command and gets the interpreted wrapper command executed remotely by the relevant server.

(2) The management apparatus, if the representative rule exists, shifts to the representative CI by use of the relational information set in the representative rule. As already described, FIG. 19 illustrates the representative rule. To be specific, the relational information (tenant of company A/physical server A) with respect to the representative CI with the wrapper command being executed is defined in the "data center" CI of the highest-order hierarchy. Then, the management apparatus shifts to the "physical server A" CI as the representative CI from, e.g., the "data center" CI while tracing the relational information.

(3) The management apparatus shifts from upward of the hierarchy to downward of the hierarchy up the CI corresponding to the server capable of wrapper command by making use of a list of sibling CIs set in the uniform rule of the representative CI. The management apparatus can also search for the server to execute the wrapper command by making use of the uniform rule. Note that the management apparatus, when searching for the server, implements preventing the wrapper command from being erroneously operated by each server defined in the individual CI of a shift destination as will be described later on.

(4) Further, the management apparatus gets each individual server to execute the command in accordance with a described content of the wrapper command in a way that specifies the command parameter acquired from the CI by making use of the acquiring path information. Herein, the management apparatus gets each of the individual servers connected to each other via the network to execute the command and can therefore use, e.g., a remote execution technology such as Remote Procedure Call and Secure Shell (SSH).

Figure 22:
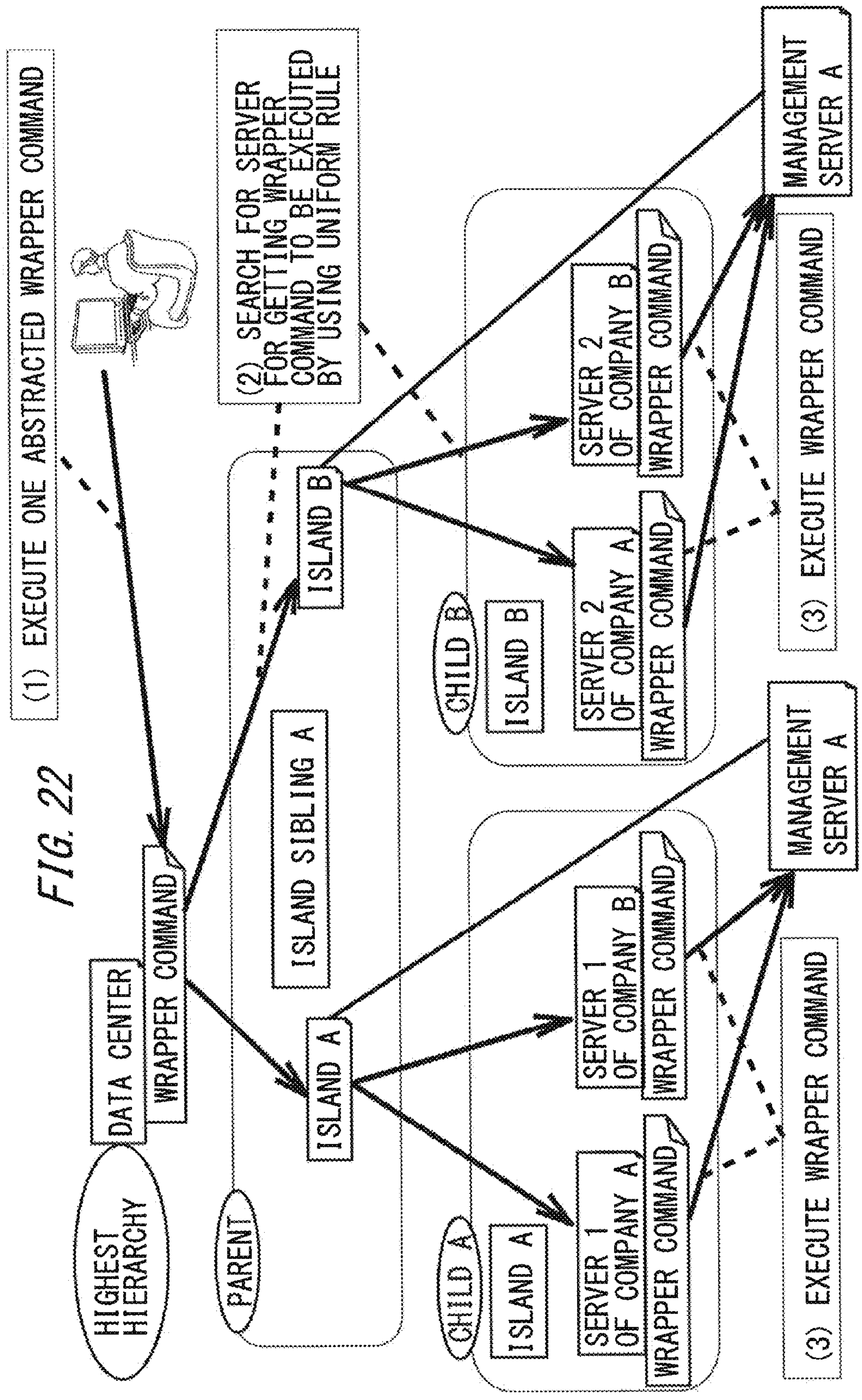
FIG. 22 is a diagram illustrating an example of executing the wrapper command.

FIG. 22 illustrates an example of executing the wrapper command in the information processing system in which the formulation of uniform rule is attained up to the CI "data center" defined as the configuration information (CI) of the highest-order hierarchy. Accordingly, as compared with the processing example in FIG. 21, the shift to the representative CI is omitted in FIG. 22.

Note that in place of the command remote execution in the management apparatus as described above, the management apparatus may support the manager who manages the information processing system to execute the command. For example, the management apparatus may, in the procedures (1) through (3), after executing the shift to the representative CI, the shift to the sibling CI and the prevention of the malfunction of the wrapper command, present the command with the wrapper command being interpreted into the attribute of the server to the manager. The manager may remotely execute the command according to the presentation given from the management apparatus. For the remote execution, the manager may manually specify the command execution target server.

The management apparatus may notify the manager of the command to be executed in response to a query given from the manager. When the manager queries the management apparatus about the command in a way that specifies the wrapper command and the execution target server, the management apparatus may notify the manager of a post-interpreting command into the attribute of the execution target server. The manager may shift to the server on the network by, e.g., the manual operation, may directly execute the notified command and may perform an intended activity.

<Prevention of Malfunction of Wrapper Command>

Figure 23:
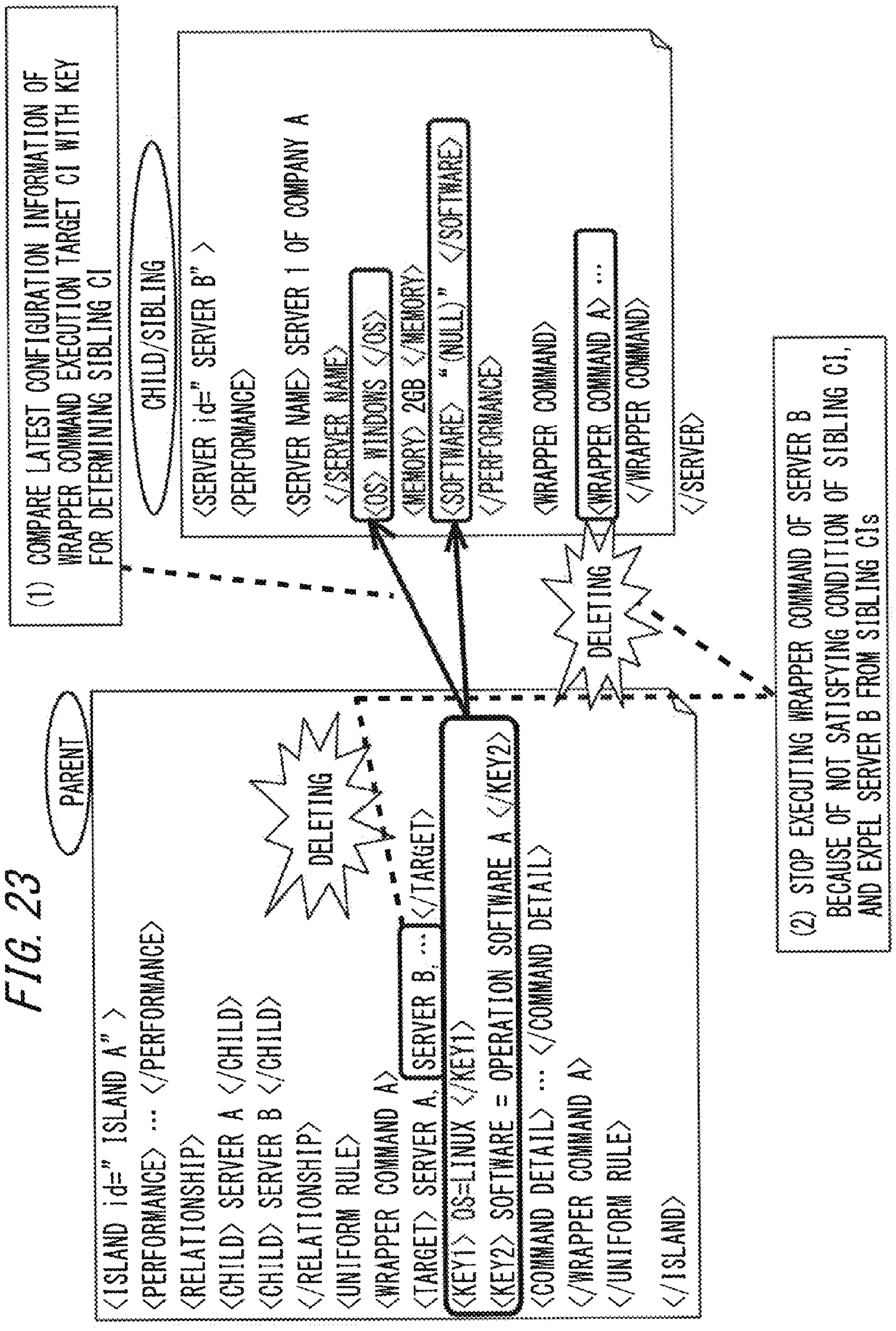
FIG. 23 is a diagram illustrating a process of preventing a malfunction of the wrapper command.

FIG. 23 illustrates a process of preventing a malfunction of the wrapper command. With the batchwise execution of the commands, before executing the wrapper command, in the procedure depicted in FIG. 22, the management apparatus prevents the malfunction of the wrapper command in the execution target server.

(1) The management apparatus collects the CIs of the wrapper command execution target servers, and compares the latest attribute value with the key for determining the sibling CI. The latest attribute value is one example of a present value. Note that the latest CIs are to be collected by the MDR in the working example. A processing example of the MDR collecting the configuration information has already been proposed on the Website etc described above, and hence an in-depth description thereof is omitted in the present working example.

For example, in an example of FIG. 23, "key 1" (e.g., a name of the OS) and "key 2" (e.g., the name of the software to be executed) are defined in the parent CI as the keys for determining the sibling CIs based on the uniform rule. Then, the management apparatus compares the keys for determining the sibling CIs that are defined in the parent CI with the CIs of the child CIs.

(2) As a result of the comparison, if the number of coincident attribute values is equal to or smaller by a predetermined value (e.g., 30%) than the number of the keys for determining the sibling CIs, it is presumed that the environment of the target server changes from when formulating the wrapper command in the uniform rule or from when the wrapper command is inherited. Then, the management apparatus stops executing the wrapper command with respect to the target server. Furthermore, the target server does not satisfy a condition for the sibling CI and is therefore expelled from the sibling CIs by the management apparatus. In the example of FIG. 23, "wrapper command A" is deleted from the "server B" CI, and the server B is also deleted from the list of the sibling CIs indicating the execution targets of the wrapper command in the uniform rule of the parent CI.

Note that in the case of not executing the prevention of the malfunction in the procedures described above, for example, it follows that the manager manually creates a prerequisite of the wrapper command and manually checks the operation environment. Namely, it follows that the manager checks whether the wrapper command manually created in the past is still executable at the present or not. A human-based method expends a considerable amount of man-hour and also has a possibility of not satisfying the prerequisite due to a change in environment that occurs during a period till executing the wrapper command after being checked.

In recent years, the servers have been increasingly aggregated at the data center. Moreover, with advancements of cloud computing systems, servers are frequently allocated and returned in ICT (Information and Communication Technology). As a result, system architecture in the data center dynamically changes and becomes complicated. Consequently, an increase in operation management cost of the system becomes a problem. Problems solved by the management apparatus in the present working example newly arise in the environment where the servers are aggregated or in the environment using the cloud computing systems as described above.

<System Architecture>

Figure 24:
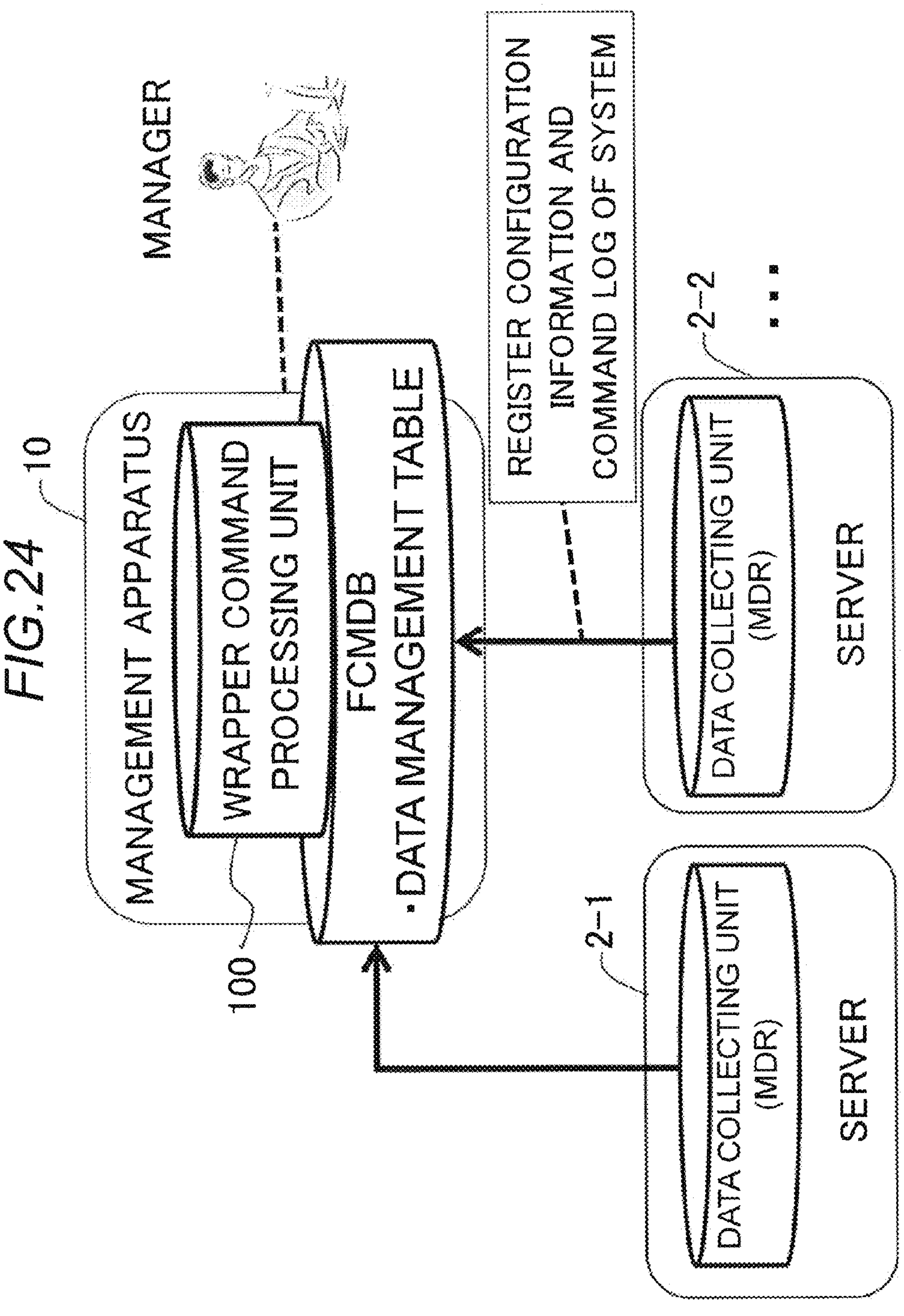
FIG. 24 is a diagram illustrating a relationship between a management apparatus and a data collecting unit according to a working example.

FIG. 24 is a diagram illustrating a relationship between a management apparatus 10 and data collecting units 2. Note that in the case of individually distinguishing between the data collecting units 2, these units are termed such as a data collecting unit 2-1 and a data collecting unit 2-2. The data collecting unit 2 is, e.g., a server functioning as the MDR. The data collecting unit 2 acquires the configuration information (CI) of the configuration elements and the command logs of the information processing system as the management target, and registers the acquired configuration information (CI) and command logs in a data management table within the management apparatus 10. The data management table can be stored in, e.g., the FCMDB.

The management apparatus 10 includes a wrapper command processing unit 100 to generate and execute the wrapper command by use of the data management table storing the configuration information (CI) of the configuration elements and the command logs of the information processing system. The manager of the information processing system instructs the management apparatus 10 to generate or execute the wrapper command, while the management apparatus 10 executes processes related to the wrapper command such as generating or executing the wrapper command according to the instruction of the manager.

Figure 25:
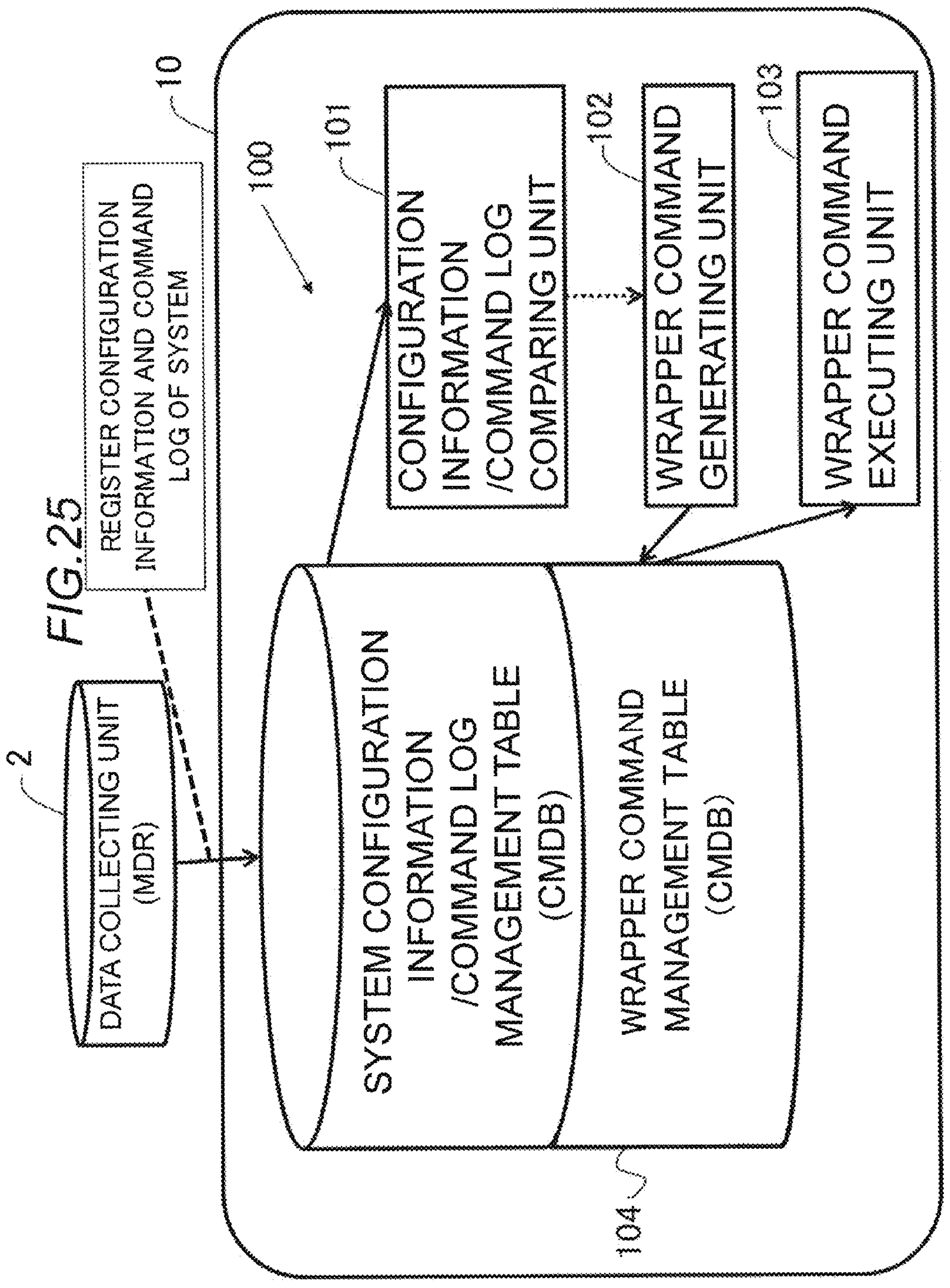
FIG. 25 is a diagram illustrating a configuration of the management apparatus.

FIG. 25 is a diagram illustrating a configuration of the management apparatus 10 including the wrapper command processing unit 100. As described above, the data collecting unit 2 acquires the configuration information and the command logs of the information processing system as the management target, and registers the acquired configuration information and command logs in a configuration information/command log management table within the management apparatus 10.

In the working example, the management apparatus 10 further includes a wrapper command management table 104. Moreover, the management apparatus 10 includes, generically as the wrapper command processing unit 100, a configuration information/command log comparing unit 101, a wrapper command generating unit 102 and a wrapper command executing unit 103. The management apparatus 10 executes a computer program on a main storage device as, e.g., the wrapper command processing unit 100, the configuration information/command log comparing unit 101, the wrapper command generating unit 102 and the wrapper command executing unit 103.

<<Configuration Information/Command Log Comparing Unit>>

The configuration information/command log comparing unit 101 reads the command logs and the CIs, checks the command parameters with the attribute values of the configuration information, and thus generates a parameter acquiring path candidate list. The configuration information/command log comparing unit 101 is one example of a unit to read the configuration information and log information containing the commands executed by the respective information processing devices.

<<Wrapper Command Generating Unit>>

The wrapper command generating unit 102 generates the wrapper command from the parameter acquiring path candidate list generated by the configuration information/command log comparing unit 101, and registers the generated wrapper command in the wrapper command management table 104.

Further, the wrapper command generating unit 102 generates the uniform rule and the representative rule, and registers the generated rules respectively in the wrapper command management table 104.

Moreover, the wrapper command generating unit 102 makes a determination as to the inheritance of the wrapper command, and registers the CI added to the sibling CIs in the wrapper command management table 104.

<<Wrapper Command Executing Unit>>

The wrapper command executing unit 103 searches for the servers with the wrapper command being executable by making use of the wrapper command management table 104.

Furthermore, the wrapper command executing unit 103 executes preventing a malfunction before executing the wrapper command. To be specific, the wrapper command executing unit 103 makes a determination about the execution of the wrapper command, and deletes a server not satisfying an executing condition from the wrapper command management table.

<<Configuration of Hardware>>

Figure 26:
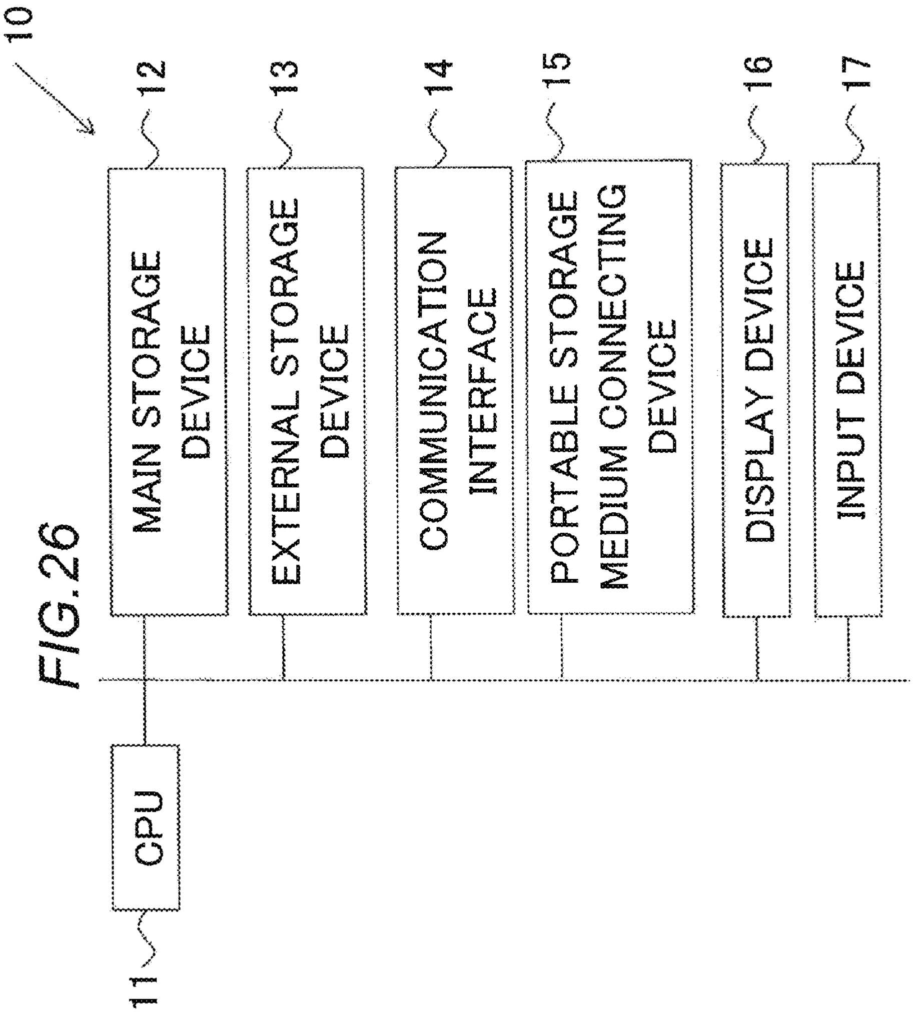
FIG. 26 is a diagram illustrating a hardware configuration of the management apparatus.

FIG. 26 illustrates a configuration of hardware of the management apparatus 10. The management apparatus 10 includes a CPU (Central Processing Unit) 11, a main storage device 12, an external storage device 13, a communication interface 14, a portable storage medium connecting device 15, a display device 16, an input device 17, etc.

The CPU 11 executes a computer program deployed in an executable manner on the main storage device 12, thereby providing functions of the management apparatus 10. The CPU 11 may be configured to include, without being limited to a single core, a plurality of cores.

The main storage device 12 stores the computer program executed by the CPU 11 and with data etc processed by the CPU 11. The main storage device 12 may be configured to include a nonvolatile ROM (Read Only Memory) and a volatile DRAM (Dynamic Random Access Memory). The external storage device 13 is exemplified by a hard disk driven by a hard disk drive, a solid-state drive (SSD) using a flash memory, and so on. The external storage device 13 is stored with the computer program deployed on the main storage device 12 or the data etc processed by the CPU 11.

The communication interface 14 is also called a NIC (Network Interface Card). The communication interface 14 is, e.g., a LAN (Local Area Network) interface. The portable storage medium I/O device 15 is an Input/output device such as a CD (Compact Disc), a DVD (Digital Versatile Disk), a Blu-ray disc and a flash memory card.

The display device 16 is exemplified such as a liquid crystal display and an electroluminescence panel. The display device 16 is connected to the CPU 11 via an interface. The interface is exemplified by a graphic module such as VGA (Video Graphics Array) and an interface such as DVI (Digital Visual Interface). The input device 17 is an input device such as a keyboard, a mouse a touch panel and an electrostatic pad.

Note that FIG. 26 illustrates a single computer as the management apparatus 10. The management apparatus 10 may also be a system including a plurality of computers allotting and thus executing processes in cooperation with each other. In this case, it does not mean that there is a limit to a physical distance between the plural computers.

<Example of Data>

FIG. 27 illustrates the configuration information (CI). The configuration information is collected by the data collecting unit 2 from the information processing system set as a management target and registered in the database such as CMDB. The configuration information contains records each having values registered in, e.g., a "GID" field, a "name of type" field, a "relationship" field, an "attribute" field and a "collecting time" field. In FIG. 27, the record itself is also said to be the configuration information (CI). An aggregation of the registered records is also said to be a set of configuration information.

The "GID" field is stored with identifying information for identifying the configuration element associated with each record of the configuration information (CI). Herein, the configuration element represents each device of the management target information processing system. Accordingly, the GID is unique in the management target information processing system throughout. Further, the GID can be said to be information for uniquely identifying the CI.

The "name of type" field is stored with a name of a device type. The name of the device type is a name of the configuration element of the management target information processing system, and represents a type etc of the configuration element associated with each record. For example, the name of device type is exemplified such as the server, the physical server, the tenant, the island and the data center. Further, the tenant or the island is defined as a generic name of device type given to an aggregation of plural servers.

The "relationship" field is stored with information becoming "Relation" of the CI. In the example of FIG. 27, the "relationship" field is stored with the GIDs (referent GIDs) of other CIs of referents. The referent GID is the GID of the record (CI) in a hierarchical relationship, which is referred to from the record (CI) of a referrer. The management apparatus searches for the GIDs described in the relationship, thereby recognizing the hierarchical relationship of the configuration information.

The "attribute" field is stored with definitions of name of attributes and attribute values possessed by the respective configuration elements. In the working example, a plurality of attributes can be defined in a format such as "attribute name=attribute value" in the "attribute" field.

The "collecting time" field is stored with date/time when the record is registered. The collecting date/time can be also said to be date/time when attributes of the record are collected.

FIG. 28 illustrates a command log management table. The command log management table is stored with an aggregation of the command logs collected by the data collecting unit 2 from the management target information processing system. The command log management table is stored in the database such as the CMDB. The command log management table contains records each having values registered in, e.g., a "command" field, a "parameter 1" field, a "parameter 2" field, an "execution server" field, an "execution time" field.

Note that FIG. 28 illustrates a case of having the two parameter fields (parameter 1, parameter 2). It does not, however, mean that the number of the fields stored with the parameters in the command log management table is limited to "2". For instance, the number of the parameter fields may be a number corresponding to a maximum parameter count in the commands executed in the management target information processing system. Further, for example, the number of the parameter fields may also be a number corresponding to a maximum parameter count in the commands becoming targets for generating the wrapper command. It is to be noted that the management apparatus 10 may be provided with the command log management tables which are different for every parameter count of the commands.

The "command" field is stored with names of the commands executed in the servers etc within the management target information processing system. The "parameter 1" field and the "parameter 2" field are stored with parameter values specified by the respective commands. The "execution server" field is stored with pieces of identifying information for identifying the servers with the commands being executed. FIG. 28 illustrates an example of registering IP addresses in the "execution server" field. It does not, however, mean that the value set in the "execution server" field is limited to the IP address, and the value may be, for instance, a MAC (Media Access Control) address, a name of a node on the network, etc. The "execution time" field is stored with date/time when the command is executed.

FIG. 29 illustrates a parameter acquiring path candidate list. Each of records of the parameter acquiring path candidate list contains a definition of the path for the configuration information/command log comparing unit 101 to acquire the parameter with respect to each of the commands becoming candidates of the wrapper command. As already explained in FIG. 11, the management apparatus 10 (wrapper command generating unit 102) acquires the command and the parameter from the command log stored in the command log management table in FIG. 29, and generates the wrapper command concretely by specifying the parameter acquiring path in place of the parameter. Each of the records of the parameter acquiring path candidate list contains a description of each parameter acquiring path with respect to each of the commands of the command log. The management apparatus 10 generates the wrapper command when obtaining the same acquiring path with samples of a predetermined number, e.g., 50 or larger number of commands on the basis of the parameter acquiring path candidate list.

As in FIG. 29, the parameter acquiring path candidate list contains records each having values registered in a "command" field, a "parameter 1" field, a "parameter 2" field, a "parameter 2 acquiring path" field, a "parameter 2 acquiring Relation count" field, an "execution server" field and an "execution time" field.

Herein, the "command" field is stored with names of the commands acquired from the command log. The "parameter 1" field and the "parameter 2" field are respectively stored with parameters specified by the commands. In these parameters, in the example of FIG. 29, a value of the parameter 1 is a fixed parameter ("–s" etc). Further, a value of the parameter 2 is a variable parameter (the identifying information of the server etc).

The "parameter 2 acquiring path" field is stored with a path for acquiring the value of the parameter 2. For example, the path is defined such as "server/relationship/server/@IP address" by use of the relationships of the configuration information in FIG. 27. The definition of "server/relationship/server/@IP address" implies using the IP address given in the configuration information (referent server CI) of the referent server that is specified as the attribute value of the attribute "relationship", e.g., in the configuration information (server CI) of the server with the command being executed. However, the parameter acquiring path in FIG. 29 is one example, and it does not mean that the specification is limited to the format in FIG. 29.

A value given in the "parameter 2 acquiring Relation count" field specifies the number of relationships that are referred to till reaching the value in the case of tracing the parameter acquiring paths. The "execution server" field and the "execution time" field are the same as those of the command log management table in FIG. 28.

Note that the parameter 2 is the parameter of which the value is variable, and the acquiring path of the parameter value is described with respect to the parameter 2. It does not, however, mean that the parameter 2 acquiring path list is limited to the structure in FIG. 29. For example, it does not mean that the number of parameters is limited to "2". Moreover, it does not mean that the parameter having the variable value is limited to the parameter 2. It does not mean that the number of the parameter(s) having the variable value is limited to "1". For instance, in the case of generating the wrapper command with respect to the commands each having two or more parameters with their values being variable, the management apparatus 10 may provide the fields such as "parameter", "parameter acquiring path" and "parameter acquiring Relation count" by the number of the parameters having the variable values. Note that the management apparatus 10 may also provide the parameter acquiring path candidate lists that have different structures corresponding to the number of the parameters having the variable values.

FIG. 30 illustrates a wrapper command management table 104. The wrapper command management table 104 is a table registered with the wrapper command generated by the wrapper command generating unit 102. The wrapper command management table 104 contains a value of "GID", a value of "wrapper command ID", a value of "command" and sets of values ("parameter", "type", "value"). Note that two sets of values ("parameter", "type", "value") are specified with respect to one command (GID) in FIG. 30, however, it does not mean that the number of value sets ("parameter", "type", "value") with respect to one command is limited to "2".

The "GID" field is, as described in the configuration information of FIG. 27, stored with pieces of identifying information of the configuration elements (devices such as the servers) of the management target information processing system. The "wrapper command ID" field is stored with information for uniquely identifying each of the records of the wrapper command management table 104. The "command" field is stored with a name of each of the commands acquired from the command log.

The parameters of the commands with respect to the wrapper commands are specified in the ("parameter", "type", "value") set fields. In these fields, the "parameter" field is stored with pieces of information for identifying the parameters such as parameter 1 and parameter 2. Furthermore, the "type" field is stored with types of the parameters. The types of the parameters are, e.g., a fixed value, acquiring path information, etc. Moreover, the "value" field is stored with parameter values. However, if the information stored in the "type" field is the "acquiring path information", the "value" field is stored with the acquiring path for acquiring the parameter from the configuration element specified by the GID. The acquiring path is defined by, e.g., "server/relationship/physical server/@IP address" etc.

FIG. 31 illustrates a uniform rule table. The uniform rule table is a table containing definitions of the keys for determining the sibling CIs with respect to the individual wrapper commands. The wrapper command generating unit 102, when determining the sibling CIs or executing the inheritance (of the wrapper command), refers to the uniform rule table.

The uniform rule table includes a "GID" field, a "wrapper command ID" field, a "target" field and a "key for determining sibling CI" field. In these fields, the "GID" field, and the "wrapper command ID" field are the same as those in the wrapper command management table in FIG. 30, and hence their descriptions are omitted. The configuration element on which the execution of the wrapper command is targeted is specified in the "target" field. A plurality of configuration elements (GIDs) is specified in the "target" field, in which case the specified configuration elements connote the configuration elements having the relationship of the sibling CIs with each other. In the example of FIG. 31, the GIDs of the configuration elements are specified in the "target" field. Further, the "key for determining sibling CI" field is stored with the keys for determining the sibling CIs.

FIG. 32 illustrates a representative rule table. The representative rule table contains definitions of paths each extending from the CI of the highest-order hierarchy down to the representative CI of each wrapper command. As in FIG. 32, the representative rule table includes a "GID" field, a "wrapper command ID" field, a "target" field and a "relational information" field. In these fields, the "GID" field, and the "wrapper command ID" field are the same as those in the wrapper command management table in FIG. 30, and hence their descriptions are omitted. The "target" field is stored with the representative CIs of the respective wrapper commands. The GID of the configuration element associated with the representative CI is set in the example of FIG. 32. Further, the "relational information" field is stored with the paths each extending from the CI of the highest-order hierarchy down to the representative CI of each wrapper command. In the example of FIG. 32, the path extending to a tenant (GID002) is defined with the "data center" CI serving as the highest-order hierarchy.

<Processing Flow>

FIGS. 33-39 illustrate flowcharts of processes executed in the management apparatus 10. The CPU 11 of the management apparatus 10 executes, as the wrapper command generating unit 102, the process in FIG. 33 in accordance with the computer program deployed in the executable manner on the main storage device 12. The CPU 11 of the management apparatus 10 executes, as the wrapper command executing unit 103, the process in FIG. 34 in accordance with the computer program deployed in the executable manner on the main storage device 12.

Figure 33:
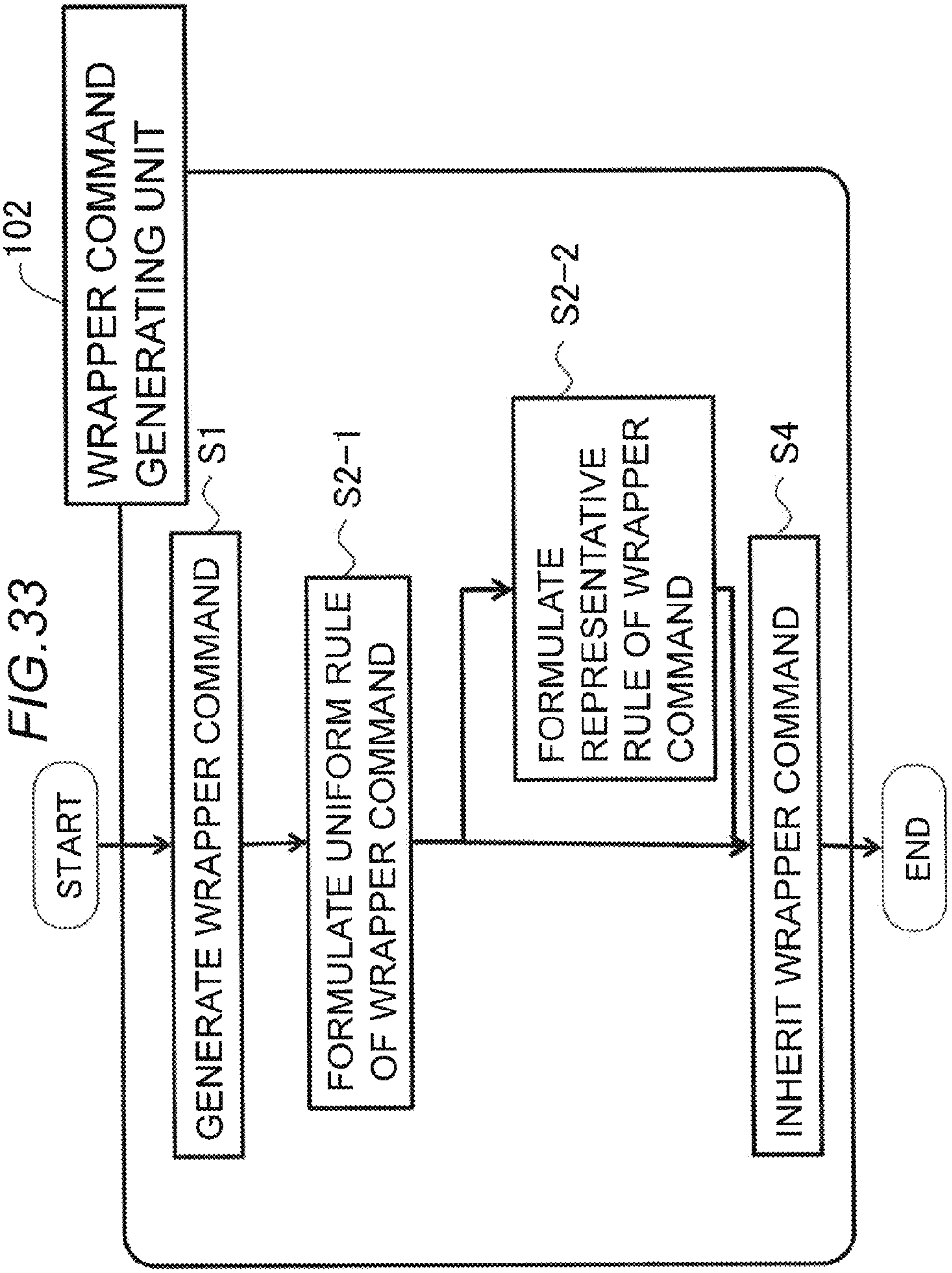
FIG. 33 is a flowchart illustrating a process when generating the wrapper command.

FIG. 33 is the flowchart depicting the processes when generating the wrapper command. In this process, the configuration information/command log comparing unit 101 and the wrapper command generating unit 102 execute generating the wrapper command (S1). Note that specific processes of generating the wrapper command will be described later on according to FIGS. 35 and 36.

Next, the wrapper command generating unit 102 executes formulating the uniform rule of the wrapper command (S2-1). Subsequently, the wrapper command generating unit 102, if the representative CI exists in each wrapper command, executes formulating the representative rule (S2-2). The formulation of the uniform rule and the formulation of the representative rule will be described later on according to FIG. 37. Next, the wrapper command generating unit 102 executes the inheritance of the wrapper command (S4). The inheritance of the wrapper command will be explained later on according to FIG. 38.

Figure 34:
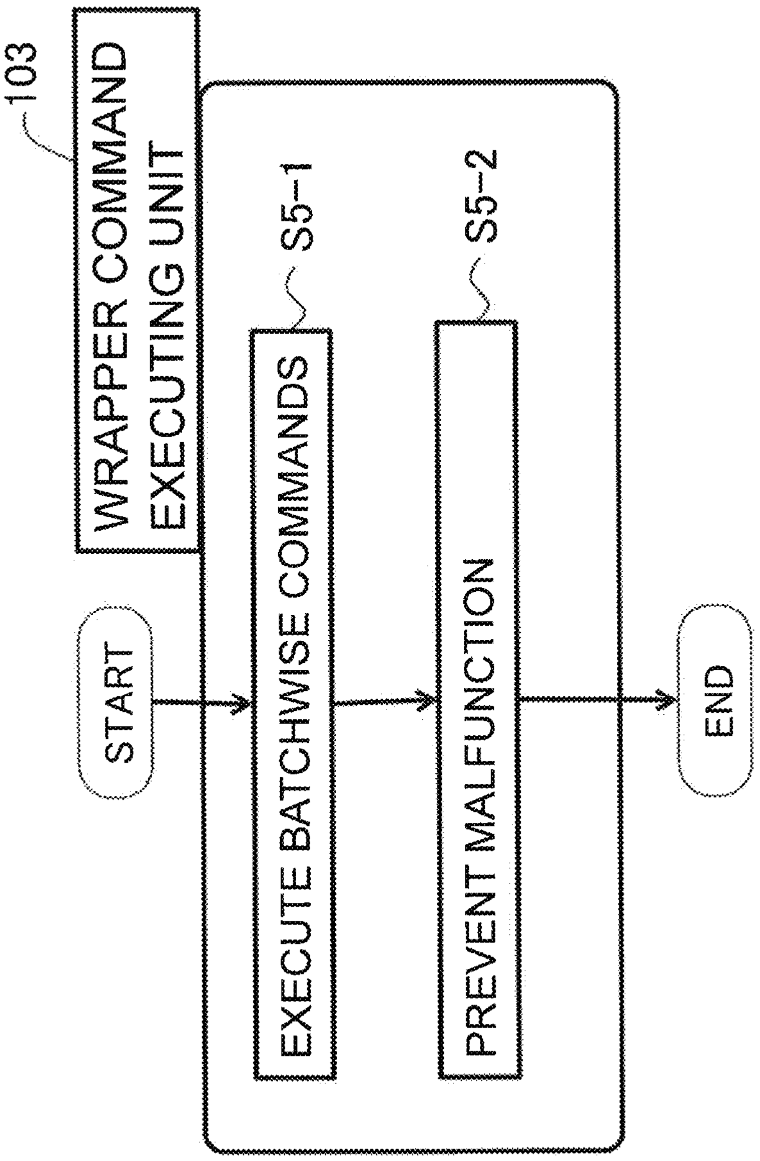
FIG. 34 is a flowchart illustrating a process of a wrapper command executing unit.

FIG. 34 is the flowchart illustrating a process of the wrapper command executing unit 103. In this process, at first, the wrapper command executing unit 103 executes batchwise the commands (S5-1). However, the wrapper command executing unit 103 executes preventing a malfunction together with the batchwise execution of the commands (S5-2). An in-depth description of the process of the wrapper command executing unit 103 will be made later on according to FIG. 39.

Figure 35:
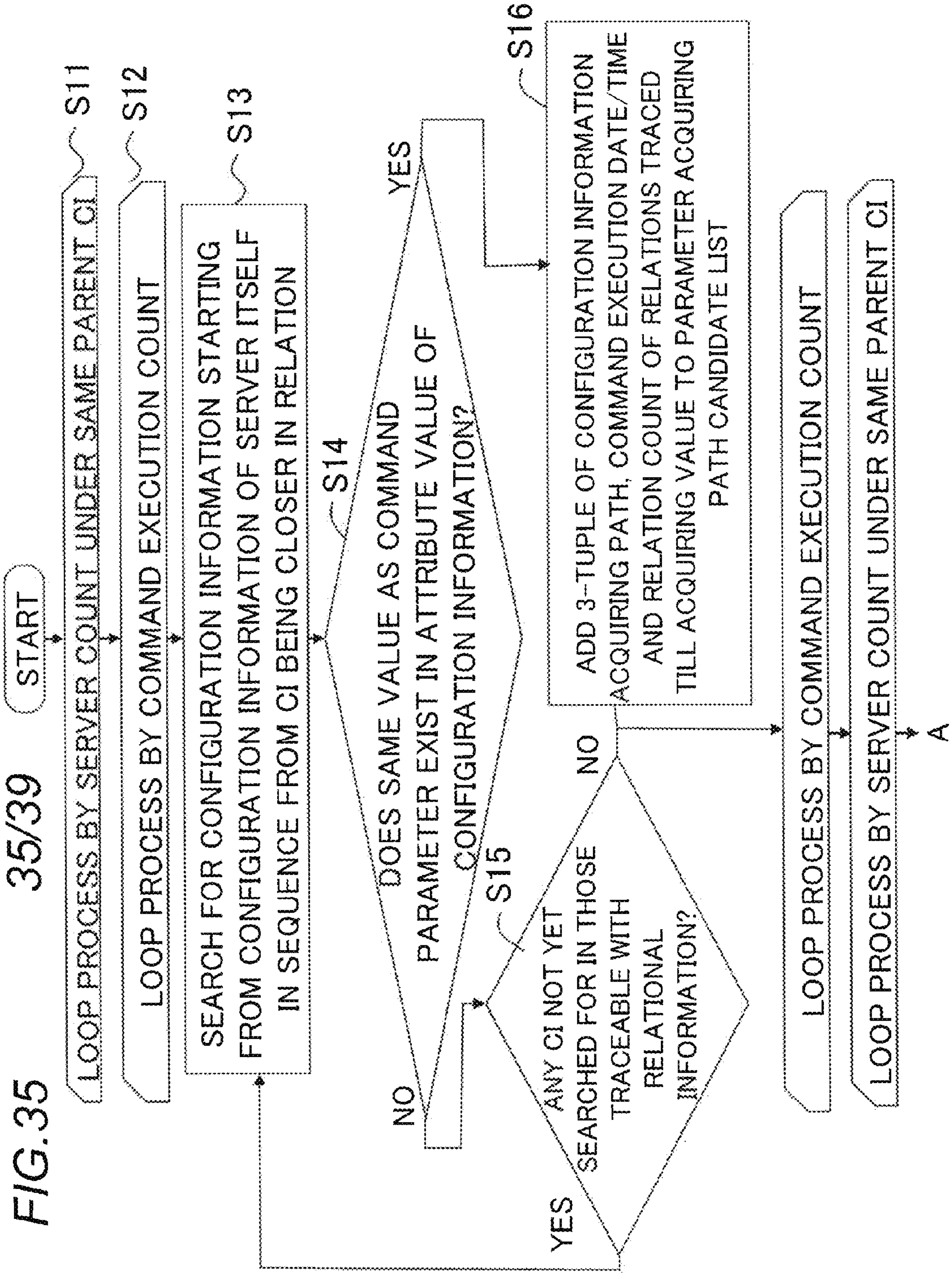
FIG. 35 is a flowchart illustrating details of a process of a configuration information/command log comparing unit.

FIG. 35 illustrates details of the process of the configuration information/command log comparing unit 101. FIG. 35 illustrates a wrapper command generating process with respect to the configuration elements, e.g., the servers associated with the child CIs under one parent CI. Accordingly, the wrapper command generating unit 102 can generate the wrapper command about the configuration elements associated with the CIs belonging to the respective hierarchies by repeating the process while changing the parent CI in the reference relationship of the CIs of a plurality of hierarchies in terms of different viewpoints illustrated in FIG. 10.

Further, FIG. 35 illustrates the wrapper command generating process with respect to one command. Accordingly, the configuration information/command log comparing unit 101 and the wrapper command generating unit 102 can assemble the plural commands into the wrapper command, which are executed in the management target information processing system, by repeating the process while changing the command executed in the management target information processing system.

In FIG. 35, the configuration information/command log comparing unit 101 executes repetitions by the number of the servers associated with the child CIs under the same parent CI (S11). Further, the configuration information/command log comparing unit 101 executes the repetitions by the number of executions of the commands in the servers set as the processing targets at the present (S12).

Then, the configuration information/command log comparing unit 101 acquires one of results of the executions of the commands from the command log of the processing target servers at the present. Subsequently, the wrapper command generating unit 102 obtains the parameter and execution date/time of each of the acquired commands. Then, the configuration information/command log comparing unit 101 searches for the configuration information of the server associated with the execution date/time of the command in order to compare the command parameter with the configuration information of the server associated with the execution date/time of the command (S13). Note that the process in S13 is repeatedly executed based on the determination in S15 with respect to, in addition to the server set as the processing target at the present, other servers being close in terms of the reference relationship (Relation) from this processing target server at the present. Moreover, as viewed from the processing target server at the present, the reference relationship (Relation) traced till reaching the configuration information searched for in S13 is called an acquiring path. The acquiring path is, however, a path up to the configuration information coincident with the parameter value and is therefore called also a configuration information acquiring path. Furthermore, as a result of the process in FIG. 36, the acquiring path used for the wrapper command is called a parameter acquiring path. The configuration information/command log comparing unit 101 executes the process in S13 by way of one example of a unit to read the configuration information and the log information containing the commands executed in each of the information processing apparatuses.

Then, the configuration information/command log comparing unit 101 determines whether the same value as the command parameter exists in the attributes of the searched configuration information or not (S14). If determining in S14 that there exists the attribute of the configuration information that takes the same value as the command parameter, the configuration information/command log comparing unit 101 assembles three items of data such as the configuration information acquiring path, the command execution date/time and the acquiring path reference relationship (Relation) count as 3-tuple data, and adds this 3-tuple data to the parameter acquiring path candidate list (S16).

Whereas if determining in S14 that there does not exist the attribute of the configuration information that takes the same value as the command parameter, the configuration information/command log comparing unit 101 determines whether or not there exists an unsearched CI in those traceable along the reference relationship (Relation) of the CI associated with the processing target server at the present (S15). If determining in S15 that the unsearched CI exists, the wrapper command generating unit 102 loops the control back to S13, then searches for another CI being close next at the hierarchy of the reference relationship (Relation), and iterates the processes from S13 onward. Whereas if determining in S15 that the unsearched CI does not exist, the wrapper command generating unit 102 repeats the repetitions in S12 and further the repetitions in S11.

Figure 36:
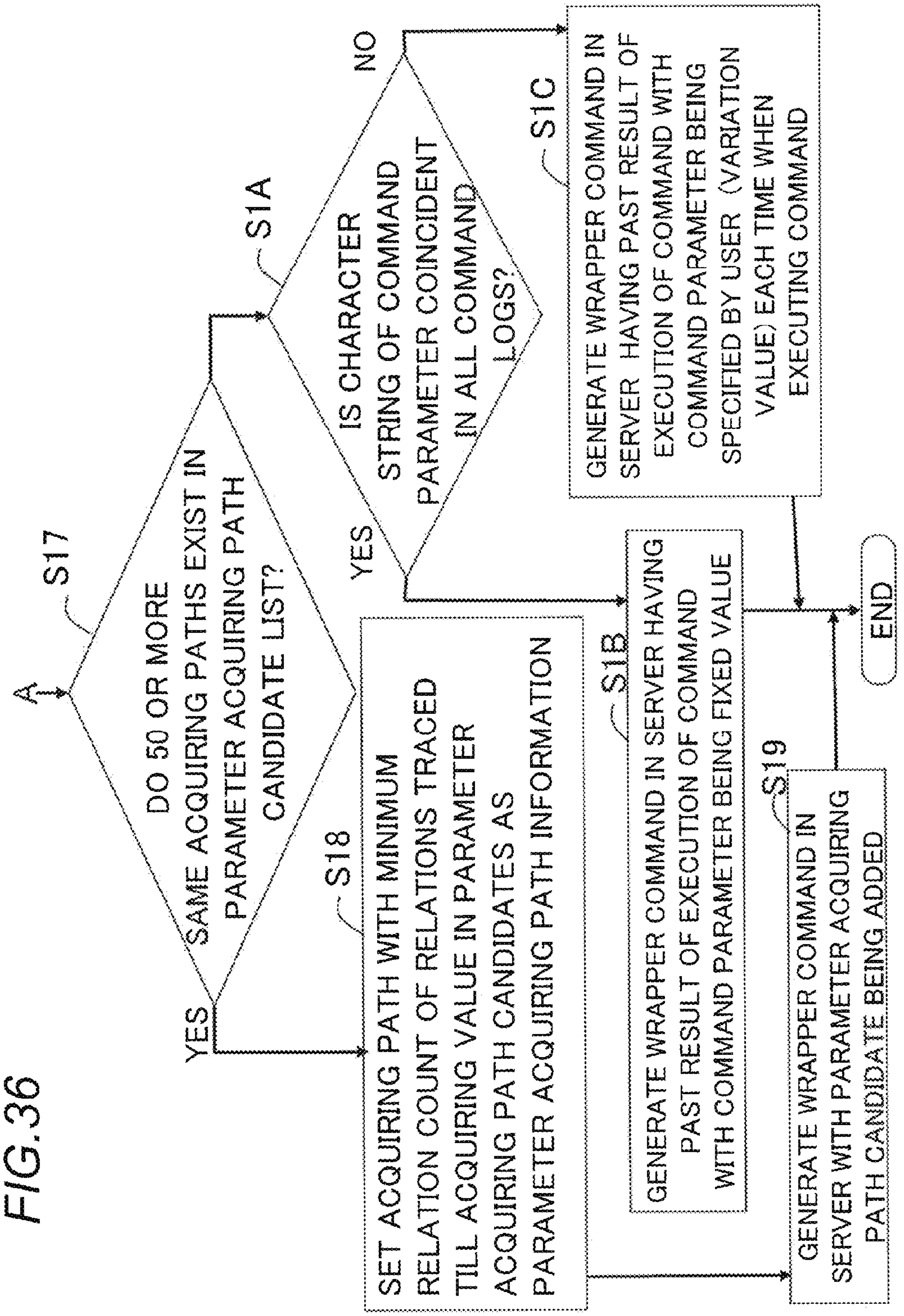
FIG. 36 is a flowchart illustrating a process of a wrapper command generating unit.

FIG. 36 is a flowchart illustrating a process of the wrapper command generating unit 102. The wrapper command generating unit 102 executes, after the process of the configuration information/command log comparing unit 101 depicted in FIG. 35, the process illustrated in FIG. 36. In this process, the wrapper command generating unit 102 determines whether or not a predetermined number, e.g., 50 or larger number of same acquiring paths exist in the parameter acquiring path candidate list acquired by the repetitions in S11 and S12 (S17).

If it is determined in S17 that the predetermined number of same acquiring paths exist in the parameter acquiring path candidate list, the wrapper command generating unit 102 defines, as the parameter acquiring path information, the acquiring paths with a minimum reference relationship (Relation) count of the relationships traced till obtaining the value (the attribute in the configuration information) in parameter acquiring path candidates, and stores this parameter acquiring path information in the main storage device 12 (S18). The wrapper command generating unit 102 executes the processes in S17 and S18 by way of one example of a unit to check a parameter value specified by the first type command with the configuration information of each of the one or more information processing apparatuses and to extract the path information.

Then, the wrapper command generating unit 102 generates the wrapper command in the processing target server with the parameter acquiring path information being defined, and stores the wrapper command information in the wrapper command management table (S19). The wrapper command generating unit 102 executes the process in S19 by way of one example of a unit to generate a second type command with the path information being specified in the first type command in place of the parameter value and to allocate the second type command to the first information processing apparatus. Whereas if it is determined in S17 that the predetermined number of same acquiring paths do not exist in the parameter acquiring path candidate list, the wrapper command generating unit 102 determines whether a character string of the command parameter is coincident with those of all the command logs or not (S1A). If determining in S1A that the character string of the command parameter is coincident with those of all the command logs, the wrapper command generating unit 102 sets this command parameter to be a fixed value. Then, the wrapper command generating unit 102 generates the wrapper command with the fixed value in the server having a past result of the execution of the command, i.e., in the processing target server at the present, and stores the wrapper command information in the wrapper command management table (S1B).

Whereas if determining in S1A that the character string of the command parameter is not coincident with those of all the command logs, it can be considered that the parameter of the command in processing underway at the present is specified by the user each time when executing the command. Such being the case, the wrapper command generating unit 102 sets the command parameter to be a variation value. Then, the wrapper command generating unit 102 generates the wrapper command with the variation value in the server having the past result of the execution of the command, i.e., in the processing target server at the present, and stores the wrapper command information in the wrapper command management table (S1C).

Figure 37:
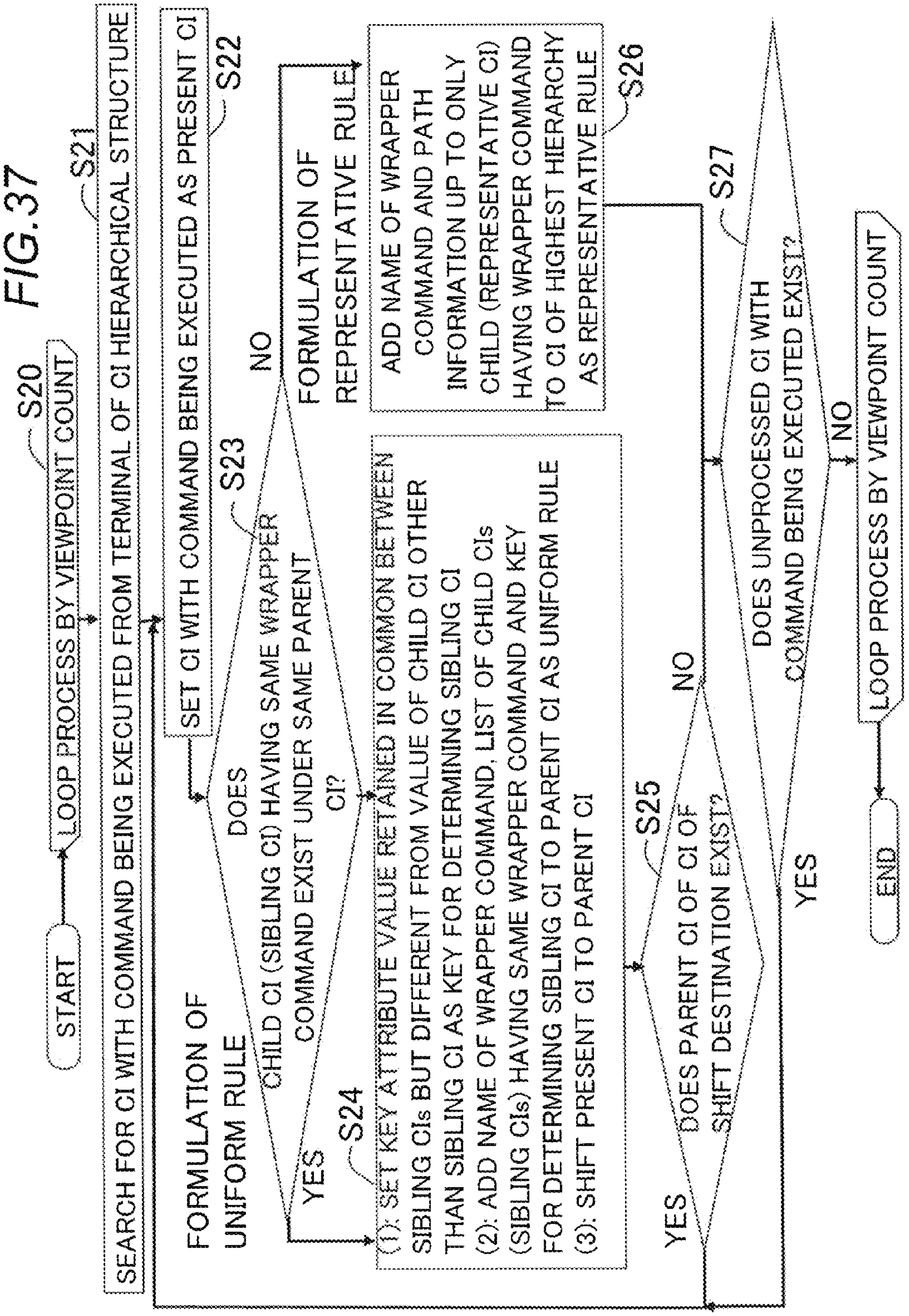
FIG. 37 is a flowchart illustrating details of processes of the formulation of uniform rule and the formulation of representative rule.

FIG. 37 illustrates details of a uniform rule formulation process and a representative rule formulation process. In these processes, the wrapper command generating unit 102 executes repetitions by the number of viewpoints (S20).

The wrapper command generating unit 102 searches for the CIs associated with the configuration elements with the commands being executed in the sequence from the CI of the lowest hierarchy in the hierarchical structure of the reference relationships (Relations) of the CIs. For example, it may be sufficient that the wrapper command generating unit 102 determines whether or not the wrapper command executed in the CI is defined in the wrapper command management table in the sequence from the CI of the lowest hierarchy (S21). Then, the wrapper command generating unit 102 sets the CI associated with the configuration element with the command being executed as the present CI (S22).

Then, the wrapper command generating unit 102 obtains the parent CI of the present CI (which will hereinafter be termed a present parent CI). Subsequently, the wrapper command generating unit 102 determines whether or not there exist CIs (which will hereinafter be termed sibling CIs) associated with the configuration elements having the same wrapper command under the present parent CI (S23).

If determining in S23 that the sibling CIs exist, the wrapper command generating unit 102 executes formulating the uniform rule (S24). (1): The wrapper command generating unit 102 sets, as a key for determining the sibling CI, an attribute value held in common between the sibling CIs but different from the values of the child CIs other than the sibling CIs. (2): The wrapper command generating unit 102 adds, to the parent CI, a wrapper command name, a list of the child CIs (sibling CIs) having the same wrapper command and the keys for determining the sibling CIs as the uniform rule. (3): The wrapper command generating unit 102 shifts to the present parent CI. Namely, the wrapper command generating unit 102 sets the present parent CI as the present CI and shifts to a hierarchy ranked higher by one level. The wrapper command generating unit 102 executes the processes in S23 and S24 by way of one example of a setting unit to set a second type command in referrer configuration information. Furthermore, the wrapper command generating unit 102 executes the process in S24 by way of one example of a unit to set a tuple of common attribute values in the referrer configuration information.

Next, the wrapper command generating unit 102 determines whether there exists the parent CI of the CI of the shift destination or not (S25). If it is determined in S25 that the parent CI exists, the wrapper command generating unit 102 loops the control back to S22. Then, the wrapper command generating unit 102 executes the processes from S22 onward with respect to the child CIs under the present parent CI of the shift destination. Whereas if it is determined in S25 that the parent CI does not exist, the wrapper command generating unit 102 advances the control to S27. The wrapper command generating unit 102 executes the processes in S22, S24 and S25 by way of one example of a unit to repeat (the process).

Moreover, if determining in S23 that the sibling CIs do not exist, the wrapper command generating unit 102 executes formulating the representative rule (S26). To be specific, the wrapper command executing unit 103 adds, to the CI of the highest-order hierarchy, the wrapper command name and the path information of the paths leading to the only child CI (representative CI) having the wrapper command as the representative rule (S26). Thereafter, the wrapper command generating unit 102 advances the control to S27. The wrapper command generating unit 102 executes the process in S26 by way of one example of a unit to set reference information in predetermined configuration information for referring to each of plural sets of referent configuration information in which each second type command is set. Further, the CI of the highest-order hierarchy is one example of the predetermined configuration information. Still further, the path information, set as the representative rule, of the paths leading to the only child CI (representative CI) having the wrapper command is one example of the reference information.

Then, the wrapper command generating unit 102 determines whether or not there exists an unprocessed CI in the CIs associated with the configuration elements with the commands being executed in the hierarchical structure of the CIs in terms of the present viewpoint (S27). If it is determined in S27 that the unprocessed CI exists, the wrapper command generating unit 102 loops back the control to S22. Whereas if it is determined in S27 that the unprocessed CI does not exist, the wrapper command generating unit 102 executes the repetitions by the number of the viewpoints and thereafter finishes processing.

Figure 38:
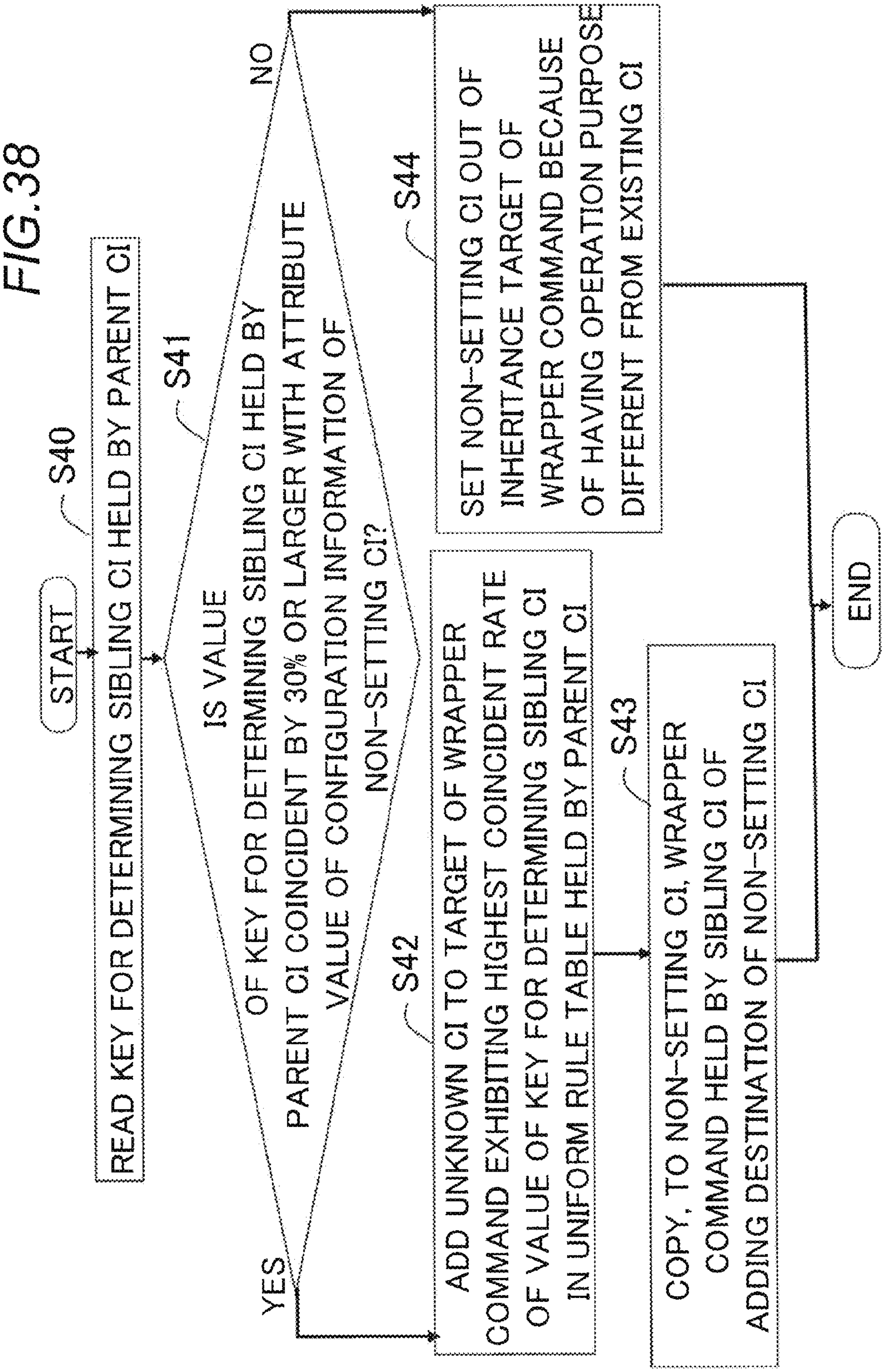
FIG. 38 is a flowchart illustrating details of the inheritance of the wrapper command.

FIG. 38 illustrates details of the inheritance of the wrapper command. This process is applied to, e.g., a CI with the wrapper command being still undefined in newly added CIs. In FIG. 38, the CI with the wrapper command being still undefined is called a non-setting CI. In this process, the wrapper command generating unit 102 reads the key for determining the sibling CI from the parent CI (S40). The wrapper command generating unit 102 executes the process in S40 as a unit to read the tuple of common attribute values.

Then, the wrapper command generating unit 102 determines whether or not the attribute value of the configuration information of the non-setting CI is coincident by a predetermined value, e.g., 30% or more with the value of the key for determining the sibling CI held by the parent CI (S41). The wrapper command generating unit 102 executes the process in S41 by way of one example of a unit to extract another referent configuration information containing a predetermined or larger number of common attribute values.

If it is determined in S41 that the attribute value of the configuration information of the non-setting CI is coincident by the predetermined or larger value with the value of the key for determining the sibling CI held by the parent CI, the wrapper command generating unit 102 adds the non-setting CI to the target of the wrapper command exhibiting a highest ratio of the coincident value of the key for determining the sibling CI in a uniform rule table held by the parent CI (S42). Then, the wrapper command generating unit 102 copies, to the non-setting CI, the wrapper command held by the sibling CI of an adding destination of the non-setting CI (S43). The wrapper command generating unit 102 executes the processes in S42 and S43 as an example of a unit to allocate a second type command.

Whereas if the attribute value of the configuration information of the non-setting CI is not coincident by the predetermined or larger value with the value of the key for determining the sibling CI held by the parent CI, it is considered that the non-setting CI has an operation purpose different from those of the existing CIs under the parent CI. Therefore, the wrapper command generating unit 102 excludes this non-setting CI from the inheritance target CIs of the wrapper command.

Figure 39:
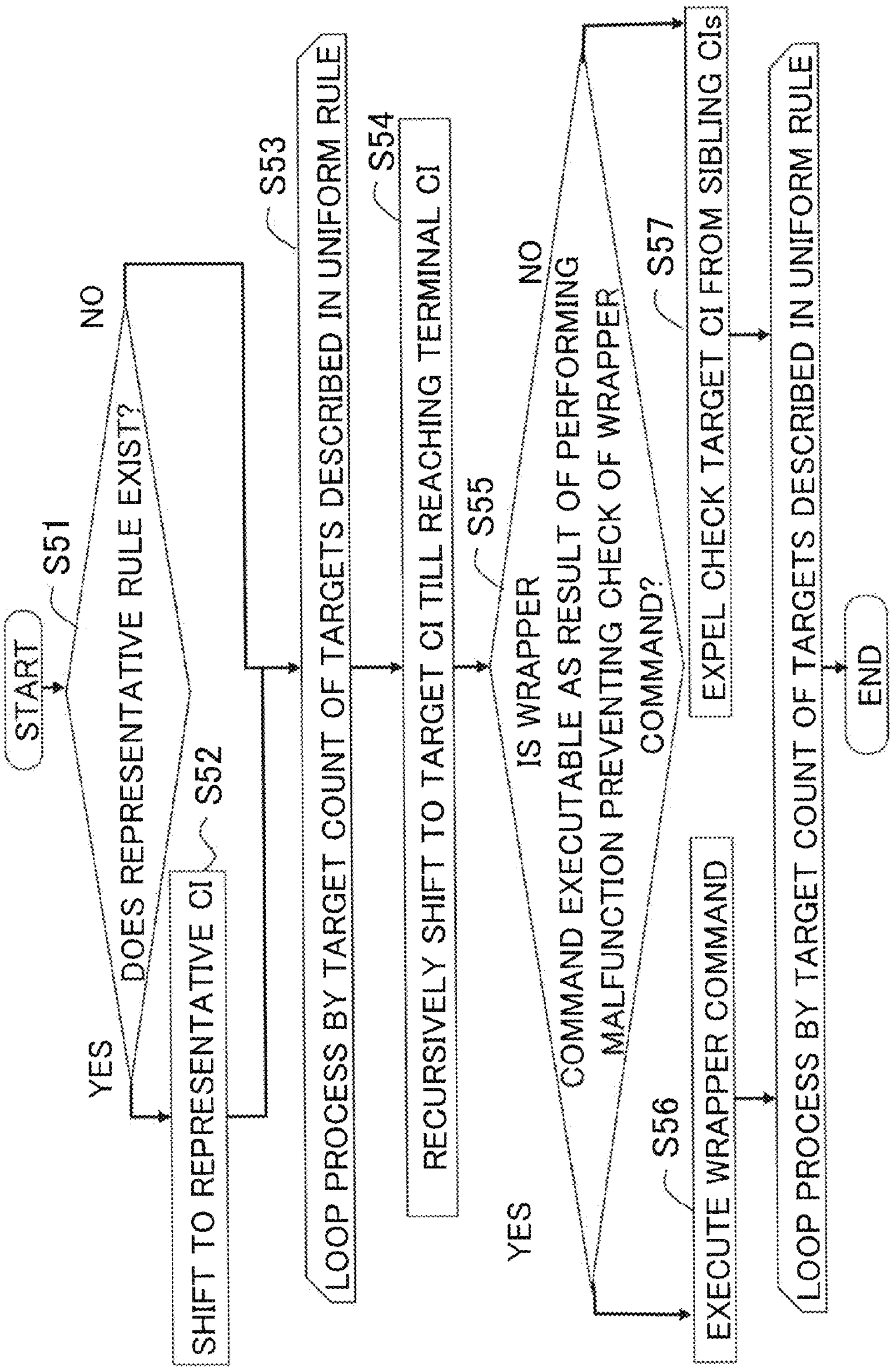
FIG. 39 is a flowchart illustrating details of executing batchwise the commands and prevention of a malfunction.

FIG. 39 illustrates the batchwise execution of the commands and details of preventing the malfunction. The wrapper command executing unit 103, when accepting, e.g., an instruction of executing batchwise the wrapper commands from the manager, executes a process in FIG. 39.

In this process, the wrapper command executing unit 103 determines whether or not there exists the representative rule of the wrapper commands undergoing the designation of the batchwise execution (S51). If the representative rule exists, the wrapper command executing unit 103 shifts to the representative CI (S52). Then, the wrapper command executing unit 103 executes repeating the following processes by the number of targets described in the uniform rule in the representative CI (S53).

Subsequently, the wrapper command executing unit 103 recursively shifts to the target CI till reaching a CI of the terminal (S54). Then, in the target CI, the wrapper command executing unit 103 executes a malfunction preventive check of the target CI. Subsequently, the wrapper command executing unit 103 determines whether or not the wrapper command may be executed as a result of the malfunction preventive check of the target CI (S55). The wrapper command executing unit 103 executes the process in S55 by way of one example of a unit to collect a tuple of present values against the tuple of common attribute values. Further, the wrapper command executing unit 103 executes the process in S55 by way of one example of a unit to compare the tuple of common attribute values with the tuple of present values.

As a result of the determination made in S55, if the wrapper command may be executed, the wrapper command executing unit 103 executes the wrapper command (S56). More specifically, the wrapper command executing unit 103 acquires the attributes of the configuration information from the parameter acquiring path specified in the wrapper command, and interprets the wrapper command into the normal commands. Then, the wrapper command executing unit 103 remotely executes, e.g., the command on the server associated with the target CI. Further, the wrapper command executing unit 103 executes the process in S56 by way of one example of a unit to acquire the parameter value and a unit to execute the second type command.

Whereas if the wrapper command cannot be executed as a result of the determination made in S55, the wrapper command executing unit 103 expels the target CI out of the sibling CIs. To be more specific, the wrapper command executing unit 103 deletes the target CI from the definitions of the sibling CIs under the parent CI (S57). The wrapper command executing unit 103 executes the process in S57 by way of one example of a unit to exclude one information processing apparatus from an allocation target of the second type command.

<Effect of Working Example>

As discussed above, the management apparatus 10 enables the commands to be executed batchwise over the servers each performing the operation management activity. Namely, on the premise that the data collecting unit 2 collects the configuration information of the respective configuration elements and the command logs in the information processing system, the wrapper command generating unit 102 generates the wrapper command with respect to each of the configuration elements. The management apparatus 10 generates the wrapper commands and makes the definitions thereof in the parent CI of the hierarchical structure of the CIs, thereby unifying the operation management procedures pertaining to the plurality of configuration elements (servers etc) associated with the child CIs and enabling the workload of the management activity to be reduced. Furthermore, the management apparatus 10 registers, in the parent CI, the keys for determining the sibling CIs with respect to the sibling CIs generated in the way of being associated with the configuration elements with the common wrapper command being executed, whereby it is possible to easily execute the processes such as the determination of the sibling CIs and the inheritance for the unprocessed CIs. Namely, the management apparatus 10 can easily execute the determination of grouping the CIs into the sibling CIs and the inheritance of the wrapper command by utilizing the attributes being in common among the sibling CIs and distinguishable from other CIs under the parent CI as the keys for determining the sibling CIs.

The management apparatus 10 defines the representative rule in the CI of the highest-order hierarchy, whereby it is feasible to speed up the shift to the CI associated with the configuration element with the wrapper command being executed. The formulation of the uniform rule and the inheritance of the wrapper command enable the management apparatus 10 to distribute the wrapper commands to the servers each performing the operation management activity by the same rule over the operation hierarchy.

Moreover, the management apparatus 10 recursively processes the generation of the wrapper commands, the formulation of the uniform rule, etc with respect to the parent-to-child relationship of the CIs having the hierarchical structure. Accordingly, the management apparatus 10 can carry out batchwise the generation of the wrapper commands and the formulation of the uniform rule over the plurality of hierarchies while tracing the hierarchical structure of the CIs from the CI of the terminal toward the root.

In the generation of the wrapper commands, what the predetermined or larger number of same command parameters exist in the command log becomes the parameter acquiring candidate list (S14 in FIG. 35), whereby such a possibility can be enhanced that the commands between the plural configuration elements can be unified by the wrapper command. Further, the wrapper command generating unit 102 generates the wrapper command if a predetermined or larger number of same acquiring paths exist in the parameter acquiring candidate list (S17 in FIG. 36), and hence such a possibility can be further enhanced that the commands between the plural configuration elements can be unified by the wrapper command.

The management apparatus 10 executes the wrapper commands batchwise in the servers with the commands being executable without being aware of the difference between the operation environments from the highest-order hierarchy such as the data center etc in the hierarchical structure of the CIs. The management apparatus 10 performs the check for preventing the malfunction before executing the command. Accordingly, in a case where the configuration information is changed, the execution of the incorrect command can be restrained. Further, the configuration information of the CIs etc can be collected when the data collecting unit 2 such as the MDR conducts the operation management. Therefore, the management apparatus 10 can reduce the possibility of executing the incorrect command in such a case also that the change occurs in the configuration elements of the management target information processing system. For example, it may be sufficient that the data collecting unit 2 such as the MDR collects the configuration information at a predetermined cycle, at timing when the change occurs in the configuration or at timing when requested from the management apparatus 10, etc.

The management apparatus 10 can execute the processes in the working example by reducing the pre-definitions to the greatest possible degree because of inputting the command logs recorded when conducting the operation management activity and the configuration information automatically collected by the CMDB. With this contrivance, the management apparatus 10 expands an applied range of automation to a range in which the automation cannot be attained so far and decreases the number of operations, thus realizing improvements in activity cost and in activity quality.

In the present embodiment, when generating the wrapper command, the management apparatus 10 generates the wrapper command by changing over the hierarchical structure information of the CMDB to be utilized such as changing over the viewpoint of the activity, the viewpoint of the virtualization design, etc. Then, as described in S18 of FIG. 36, the wrapper command generating unit 102 acquires, as the parameter acquiring path information, the acquiring paths with the minimum reference relationship (Relation) count of the relationships traced till obtaining the value (the attribute in the configuration information) in the parameter acquiring path candidates. Hence, the management apparatus 10 can reduce the cost and a labor for acquiring the parameters when executing the wrapper commands.

Moreover, in the embodiment, the management apparatus 10, as illustrated in FIGS. 8, 10, 12, 14 and 15, hierarchizes and thus unifies the wrapper commands in a way that refers to the information of the CMDB. Therefore, the manager can also execute batchwise the commands from the configuration element associated with the highest-order CI. Further, the manager can also execute the command by selecting the configuration element associated with the low-order CI specified by the representative rule. Namely, the manager can execute batchwise the operation management commands, execute the operation management command by selecting the specified environment or execute the operation management command by selectively excluding the specified environment.

<Non-Transitory Computer-Readable Recording Medium>

A program for making a computer, other machines and devices (which will hereinafter be referred to as the computer etc) realize any one of the functions can be recorded on a non-transitory recording medium readable by the computer etc. Then, the computer etc is made to read and execute the program on this recording medium, whereby the function thereof can be provided.

Herein, the recording medium readable by the computer etc connotes a recording medium capable of accumulating information such as data and programs electrically, magnetically, optically, mechanically or by chemical action, which can be read by the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer. Further, a hard disc, a ROM (Read-Only Memory), etc are given as the recording mediums fixed within the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A management apparatus, comprising a memory; and a processor coupled to the memory and the processor configured to:

read configuration information of each of information processing apparatuses, which contains an attribute value of each of the information processing apparatuses and a reference relationship between the information processing apparatuses, and log information containing a first type command executed by each of the information processing apparatuses;

check a parameter value specified by the first type command with the configuration information of each of the information processing apparatuses;

extract path information indicating a relationship between first configuration information of a first information processing apparatus with the first type command being executed and second configuration information of a second information processing apparatus that contains an attribute value coincident with the parameter value specified by the first type command executed by the first information processing apparatus;

generate a second type command with the path information being specified in the first type command in place of the parameter value, the path information indicating the relationship between the first configuration information of the first information processing apparatus and the second configuration information of the second information processing apparatus; and allocate the second type command to the first information processing apparatus with the first type command being executed.

2. The management apparatus according to claim 1, the processor further configured to:

set, in referrer configuration information, the second type command allocated in common between a plurality of information processing apparatuses associated with plural sets of referent configuration information that are referred to from the referrer configuration information with respect to a reference relationship of the referrer configuration information and the plural sets of referent configuration information; and repeat, when the reference relationship is repeated over a plurality of hierarchies, a process to set the second type command in further next referrer configuration information of the plurality of hierarchies with respect to further next referrer configuration information and further next referent configuration information that is referred to from the next referrer configuration information.

3. The management apparatus according to claim 2, the processor further configured to set, in the referrer configuration information, a tuple of common attribute values that are contained in the plural sets of referent configuration information of a first group being referred to from the referrer configuration information but are not contained in another configuration information other than the plural sets of referent configuration information of the first group.

4. The management apparatus according to claim 3, the processor further configured to:

extract another referent configuration information containing a predetermined or larger number of common attribute values contained in the tuple of the common attribute values, the another referent configuration information being other than the first group and the another referent configuration information being referred to from the referrer configuration information; and allocate the second type command allocated in common between the plurality of information processing apparatuses associated with the plural sets of referent configuration information of the first group to another information processing apparatuses associated with the extracted another referent configuration information other than the first group.

5. The management apparatus according to claim 3, the processor further configured to:

collect a tuple of present values against the tuple of common attribute values from one information processing apparatus associated with one set of referent configuration information containing the tuple of common attribute values set in the referrer configuration information;

compare the tuple of common attribute values with the tuple of collected present values; and exclude, when a predetermined or larger degree of discrepancy exists between the tuple of common attribute values and the tuple of the collected present values as a result of the comparison, the one information processing apparatus from allocation targets of the second type command.

6. The management apparatus according to claim 2, the processor further configured to set, in predetermined configuration information, reference information for referring to each of plural sets of referent configuration information in which each second type command is set, when there does not exist a common second type command allocated in common between the plurality of information processing apparatuses associated with the plural sets of referent configuration information being referred to from the referrer configuration information with respect to the reference relationship of the referrer configuration information and the plural sets of referent configuration information.

7. The management apparatus according to claim 1, the processor further configured to:

acquire a parameter value from the path information specified by the second type command; and execute the second type command by specifying the acquired attribute value in the parameter value.

8. A management method, comprising:

reading configuration information of each of information processing apparatuses, which contains an attribute value of each of the information processing apparatuses and a reference relationship between the information processing apparatuses, and log information containing a first type command executed by each of the information processing apparatuses;

checking a parameter value specified by the first type command with the configuration information of each of the information processing apparatuses;

extracting path information indicating a relationship between first configuration information of a first information processing apparatus with the first type command being executed and second configuration information of a second information processing apparatus that contains an attribute value coincident with the parameter value specified by the first type command executed by the first information processing apparatus;

generating by a processor, a second type command with the path information being specified in the first type command in place of the parameter value, the path information indicating the relationship between the first configuration information of the first information processing apparatus and the second configuration information of the second information processing apparatus; and allocating the second type command to the first information processing apparatus with the first type command being executed.

9. The management method according to claim 8, further comprising:

setting, in referrer configuration information, the second type command allocated in common between a plurality of information processing apparatuses associated with plural sets of referent configuration information that are referred to from the referrer configuration information with respect to a reference relationship of the referrer configuration information and the plural sets of referent configuration information; and repeating, when the reference relationship is repeated over a plurality of hierarchies, a process to set the second type command in further next referrer configuration information of the plurality of hierarchies with respect to further next referrer configuration information of the plurality of hierarchies and further next referent configuration information that is referred to from the next referrer configuration information.

10. The management method according to claim 8, comprising setting, in the referrer configuration information, a tuple of common attribute values that are contained in the plural sets of referent configuration information of a first group being referred to from the referrer configuration information but are not contained in another configuration information other than the plural sets of referent configuration information of the first group.

11. The management method according to claim 10, further comprising:

extracting another referent configuration information containing a predetermined or larger number of common attribute values contained in the tuple of the common attribute values, the another referent configuration information being other than the first group and the another referent configuration information being referred to from the referrer configuration information; and allocating the second type command allocated in common between the information processing apparatuses associated with the plural sets of referent configuration information of the first group to another information processing apparatuses associated with the extracted another referent configuration information other than the first group.

12. The management method according to claim 10, further comprising:

collecting a tuple of present values against the tuple of common attribute values from one information processing apparatus associated with one set of referent configuration information containing the tuple of common attribute values set in the referrer configuration information;

comparing the tuple of common attribute values with the tuple of collected present values; and excluding, when a predetermined or larger degree of discrepancy exists between the tuple of common attribute values and the tuple of the collected present values as a result of the comparison, the one information processing apparatus from the allocation targets of the second type command.

13. The management method according to 9, further setting, in predetermined configuration information, reference information for referring to each of plural sets of referent configuration information in which each second type command is set, when there does not exist a common second type command allocated in common between the plurality of information processing apparatuses associated with the plural sets of referent configuration information being referred to from the referrer configuration information with respect to the reference relationship of the referrer configuration information and the plural sets of referent configuration information.

14. The management method according to claim 8, further comprising:

acquiring a parameter value from the path information specified by the second type command; and executing the second type command by specifying the acquired attribute value in the parameter value.

15. A computer-readable non-transitory storage medium storing a program to cause a computer execute:

reading configuration information of each of information processing apparatuses, which contains an attribute value of each of the information processing apparatuses and a reference relationship between the information processing apparatuses, and log information containing a first type command executed by each of the information processing apparatuses;

checking a parameter value specified by the first type command with the configuration information of each of the information processing apparatuses;

extracting path information indicating a relationship between first configuration information of a first information processing apparatus with the first type command being executed and second configuration information of a second information processing apparatus that contains an attribute value coincident with the parameter value specified by the first type command executed by the first information processing apparatus;

generating a second type command with the path information being specified in the first type command in place of the parameter value, the path information indicating the relationship between the first configuration information of the first information processing apparatus and the second configuration information of the second information processing apparatus; and allocating the second type command to the first information processing apparatus with the first type command being executed.

16. The computer-readable non-transitory storage medium according to claim 15, causing the computer further execute:

setting, in referrer configuration information, the second type command allocated in common between a plurality of information processing apparatuses associated with plural sets of referent configuration information that are referred to from the referrer configuration information with respect to a reference relationship of the referrer configuration information and the plural sets of referent configuration information; and repeating, when the reference relationship is repeated over a plurality of hierarchies, a process to set the second type command in further next referrer configuration information of the plurality of hierarchies with respect to the further next referrer configuration information of the plurality of hierarchies and further next referent configuration information that is referred to from the next referrer configuration information.

17. The computer-readable non-transitory storage medium according to claim 16, causing the computer further execute setting, in the referrer configuration information, a tuple of common attribute values that are contained in the plural sets of referent configuration information of a first group being referred to from the referrer configuration information but are not contained in another configuration information other than the plural sets of referent configuration information of the first group.

18. The computer-readable non-transitory storage medium according to claim 17, causing the computer further execute:

extracting another referent configuration information containing a predetermined or larger number of common attribute values contained in the tuple of the common attribute values, the another referent configuration information being other than the first group and the another referent configuration information being referred to from the referrer configuration information; and allocating the second type command allocated in common between the information processing apparatuses associated with the plural sets of referent configuration information of the first group to another information processing apparatuses associated with the extracted another referent configuration information other than the first group.

19. The computer-readable non-transitory storage medium according to claim 17, causing the computer further execute:

collecting a tuple of present values against the tuple of common attribute values from one information processing apparatus associated with one set of referent configuration information containing the tuple of common attribute values set in the referrer configuration information;

comparing the tuple of common attribute values with the tuple of collected present values; and excluding, if a predetermined or larger degree of discrepancy exists between the tuple of common attribute values and the tuple of the collected present values as a result of the comparison, the one information processing apparatus from the allocation targets of the second type command.

20. The computer-readable non-transitory storage medium according to claim 16, causing the computer further execute setting, in predetermined configuration information, reference information for referring to each of plural sets of referent configuration information in which each second type command is set, when there does not exist a common second type command allocated in common between the plurality of information processing apparatuses associated with the plural sets of referent configuration information being referred to from the referrer configuration information with respect to the reference relationship of the referrer configuration information and the plural sets of referent configuration information.

21. The computer-readable non-transitory storage medium according to claim 15, causing the computer further execute:

acquiring a parameter value from the path information specified by the second type command; and executing the second type command by specifying the acquired attribute value in the parameter value.

* * * * *